(12) United States Patent
Shimazaki et al.

(10) Patent No.: US 9,843,633 B2
(45) Date of Patent: Dec. 12, 2017

(54) NETWORK DEVICE AND INFORMATION SHARING SYSTEM

(71) Applicant: Digital Acoustic Corporation, Osaka (JP)

(72) Inventors: Naofumi Shimazaki, Osaka (JP); Hiroyuki Fukuma, Osaka (JP)

(73) Assignee: Onkyo & Pioneer Technology Corporation, Osaka (JP)

( * ) Notice: Subject to any disclaimer, the term of this patent is extended or adjusted under 35 U.S.C. 154(b) by 537 days.

(21) Appl. No.: 14/547,460

(22) Filed: Nov. 19, 2014

(65) Prior Publication Data

US 2015/0149550 A1    May 28, 2015

(30) Foreign Application Priority Data

Nov. 28, 2013 (JP) ................................. 2013-246124

(51) Int. Cl.
*G06F 15/16* (2006.01)
*H04L 29/08* (2006.01)

(52) U.S. Cl.
CPC ...... *H04L 67/1068* (2013.01); *H04L 67/1089* (2013.01); *H04L 67/1095* (2013.01)

(58) Field of Classification Search
CPC ............. H04L 67/1095; H04L 67/1089; H04L 67/1068
USPC .................................................. 709/202–205
See application file for complete search history.

(56) References Cited

U.S. PATENT DOCUMENTS

| 5,630,116 A * | 5/1997 | Takaya ............... G06F 17/30067 707/999.201 |
| 8,296,312 B1 * | 10/2012 | Leung ............... G06F 17/30109 707/760 |
| 2015/0067045 A1 * | 3/2015 | Bharadwaj Shamarao Venkata Rao ....... H04L 65/4038 709/204 |
| 2015/0149551 A1 * | 5/2015 | Shimazaki .......... H04L 67/1095 709/204 |

(Continued)

FOREIGN PATENT DOCUMENTS

JP     2004-192103     7/2004

*Primary Examiner* — Bharat N Barot
(74) *Attorney, Agent, or Firm* — Renner, Otto, Boisselle & Sklar, LLP

(57) ABSTRACT

In a network system without a server, a network device and a system that can share information in all devices efficiently and surely are provided. CPUs of a plurality of devices connected to a network determine a host device based on device numbers and network strengths of each of the devices. When transmitting share information stored in a memory to the host device, the CPUs of the client devices merge share information transmitted from the other client devices with the share information stored in the memories so as to transmit the merged information to the host device. The CPU of the host device generates share information about all the devices so as to distribute the information to all the client devices. When the share information is changed, the CPU of the host device generates finite difference information with respect to previous share information so as to distribute the information to all the client devices. When the share information is successively changed, the CPU of the host device merges the respective pieces of finite difference information so as to distribute the information to the client devices.

15 Claims, 45 Drawing Sheets

(56) References Cited

U.S. PATENT DOCUMENTS

2016/0112508 A1* 4/2016 Sher .................... H04L 67/1089
709/203

* cited by examiner

Fig. 28

```
N // tree structure
192.168.29.5 //1
192.168.29.1 //2
192.168.29.3 //3
192.168.29.2 //4
192.168.29.8 //5
192.168.29.6 //6
192.168.29.7 //7
```

Fig. 29
(a) 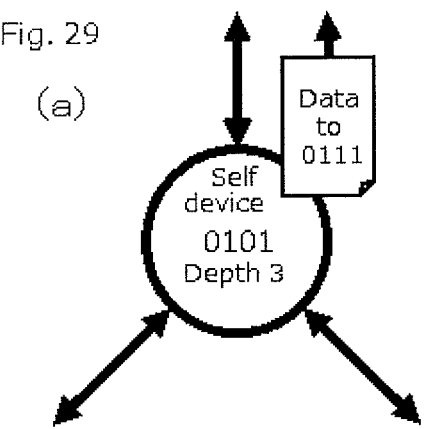
(b) 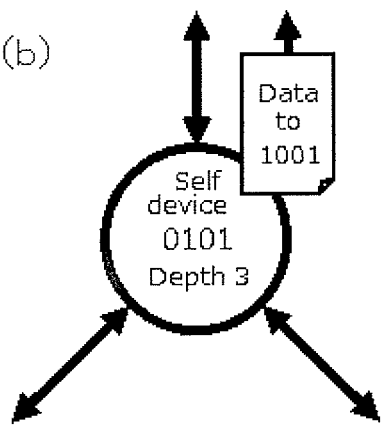
(c) 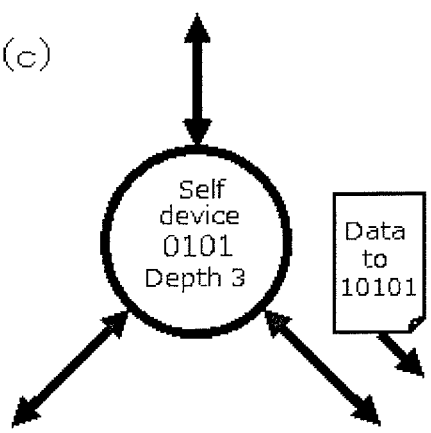

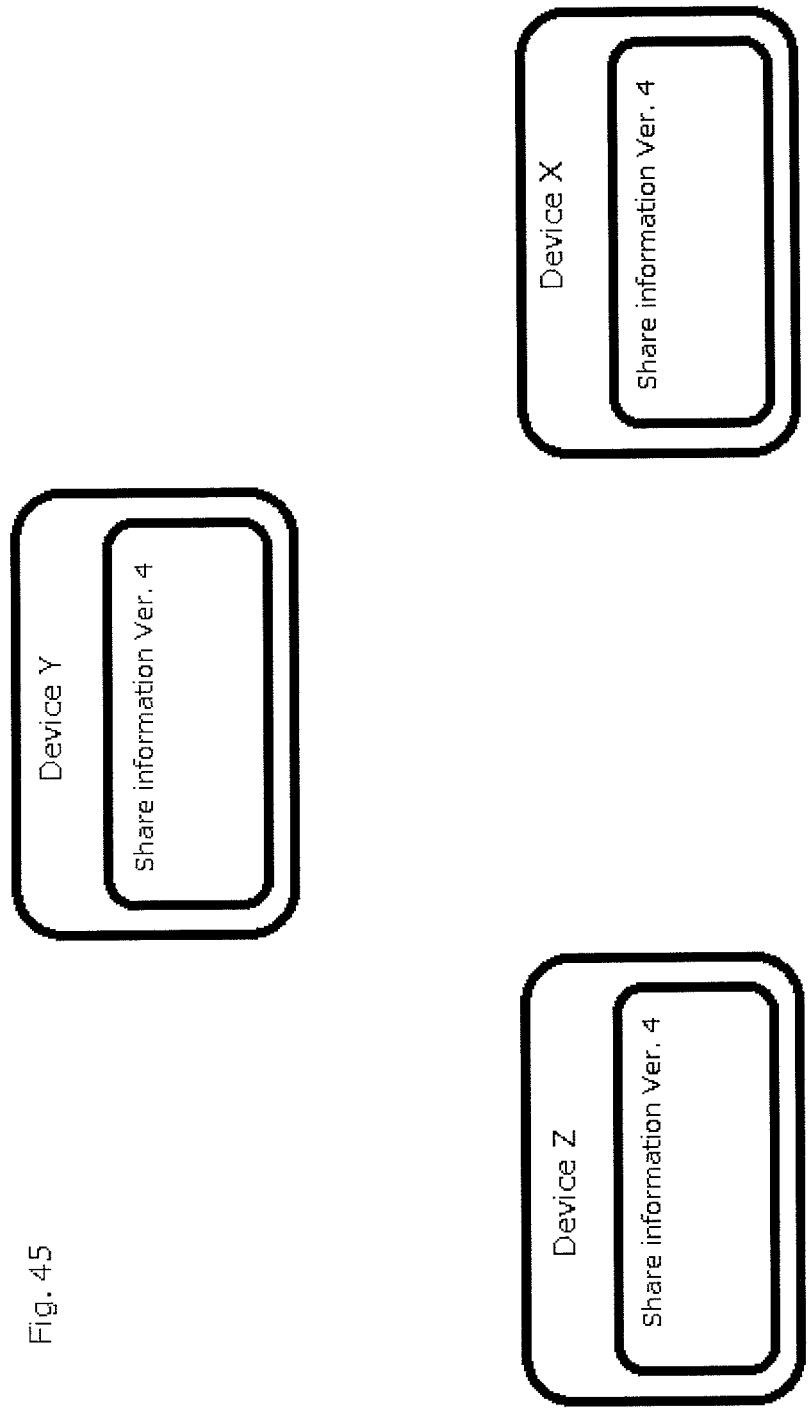

NETWORK DEVICE AND INFORMATION SHARING SYSTEM

BACKGROUND OF THE INVENTION

1. Field of the Invention

The present invention relates to a network device and an information sharing system. The invention particularly relates to the information sharing system that does not require a server.

2. Description of the Related Art

A general system that shares the same information between a plurality of devices is a host-client system represented by a server system. In this system, a host device is prepared in a plurality of devices to retain and manage all or some data, and the other client devices perform command operations so that uniformed network maintenance is carried out.

One or more host devices are always required for realizing the host-client system, and all loads are put on this device to be a host. Further, when the host is shut down or communication with the host is interrupted for some reason, the system cannot be used until the interruption is removed.

In order to search for information quickly and efficiently and obtain the information without a server, Japanese Patent Application Laid-Open No. 2004-192103 discloses a P2P network in which a PC structuring the P2P network includes a distribution unit for distributing contents of a self information table to another PC, a collecting unit for collecting contents of an information table of another PC, an updating unit for updating information so that the contents of the information tables of all the PCs are the same as each other, and an obtaining unit for obtaining information and data selected in the information table from another PC.

In the conventional technique, the contents of the information table of another PC are collected and information is updated so that the information tables of all PCs have the same contents, but communication traffic increases when the contents of the information tables of another PC are simultaneously collected, a load for processing the collected information tables increases. Therefore, in case that a CPU performance of a PC is low, the processing requires a long time or the collecting might be disabled. Further, even if the information table is shared by all PCs, in case that the contents of the information table are changed thereafter, it is necessary to reflect the changed contents in all the information tables efficiently.

SUMMARY OF THE INVENTION

It is an object of the present invention to share information among all devices efficiently and surely in a network that does not have a server. Further, it is another object of the present invention to reflect a change of share information in all the devices efficiently and surely, even if the shared information is changed.

A network device including a host device and client devices to be connected to the host device and structuring a network system of a hierarchical structure without a server where the host device is at a top, the network device comprising: a processing unit; a storage unit; and a communication interface, wherein in case that a self device is the client device, when the processing unit is to transmit first share information stored in the storage unit to a device in a hierarchy one level up on network plan data of a hierarchical structure whose top is the host device in cases of receiving second share information from a device in a hierarchy one level down on the network plan data via the communication interface, the processing unit merges the received second share information with the first share information so as to generate merged share information, and transmits the generated merged share information to the device in the hierarchy one level up on the network plan data via the communication interface, in case that the self device is the host device, the processing unit merges all pieces of share information transmitted from the other devices with third share information stored in the storage unit so as to generate network share information, and transmits the generated network share information to the other devices via the communication interface.

In the present invention, share information (second share information) transmitted from a device in a lower hierarchy to a device in a higher hierarchy is merged with share information (first share information) stored in a storage unit by the device in the higher hierarchy, and the merged information is transmitted to a device in a further higher hierarchy. Finally, share information stored in the storage units of all the devices is merged so as to be transmitted to the host device. Share information (network share information) obtained by merging the share information stored in the storage units of all the devices is transmitted to client devices by a processing unit of the host device. Therefore, since the host device does not collect the share information stored in the storage units of all the other devices, communication traffic does not increase. Further, a load on the processing unit of the host device does not increase. For this reason, even if a performance of the processing section of the device is low, the processing for collecting the share information does not require a long time, and the collecting of the share information may not be disabled. That is to say, according to the present invention, information can be shared in all the devices efficiently and surely.

Preferably, wherein in case that the self device is the client device, the processing unit determines whether the merged share information is proper based on scheme information stored in the storage unit, and in case that the determination is made that the merged share information is proper, transmits the merged share information to a device in a hierarchy one level up on the network plan data via the communication interface, in case that the self device is the host device, the processing unit determines whether the network share information is proper based on the scheme information stored in the storage unit, and in case that the determination is made that the network share information is proper, transmits the network share information to the other devices via the communication interface.

In the present invention, the processing unit determines whether merged share information and network share information are proper. The processing unit then transmits the proper merged share information and network share information to the device. Therefore, the proper share information is retained in the device.

Preferably, wherein in case that the self device is the client device, when the processing unit is to transmit the first share information and the scheme information stored in the storage unit to a device in a hierarchy one level up on the network plan data in case of receiving the second share information and the scheme information from a device in a hierarchy one level down on the network plan data via the communication interface, the processing unit transmits the scheme information of latest version selected from the received scheme information and the scheme information stored in the storage unit, and the merged share information to a device in a hierarchy one level up on the network plan data via the communication interface, in case that the self device is the host device, the processing unit transmits the scheme information of latest version selected from the received scheme information and the scheme information stored in the storage unit and the network share information to the other devices via the communication interface.

In the present invention, the processing unit determines whether the merged share information and the network share information are proper based on scheme information of newer version. The processing unit then transmits the proper merged share information and network share information to the device. Therefore, the proper share information determined based on the new scheme information is retained by the device.

Preferably, wherein the processing unit determines whether the self device is proper as the host device based on a device list of devices connected to a network that is stored in the storage unit, and in case that the determination is made that the self device is proper as the host device, determines that the self device is the host device, and transmits a message representing that the self device is the host device to the other devices connected to the network via the communication interface, in case of determining that the self device is not proper as the host device and receiving the message via the communication interface, the processing unit determines that the self device is the client device.

In the present invention, the processing unit determines whether a self device is a host device or a client device. For this reason, the network system that includes the host device and the client device can be structured.

Preferably, wherein in case of determining that the self device is the host device, the processing unit generates the network plan data, transmits the generated network plan data to a device in a hierarchy one level down on the network plan data via the communication interface, and connects the device in the hierarchy one level down on the generated network plan data to the self device, in case of determining that the self device is the client device, the processing unit receives the network plan data via the communication interface, transmits the received network plan data to a device in a hierarchy one level down on the network plan data via the communication interface, and connects the device in the hierarchy one level down on the received network plan data to the self device.

In the present invention, the network plan data is transmitted sequentially from the host device to the client device and from the client device to a client device in a hierarchy one level down according to network plan data generated by the processing unit of the host device. The host device is connected to the client device, and the client device is connected to the client device in a hierarchy one level down sequentially according to the network design data. For this reason, the network system that has a hierarchical structure including the host device at the top and the client devices can be structured.

Preferably, wherein the device list includes device numbers of the devices connected to the network and strength values in the network system, the processing unit determines that a device whose strength value is the largest in the device list is proper as the host device, and in case that the strength values are equal to each other, determines that a device whose device number is the largest or the smallest is proper as the host device.

In the present invention, the processing unit determines that a device whose strength value is the largest in the network is the host device. The processing unit of the high-performance host device whose strength value is the largest in the network collects share information and transmits it to the other devices. Therefore, the processing for collecting share information does not require a long time, and the collecting of the share information may not be disabled. For this reason, information can be shared in all the devices more efficiently and surely.

Preferably, wherein the processing unit makes the self device change into a first state representing that the self device is not the host device nor the client device in an initial state, in case of determining that the self device is the host device, makes the self device change from the first state into a second state representing that the self device is the host device so as to transmit the message, transmits an echo request message at a predetermined time interval, in case of determining that the self device is the client device, makes the self device change from the first state into a third state representing that the self device is the client device, and in case of not receiving the echo request message at a predetermined time interval, makes the self device change from the third state into the first state again.

In the present invention, in case that the client devices do not receive an echo request message at a predetermined time interval, namely, the host device is not present, the processing unit changes the self device from a third state (client device) to a first state (neither the host device nor the client device). For this reason, in case that the host device is not present, the client device can be a host device or a client device.

Preferably, wherein in case that the self device is the host device and the network share information is changed, the processing unit generates finite difference information between the network share information before the change and the network share information after the change, and transmits the generated finite difference information to the other devices via the communication interface, in case that the self device is the client device and the network share information is changed, the processing unit generates the finite difference information, and transmits the generated finite difference information to a device in a hierarchy one level up on the network plan data via the communication interface, in case that the self device is the client device and in case of receiving the finite difference information from the device in the hierarchy one level up on the network plan data via the communication interface, the processing unit updates the network share information stored in the storage unit using the finite difference information, and transmits the finite difference information to a device in a hierarchy one level down on the network plan data via the communication interface.

In the present invention, in case that share information (network share information) is changed, the processing unit of the host device generates a finite difference between the changed share information and the share information before change, and transmits the generated finite difference information to the client device. The processing unit of the client device transmits the finite difference information to client devices in hierarchy one level down sequentially. Therefore, since the host client transmits share information (or finite difference information) to not all the devices, the communication traffic does not increase. Further, a load on the processing unit of the host device does not increase. For this reason, even if the processing unit of the device has a low performance, the processing for transmitting the finite difference information does not require a long time, and the transmission of the finite difference information may not be disabled. That is to say, even if the share information is changed, the transmission of the finite difference information from the host device to the client device and from the client device to a device in a hierarchy one level down enables the change to be reflected in all the devices efficiently and surely.

Preferably, wherein the network share information includes common information common among all the devices connected to the network and specific information specific to the devices connected to the network, in case that any device of the devices connected to the network is cut off from the network and then the specific information is changed, the processing unit updates the specific information about the devices connected to the network using the finite difference information, updates the common information so that the common information matches with the specific information, and in case that the any device is reconnected to the network, the processing unit updates the common information and the specific information about the any device so as to match with the updated common information.

In the present invention, the processing unit updates the share information so that the share information matches with updating of specific information. Further, in case that any device is connected again to the network, the processing unit updates the share information and the specific information about any device so as to match with the updated share information. Therefore, even if a device cut off from the network is again connected to the network, specific information stored in the storage unit of another device is not rewritten into specific information stored in the storage unit of this device.

Preferably, wherein in case that the self device is the host device and the finite difference information is generated to be transmitted to the other devices and the other devices are performing the updating using previous finite difference information, the processing unit waits for transmission until the updating is completed, and in case of generating new finite difference information during the waiting, merges the finite difference information in waiting with the new finite difference information so as to transmit the merged finite difference information after the updating in the other devices is completed.

In the present invention, in case that another device is performing the updating using previous finite difference information, the processing unit of the host device is made to wait for transmission until the updating is completed. In case that the processing unit of the host device generates new finite difference information during the waiting, the processing unit of the host device merges the finite difference information on waiting and the new finite difference information with each other, so as to transmit the merged finite difference information after the updating of another device is completed. Therefore, since the processing unit of the host device does not transmit finite difference information to the client device every time when new finite difference information is generated, the communication traffic does not increase. Further, a load on the processing unit of the host device does not increase.

Preferably, wherein in case that connection with any device of the devices connected to the network is cut off, the processing unit cuts off all connections with the other devices in a hierarchy one level up and the other devices in a hierarchy one level down on the network plan data.

In the present invention, in case that the connection of any one of devices connected to the network is cut off, the processing unit cuts all the connection with another device in a hierarchy one level up on the network plan data and the connection with another device in a hierarchy one level down. Therefore, the connection of all the devices structuring the network system is cut off, and a new network system is structured. For this reason, since it is not necessary to decide to which device the device connected to the cut off device is again connected, processing for restructuring the network system does not become complicated.

Preferably, wherein the network plan data is plan data of an N tree structure (N is a natural number of 2 or more), and is list data in which the devices are arranged in decreasing order of the strength values.

In the present invention, the processing unit structures network systems starting from one whose strength value is the largest sequentially in the network system. Therefore, since a device in a higher hierarchy in which the load of the processing unit is larger has larger strength, namely, the processing unit has a higher performance, the collecting and transmission of share information (finite difference information) are more efficient and sure.

Preferably, further comprising; an audio signal processor for processing audio signals.

In the present invention, for example, the sharing of volume values of the respective devices in share information enables a change in volume of an audio reproduced from another device in a manner that a certain device rewrites the volume value of another device in share information according to an instruction from an external controller connected to the certain device.

An information sharing system of a hierarchical structure whose top is a host device without a server including the host device and client devices to be connected to the host device, the system comprising: a plurality of network devices, wherein each of the plurality of network devices includes a processing unit, a storage unit, and a communication interface, in case that the self device is the client device, when the processing unit is to be transmit first share information stored in the storage unit to a network device in a hierarchy one level up on network plan data of a hierarchal structure whose top is the host device in case of receiving second share information from a device in a hierarchy one level down on the network plan data via the communication interface, the processing unit merges the received second share information with the first share information so as to transmit the merged information to a network device in a hierarchy one level up on the network plan data via the communication interface, in case that the self device is the host device, the processing unit merges all pieces of share information transmitted from the other network devices with third share information stored in the storage unit so as to generate network share information, and transmits the generated network share information to the other network devices via the communication interface, in case that the self device is the client device, the processing unit receives the transmitted network share information and stores the information in the storage unit so as to share the identical share information among the plurality of network devices.

Preferably, wherein in case that the network share information is changed in a first network device as the client device, a processing unit of the first network device generates finite difference information between the network share information before the change and the network share information after the change, transmits the generated finite difference information to a network device as the host device, the processing unit of the network device as the host device transmits the finite difference information to all the network devices as the client devices including the first network device, the processing units of all the network devices as the client devices including the first network device updates the network share information stored in the storage units using the finite difference information.

BRIEF DESCRIPTION OF THE DRAWINGS

FIG. 28 is an explanatory diagram of plan data;
FIG. 29(a) is a first explanatory diagram illustrating cut-off of the binary tree structure;
FIG. 29(b) is a second explanatory diagram illustrating cut-off of the binary tree structure;
FIG. 29(c) is a third explanatory diagram illustrating cut-off of the binary tree structure;
FIG. 45 is an explanatory diagram (7) illustrating the merging of the finite difference information.

DETAILED DESCRIPTION OF PREFERRED EMBODIMENTS

Embodiments of the present invention are described below with reference to the drawings.

First Embodiment

Figure 1:
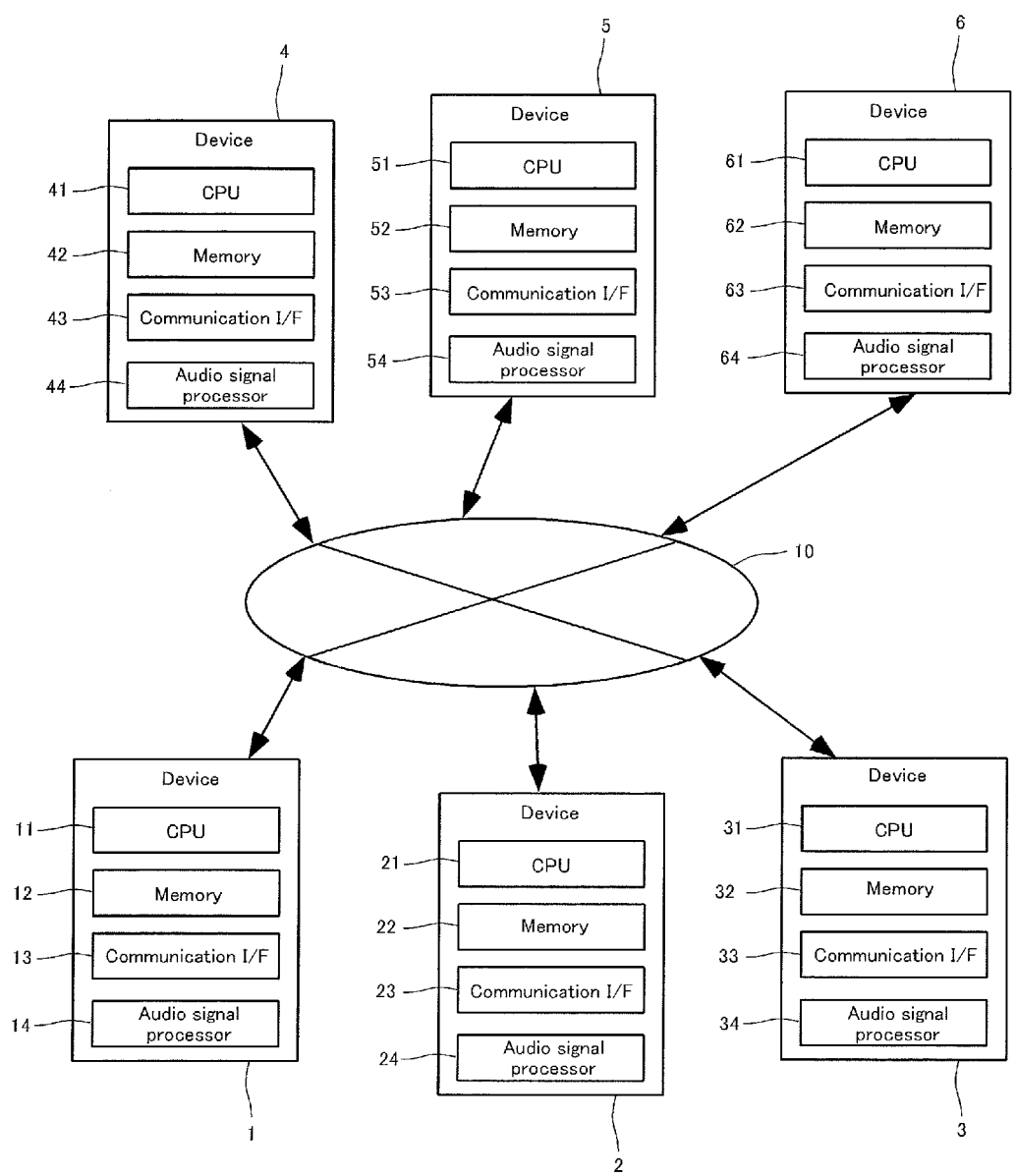
FIG. 1 is a system structural diagram according to an embodiment.

FIG. 1 is an entire structural diagram of a network system according to the first embodiment. A plurality of network devices 1, 2, 3, 4, 5, and 6 are connected to a network 10. The drawing illustrates totally six devices, but the number of the devices is not limited to this. The devices each may have the same configuration or different configurations. The network devices mean devices that are connected to each other via a communication line (the network 10) so as to structure a network system and can transmit/receive data. The communication line may be wired or wireless. Further, the typical examples of the network device include information devices such as computers, personal computers, tablet terminals, mobile telephones, and also audio visual (AV) apparatuses and audio apparatuses that can be connected to each other via a communication line. FIG. 1 illustrates an audio apparatus that reproduces audios as devices 1 to 6. The devices each may have different configurations, but they have the same configuration in the present embodiment and the configuration of only the device 1 is described.

The device 1 includes a CPU 11 (a processing unit), a memory 12 (storage unit), a communication interface (I/F) 13, and an audio signal processor 14.

The memory 12 includes a program memory and a working memory. Programs that are executed by the CPU 11 are stored in the program memory. A device list described later and the like are stored in the working memory.

The CPU 11 executes processing described later according to the programs stored in the program memory so as to execute processing for specifying a device to be a host device (hereinafter, simply "host") from the plurality of devices 1 to 6. Further, after the host device is set, the CPU 11 structures a network system among the plurality of devices 1 to 6, and executes a series of processing for sharing necessary information.

The communication I/F 13 transmits/receives various data such as a device list retained in the device 1 via the network 10. The CPU 11 transmits/receives various data via the communication I/F 13, but for easy description, "the CPU 11 transmits a device list" from which "via the communication I/F 13" is omitted is used hereinafter.

The audio signal processor 14 executes predetermined processing such as demodulating and amplifying on input audio signals. In case that the device 1 is a speaker, the audio signal processor includes a driver circuit for outputting an audio signal. In case that the device 1 is an amplifier and a speaker, the audio signal processor 14 includes a demodulating circuit, an amplifying circuit, and a driver circuit.

Another device such as a CD player or a DVD player may be connected to the device 1.

Further, the network 10 is typically LAN (Local Area Network), but the network 10 is connected to WAN (Wide Area Network), and may be connected to a specific service device via WAN. The network 10 may be a wired network or a wireless network.

In FIG. 1, any of the plurality of devices 1 to 6 does not function as a host in an initial state, and thus no host is present. In this initial state, the devices 1 to 6 are connected to the network 10, but the devices 1 to 6 are not connected to each other. That is to say, the network system is not structured by the devices 1 to 6. From this state, the devices 1 to 6 transmit/receive data among the devices 1 to 6 and autonomously set any one device as the host so as to structure a set host-based network system. The devices 1 to 6 structuring the network system share information.

The processing for autonomously setting the host device in the initial state that the host device is not set is described below.

<Setting the Host Device>

Figure 2:
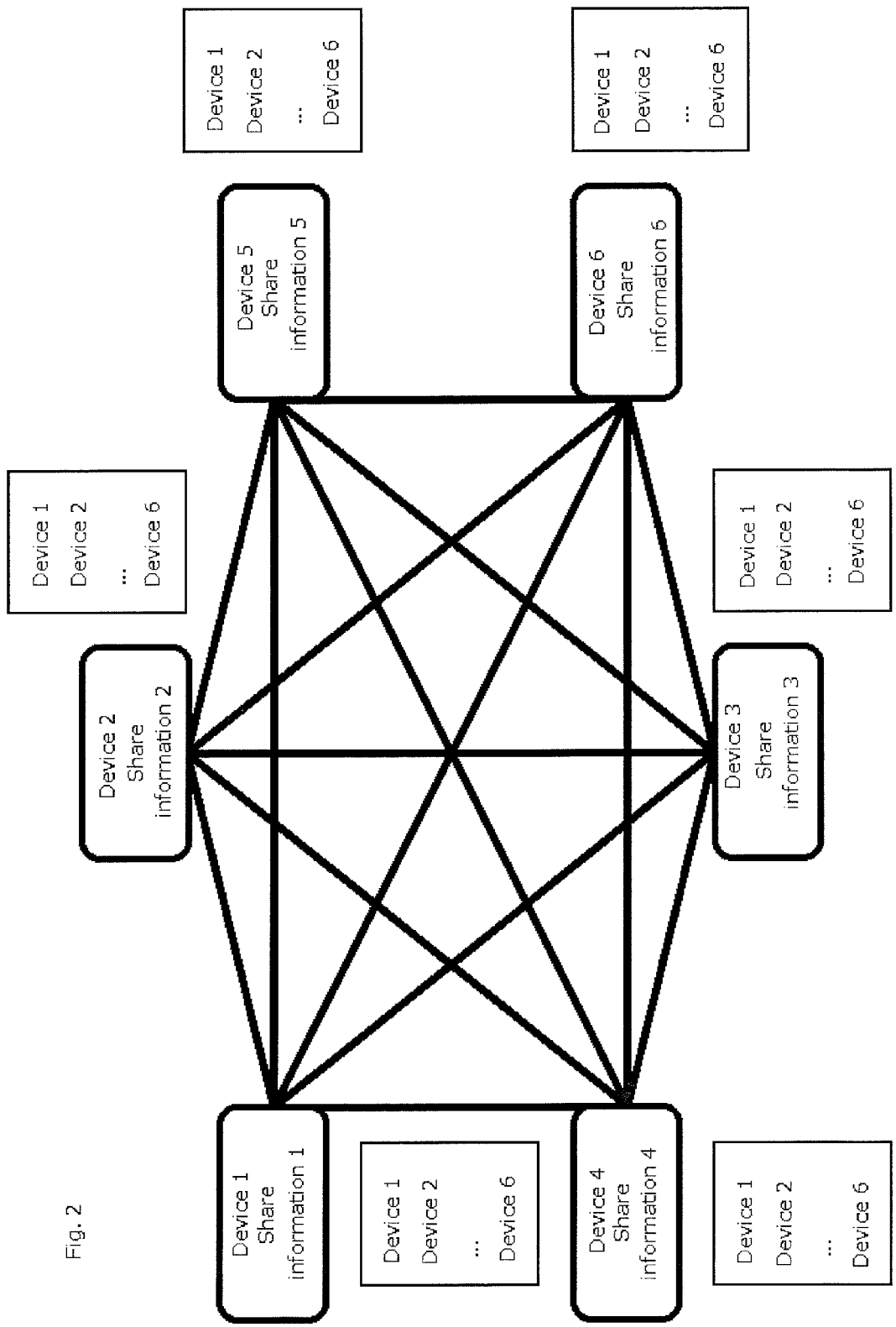
FIG. 2 is an explanatory diagram illustrating creation of a device list using an UDP broadcast function.

FIG. 2 illustrates a state that the devices 1 to 6 are each connected to the network 10 by the communication I/Fs 13 to 63. When the devices 1 to 6 are powered on, CPUs 11 to 61 of the devices 1 to 6 obtain device lists including the approximately same contents using a UDP (User Datagram Protocol) broadcasting function, and store the obtained device lists in memories 12 to 62, respectively. "The approximately same contents" means that the contents do not have to completely match with each other, and a case where an echo could not return because of an unstable communication state is taken into consideration.

This broadcast function enables the devices 1 to 6 to retain the lists of the devices connected to the network 10 as well as share information and scheme information. For example, the device 1 stores share information 1, scheme information, and also the device list (the device 1, the device 2, and so on) in the memory 12. Further, the device 2 stores share information 2, scheme information, and also the device list (the devices 1, 2, and so on) in the memory 22. In the initial state, there is no guarantee that the share information, the scheme information, and the device lists retained in the respective devices 1 to 6 are the same as each other, and there is no guarantee that the share information 1 and the share information 2 are the same as each other (although the information are "share information", there is no guarantee that the information is always shared by all the devices 1 to 6 in the initial state, and thus it may be temporary share information). The share information is information shared among the devices. Further, the scheme information is information about scheme (framework) for determining whether the share information has a proper form, format and value. The share information and the scheme information are always transmitted/received in a set.

UDP is a protocol that is used for transmitting a message "datagram" to another computer on an Internet Protocol (IP) network, and has an advantage that a transfer channel and a data route do not have to be specially set in advance.

When obtaining the device lists, the CPUs 11 to 61 of the devices 1 to 6 each determine whether a self device is proper as a host among the devices 1 to 6 based on the device lists stored in the memories 12 to 62, respectively. As described above, no host is present in the initial state, but if a host is present, the CPUs 11 to 61 of the devices 1 to 6 do not make the determination and regard the existent host as the host. Further, In case that another device that returns an echo is also the host although a result of the determination is that the self device is proper as the host (host conflict), the CPUs 11 to 61 of the devices 1 to 6 determine which of the self device or another device is proper as the host. In case that the CPUs 11 to 61 determine that the self device is proper as the host, they transmit a message representing that the host is already present to another device. Details of the determination are described later.

Figure 3:
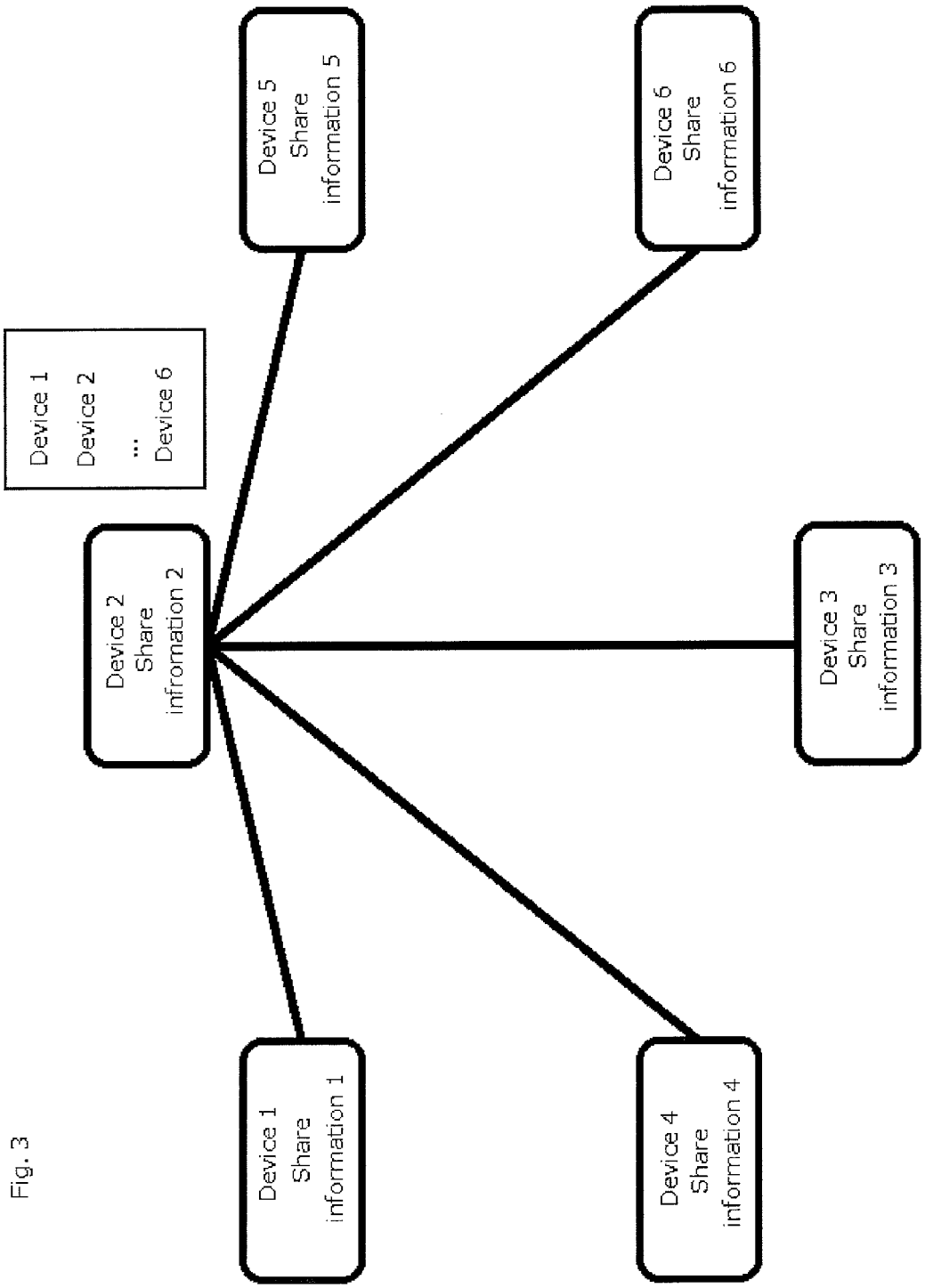
FIG. 3 is an explanatory diagram after a host device is set.

FIG. 3 illustrates a case where the determination is made that the CPU 21 of the device 2 is proper as the host as a result of determining whether the self device is proper as the host in the CPUs 11 to 61 of the devices 1 to 6. In case that the device 2 is set as the host, the CPU 21 of the device 2 as the host reads the device list form the memory 22 and attaches the read device list to an echo message so as to transmit it to the other devices 1 and 3 to 6. The CPUs 11 and 31 to 61 of the devices 1 and 3 to 6 other than the host interrupt search with the echo, and receive the device list included in the echo message of the device 2 so as to store the received device list in the memories 12 and 32 to 62. That is to say, as shown in FIG. 3, only the device 2 as the host broadcasts and distributes the retained device list to the other devices 1 and 3 to 6. As a result, all the devices 1 to 6 retain the same device list.

When an echo is not transmitted from the device 2 as the host for a certain period of time, the CPUs 11 and 31 to 61 of the devices 1 and 3 to 6 other than the host start to search for an echo. Further, when a certain period of time further passes, next host is again set.

<Generation and Distribution of Plan Data>

The CPU 21 of the device 2 as the host, as shown in FIG. 3, distributes the device list stored in the memory 22 to the other devices 1 and 3 to 6. The CPU 21, in parallel with this, generates network plan data (hereinafter, simply "plan data") that is plan data of the network system using the device list stored in the memory 22 (namely, retained by all the devices 1 to 6). The CPU 21 connects the self device 2 to a device in a hierarchy one level down (the nearest client) in the generated plan data and transmits the generated plan data.

Figure 4:
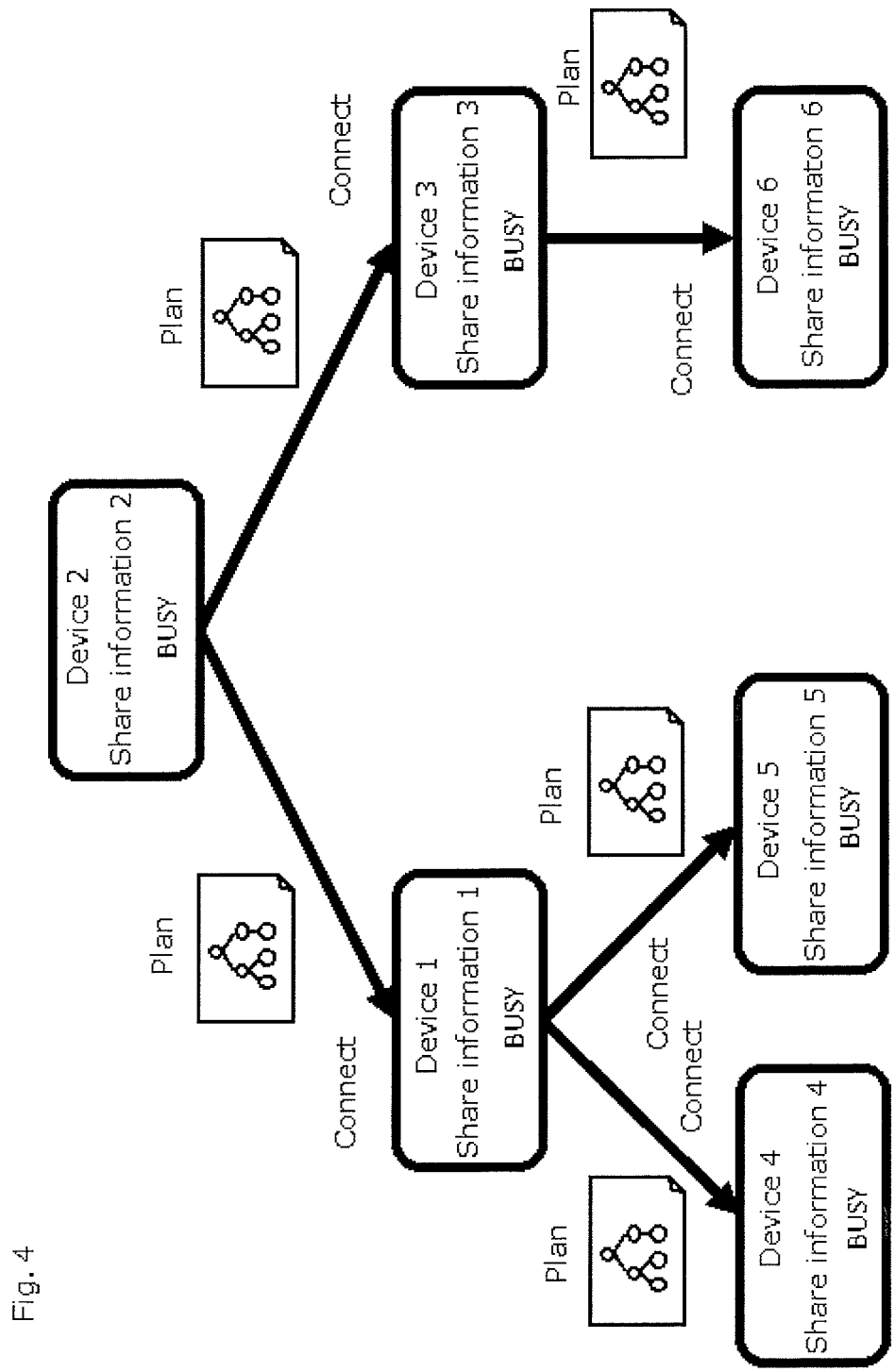
FIG. 4 is an explanatory diagram illustrating distribution of plan data.

FIG. 4 illustrates a configuration where the plurality of devices 1 to 6 is connected into a binary tree shape in which the host is at the top as the network plan data. The device 2 as the host is at the top, and the device 1 and the device 3 are connected below the device 2. The device 4 and the device 5 are connected below the device 1, and the device 6 is connected below the device 3. The plan data is a data string where such a connecting relationship is described. The devices 1 to 6 are each connected to necessary devices according to the generated plan data so as to structure the network system. As shown in FIG. 4, the network system according to the present embodiment includes the host device, and the client devices (hereinafter, simply "clients") connected to the host device, and has a hierarchical structure where the host device is at the top.

The CPU 21 of the device 2 as the host connects the self device to the device 1 and the device 3 that are the clients according to the plan data, and transmits the generated plan data. The CPU 11 of the device 1 receives the plan data from the device 2, and stores the received plan data in the memory 12. The CPU 11 connects the self device to the device 4 and the device 5 according to the plan data, and transmits the received plan data. The CPU 41 of the device 4 and the CPU 51 of the device 5 store the received plan data in the memories 42 and 52, respectively. Further, the CPU 31 of the device 3 receives the plan data from the device 2, and stores the received plan data in the memory 32. The CPU 31 connects the self device to the device 6 according to this plan data, and transmits the received plan data. The CPU 61 of the device 6 stores the received plan data in the memory 62. The CPUs 41 to 61 of the device 4 to 6 determine that the self devices are in the lowest hierarchy in the network system according to the received plan data.

<Collection and Distribution of Share Information>

After the device is connected according to the plan data generated by the host device so that the network system is structured, the device 2 as the host collects share information (temporary share information) retained by the other devices 1 and 3 to 6.

Figure 5:
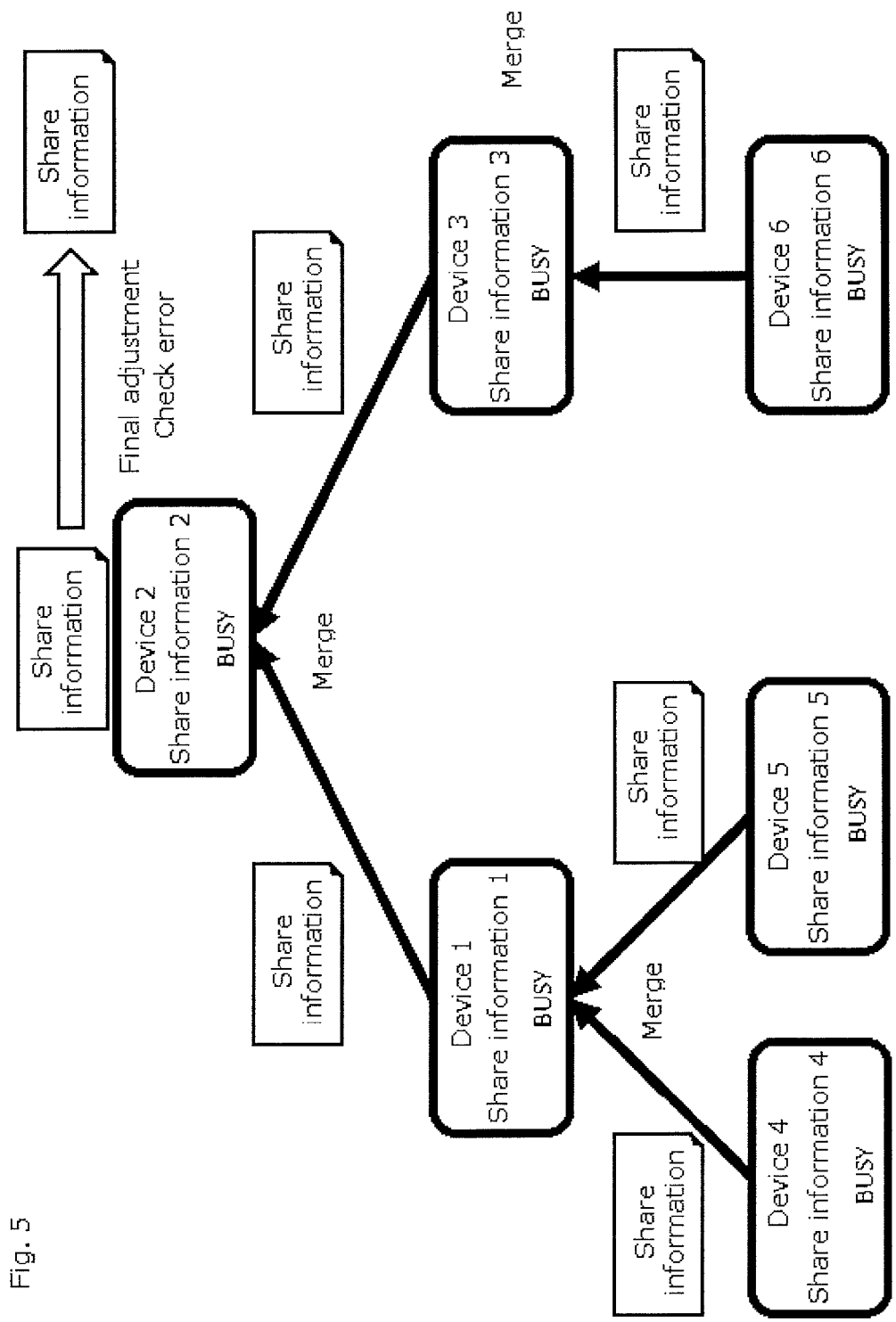
FIG. 5 is an explanatory diagram illustrating collection of share information (temporary share information)

FIG. 5 illustrates the processing for collecting the share information. The CPU 21 of the device 2 as the host transmits a command for collecting share information to the other devices 1 and 3 to 6. Concretely, the CPU 21 of the device 2 transmits the collecting command to the device 1 and the device 3 as the clients. The CPU 11 of the device 1 transmits the collecting command to the device 4 and the device 5 as the clients. The CPU 31 of the device 3 transmits the collecting command to the device 6 as the client.

When the CPUs of the devices each receive the collecting command, they read the share information stored in the memories (retained by the self devices) according to the command, and transmit the read share information to devices in a hierarchy one level up. Each of the CPUs of the device in a hierarchy one level up that receives the share information from each of the clients transmits the received share information to each of devices in a hierarchy one level up. At this time, when the share information is stored in each of the memories, each of the CPUs merges (synthesizes) the share information stored in the memory and the share information received from each of the clients so as to transmit the merged information to each device in a hierarchy on level up.

That is to say, the CPU 41 of the device 4 transmits share information 4 stored in the memory 42 to the device 1. Further, the CPU 51 of the device 5 transmits share information 5 stored in the memory 52 to the device 1. The CPU 11 of the device 1 merges the share information 4 with the share information 5, and further merges the share information 1 stored in the memory 12 with them, so as to transmit the share information 1+the share information 4+the share information 5 to the device 2. Further, the CPU 61 of the device 6 transmits the share information 6 stored in the memory 62 to the device 3. The CPU 31 of the device 3 merges the share information 3 stored in the memory 32 and the share information 6, and transmits the share information 3+the share information 6 to the device 2.

Each of the CPU of each device, which merges share information transmitted from each device in a hierarchy one level down with the share information stored in each of the memories and transmits the merged share information to each of the devices in a hierarchy one level up, merges the share information, and determines based on the scheme information whether the merged share information (temporary share information) is proper, namely, the merged share information and the scheme information match with each other. In case that the CPUs of the devices each determines that the merged share information (temporary share information) is proper, namely, the merged share information matches with the scheme information based on the scheme information, it transmits the merged share information to each of the devices in a hierarchy one level up. On the other hand, in case that the CPUs of the devices each determine that the merged share information is not proper, namely, the merged share information does not match with the scheme information, it discards the merged share information. For example, after the CPU 11 of the device 1 merges the share information 4, the share information 5, and share information 1, it determines whether the merged share information (temporary share information) is proper based on the scheme information. In case that the CPU 11 of the device 1 determines that the merged share information (temporary share information) is proper based on the scheme information, it transmits the merged share information to the device 2. That the merged share information is proper means that the merging of the share information succeeds. Further, that the merged share information is not proper means that the merging of the share information fails.

Figure 6:
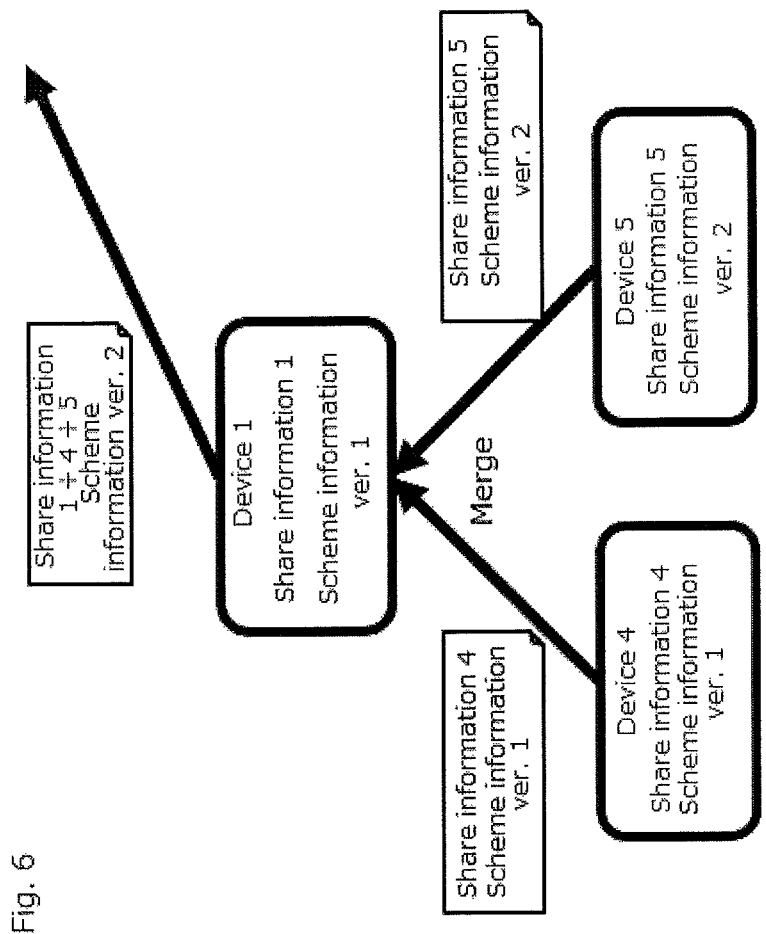
FIG. 6 is an explanatory diagram illustrating collection of share information (temporary share information)

Further, the CPUs of the devices each transmit a set of the share information and the scheme information. For example, as shown in FIG. 6, the CPU 41 of the device 4 transmits the share information 4 stored in the memory 42 and scheme information of version 1 to the device 1. The CPU 51 of the device 5 transmits the share information 5 and scheme information of version 2 to the device 1. Further, in case that the version of the received scheme information is newer than the version of the scheme information stored in the memory, the CPUs of the devices each transmits the scheme information of the new version to a device in a hierarchy one level up. For example, as shown in FIG. 6, the CPU 11 of the device 1 transmits the scheme information of version 2 that is newer than the scheme information of version 1 stored in the memory 12 to the device 2 in the hierarchy one level up.

Figure 7:
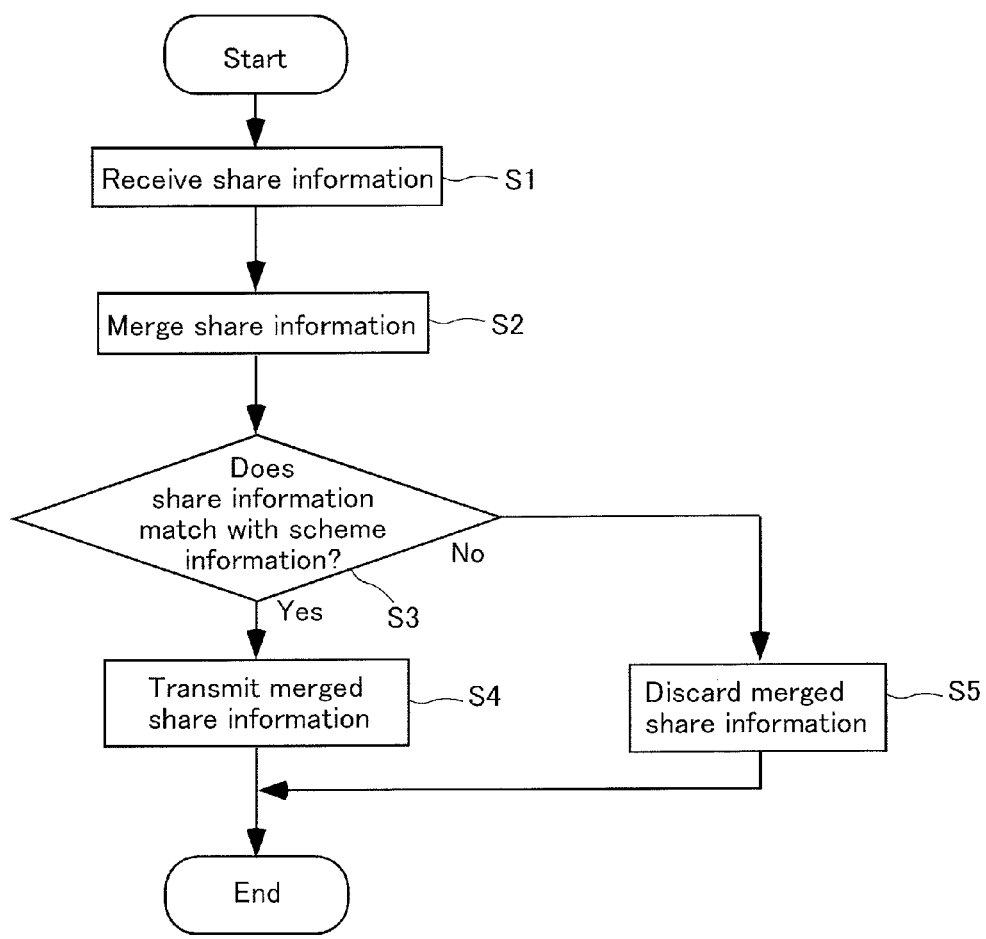
FIG. 7 is a flowchart illustrating a processing operation for determining whether share information after merging in a device other than the host is proper.

FIG. 7 is a flowchart illustrating a processing operation for determining whether merged share information in a device other than the host is proper. When the CPUs of the devices each receives share information transmitted from each device in a hierarchy one level down (S1), it merges the received share information with the share information stored in the memory (S2). Each of the CPUs determines whether the merged share information matches with the scheme information (S3). In case that the CPUs each determine that the merged share information matches with the scheme information (S3: Yes), it transmits the merged share information and the scheme information to each of the devices in a hierarchy one level up (S4). In case that each of the CPUs determines that the merged share information does not match with the scheme information (S3: No), it discards the merged share information (S5).

The CPU 21 of the device 2 as the host receives the share information 1+the share information 4+the share information 5 from the device 1 and the share information 3+share information 6 from the device 3, merges them and further merges also the share information 2 stored in the memory 22 so as to generate the share information=the share information 1+the share information 2+the share information 3+the share information 4+the share information 5+the share information 6. The CPU 21 of the device 2 determines whether the merged share information (temporary share information) is proper based on the scheme information, namely, the merged share information matches with the scheme information. In case that the CPU 21 of the device 2 determines that the merged share information (temporary share information) is proper based on the scheme information, namely, the merged share information matches with the scheme information, it stores the merged share information in the memory 22. Therefore, the memory 22 of the device 2 updates the share information 2 into new share information. In case that the CPU 21 of the device 2 determines that the merged share information (temporary share information) is not proper based on the scheme information, namely, the merged share information does not match with the scheme information, it discards the merged share information.

Figure 8:
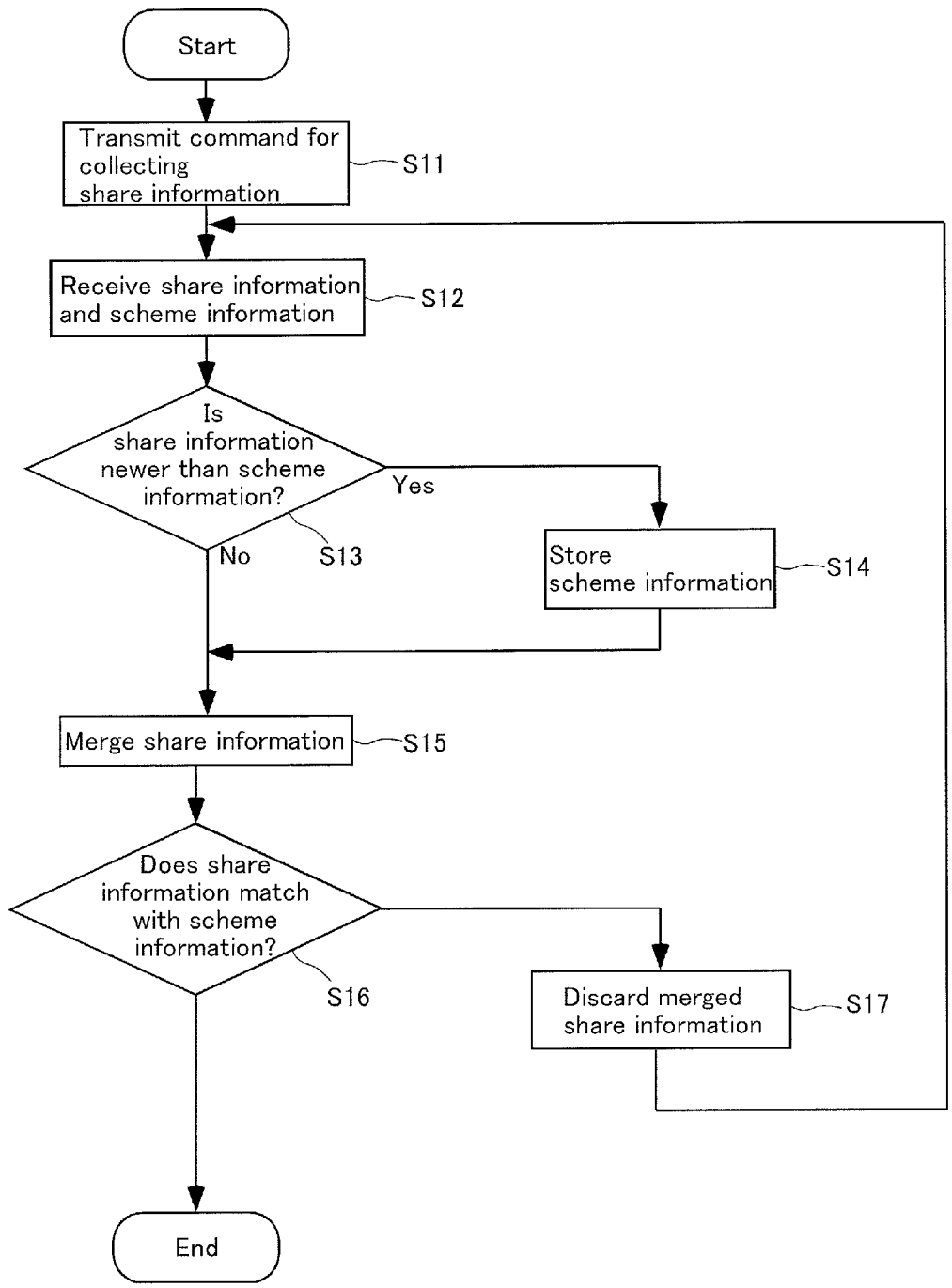
FIG. 8 is a flowchart illustrating process for collecting the share information in the host device.

FIG. 8 is a flowchart illustrating processing for collecting the share information in the host device. The CPU of the host device transmits the command for collecting the share information to a device in a hierarchy one level down (S11). Thereafter, the CPU receives the share information and the scheme information from the device in the hierarchy one level down (S12). The CPU then determines whether the version of the received scheme information is newer than the version of the scheme information stored in the memory (S13). In case that the CPU determines that the version of the received scheme information is newer than the version of the scheme information stored in the memory (S13: Yes), it stores the received scheme information in the memory (S14). In case that the CPU determines whether the version of the received scheme information is not newer than the version of the scheme information stored in the memory (S13: No) or after processing in S14, it merges the received share information with the share information stored in the memory (S15). The CPU determines whether the merged share information matches with the scheme information (S16). In case that the CPU determines that the merged share information does not match with the scheme information (S16: No), it discards the merged share information (S17). At this time, the CPU notifies a device in a hierarchy one level down of that the merged share information is not proper, namely, failure of the merging. The CPU of the device in the hierarchy one level down again merges the received share information with the share information stored in the memory. In case that the merged shared information is proper, the CPU of the device in the hierarchy one level down again transmits the merged share information to a device in the hierarchy one level up. On the other hand, in case that the merged share information is not proper, the CPU of the device in the hierarchy one level down notifies a device in the hierarchy one level down of improperness of the merged share information, namely, failure of the merging. In such a manner, the merging of share information is performed again in each of the devices, and the merged share information is eventually transmitted to the host device.

The CPU of the host device again executes the processing in S12 to S16 after the processing in S17. Further, in case that the CPU determines that the merged share information matches with the scheme information (S16: Yes), it ends the processing.

In case that share information that are retained by the devices 1 and 3 to 6 themselves is transmitted individually to the host device 2, communication traffic increases, and further a load on the CPU 21 of the host device 2 increases. Particularly since the devices 1 to 6 are not computers but acoustic devices such as amplifiers and speakers, the throughput of the mounted CPUs 11 to 61 are limited, and thus it is hard for the CPUs to process a number of pieces of data at one time. Like the present embodiment, when each of the CPUs of the devices structuring the network system merges share information from client devices and further merges share information retained in the self device so as to transmit the merged information to the device 2 collectively, the CPU of the device 2 only have to receive the share information transmitted from the two devices 1 and 3 and merges them with the self share information, so that the efficient collecting processing is enabled.

After the CPU 21 of the host device 2 generates share information (true share information common in all the devices) so as to store it in the memory 22, it reads share information (network share information) and the scheme information from the memory 22 so as to transmit them to the other devices 1 and 3 to 6. In the present embodiment, the CPU 21 of the device 2 transmits the share information and the scheme information only to the device 1 and the device 3 in the hierarchy one level down.

Figure 9:
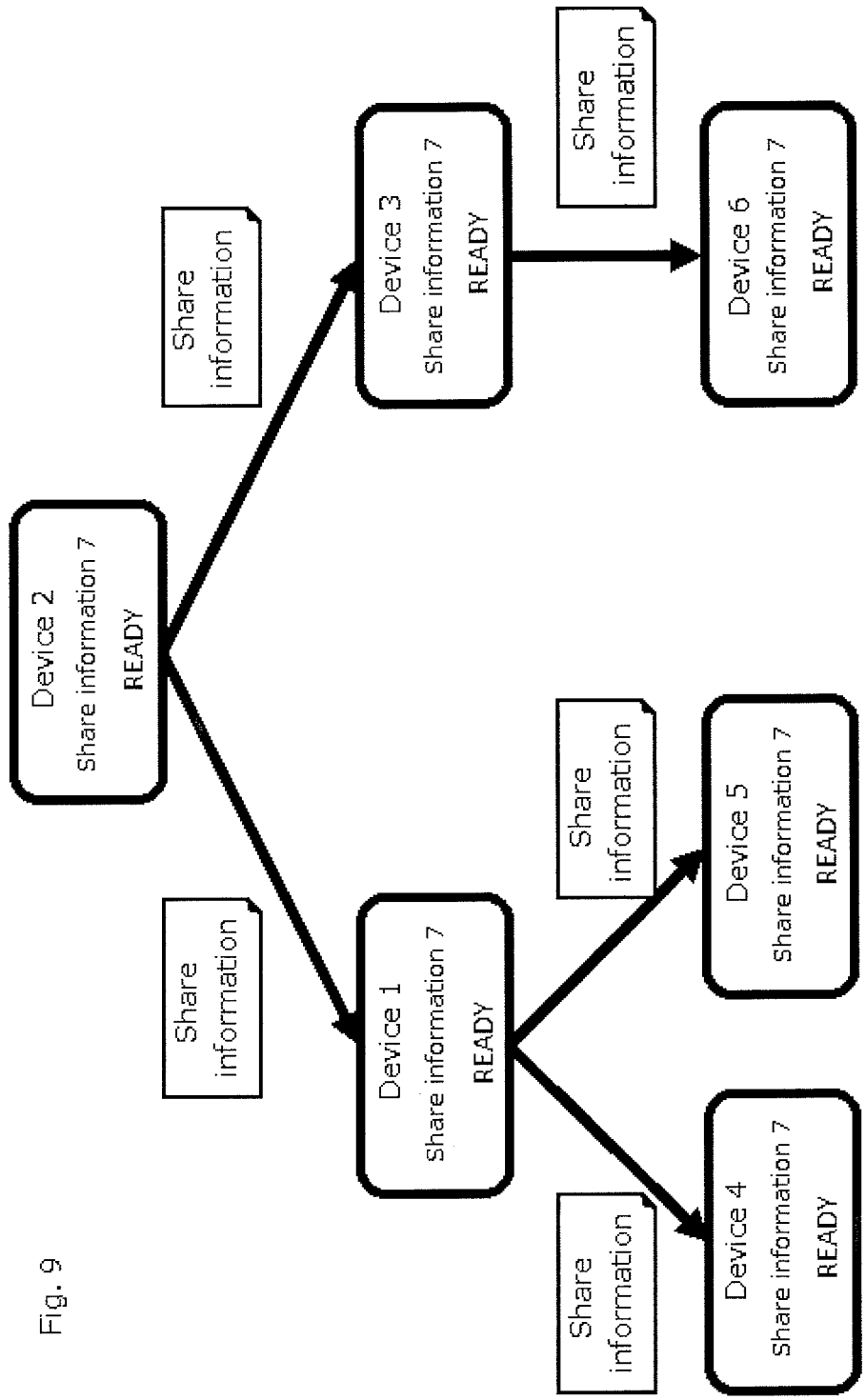
FIG. 9 is an explanatory diagram of distribution of share information.

FIG. 9 illustrates processing for distributing share information (network share information). The CPU 21 of the device 2 transmits the generated share information and the scheme information of the latest version to the client devices 1 and 3. The CPU 11 of the device 1 stores the received share information and the scheme information in the memory 12 and transmits them to the client devices 4 and 5. The CPU 41 of the device 4 and the CPU 51 of the device 5 store the received share information and scheme information in the memories 42 and 52, respectively. Further, the CPU 31 of the device 3 stores the received share information and scheme information in the memory 32, and transmits them to the client device 6. The CPU 61 of the device 6 stores the received share information in the memory 62. As a result, all the devices 1 to 6 retain the same share information (this is share information 7) and the scheme information.

<Change of Share Information>

All the devices 1 to 6 that configure the network system without determining a specific device as the host can retain the same share information, but thereafter any device may change the share information. Such processing for changing share information is described below.

Figure 10:
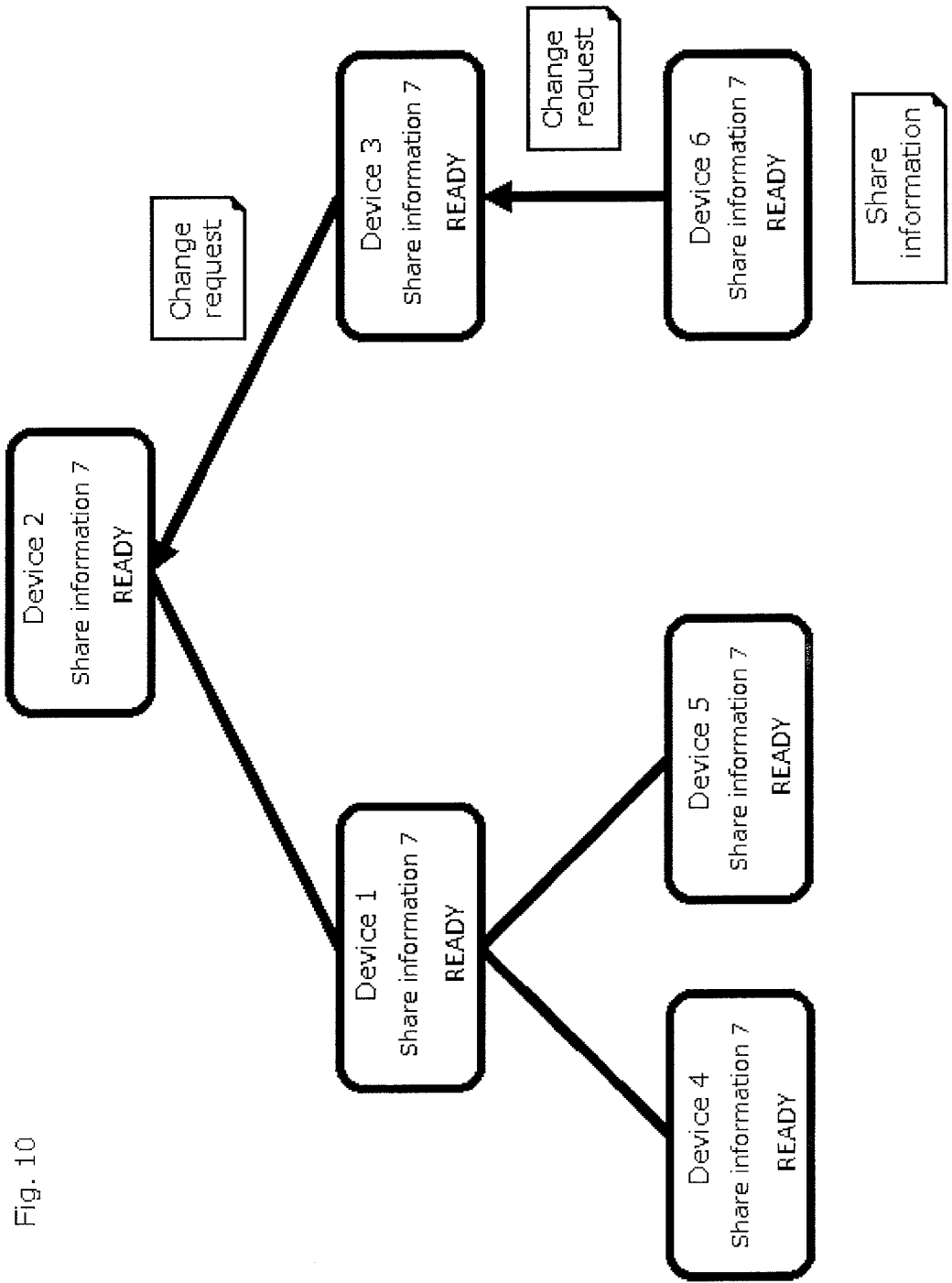
FIG. 10 is an explanatory diagram of a change of share information.

FIG. 10 illustrates a case where the share information of the device 6 in the devices 1 to 6 is changed. The change of the share information means, for example, version updating of a program of the device 6.

In this case, the CPU 61 of the device 6 generates finite difference information between the share information (share information 7) already stored in the memory 62 and the changed information, namely, information about the changed portion so as to transmit it to the device 3 in the hierarchy one level up.

When the CPU 31 of the device 3 receives the finite difference information from the client device 6, it transmits the finite difference information to the device 2 in the hierarchy one level up.

When the CPU 21 of the host device 2 receives the finite difference information, it rewrites the share information (share information 7) stored in the memory 22 according to the finite difference information so as to store the rewritten information as new share information in the memory 22. At this time, the CPU 21 determines whether the new share information matches with the scheme information. Incase that the CPU 21 determines that the new share information does not match with the scheme information, it discards the new share information. In case that the CPU 21 determines that the new share information matches with the scheme information, it transmits the finite difference information to the client devices 1 and 3, and transmits a command for rewriting the share information according to the finite difference information. When the CPU 11 of the device 1 and the CPU 31 of the device 3 receive the finite difference information, they rewrite the share information stored in the memories 12 and 32, respectively, according to the finite difference information. At this time, the CPUs 11 and 31 determine whether the new share information matches with the scheme information. In case that the CPUs 11 and 31 determine that the new share information does not match with the scheme information, they discard the new share information. In case that the CPU 11 determines that the new share information matches with the scheme information, it transmits the finite difference information to the client devices 4 and 5. In case that the CPU 31 determines that the new share information matches with the scheme information, it transmits the finite difference information to the client device 6. When the CPUs 41 to 61 of the devices 4 to 6 receive the finite difference information, they rewrite the share information stored in the memories 42 to 62 according to the finite difference information. At this time, the CPUs 41 to 61 determine whether the new share information matches with the scheme information. In case that the CPUs 41 to 61 determine that the new share information does not match with the scheme information, they discard the new share information.

Figure 11:
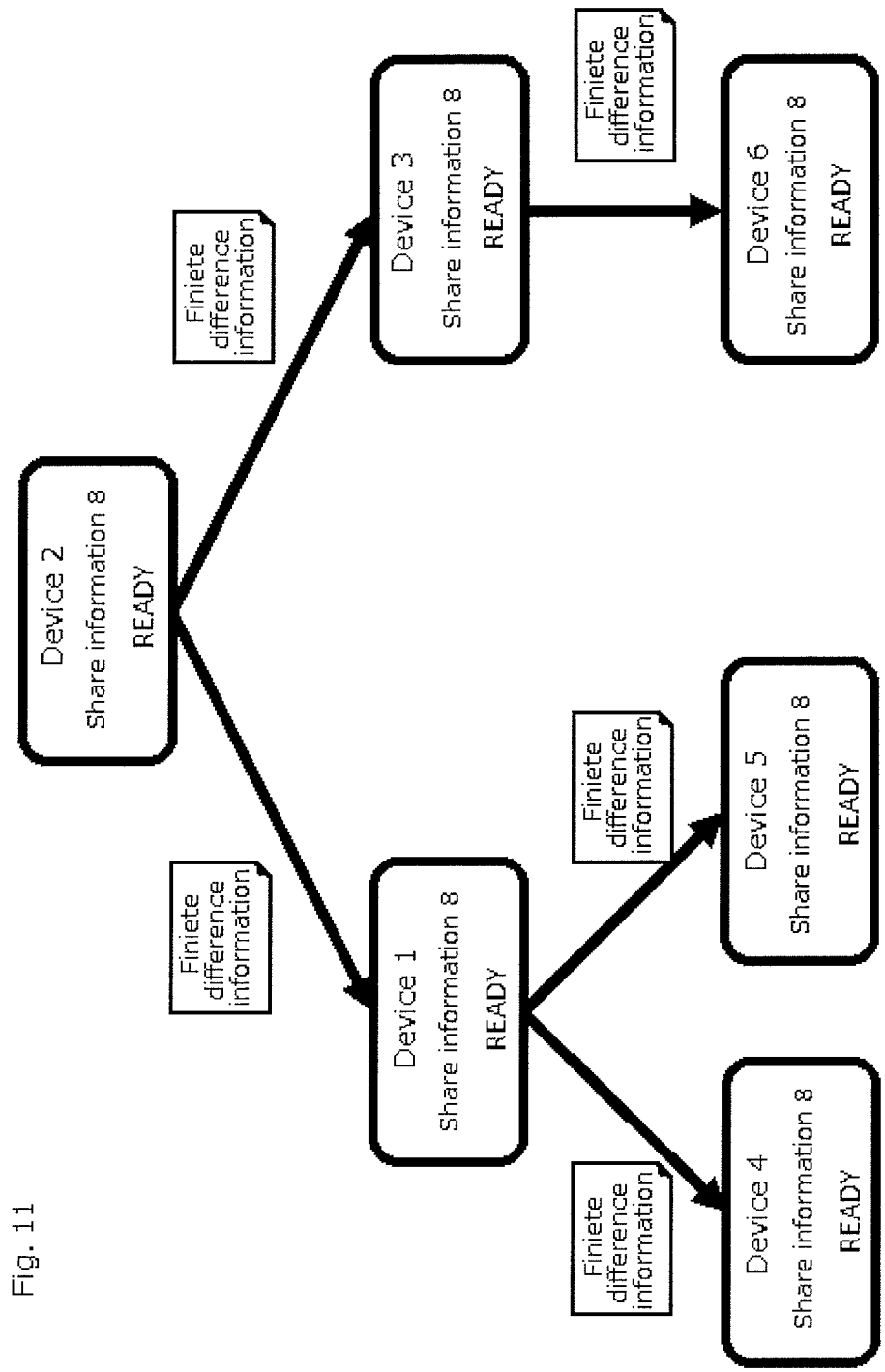
FIG. 11 is an explanatory diagram of distribution of finite difference information.

It is noted that also in the device 6 as a changing source, after the finite difference information is received from the host device 2, the share information about the self device is rewritten. As a result, as shown in FIG. 11, all the devices 1 to 6 retain the changed share information (this is determined as share information 8).

The CPU 21 of the host device 2 does not distribute the finite difference information but may distribute the changed share information (share information 8) to the other devices 1 and 3 to 6.

<Occurrence of Communication Failure>

Processing when a communication failure occurs is described below.

Figure 12:
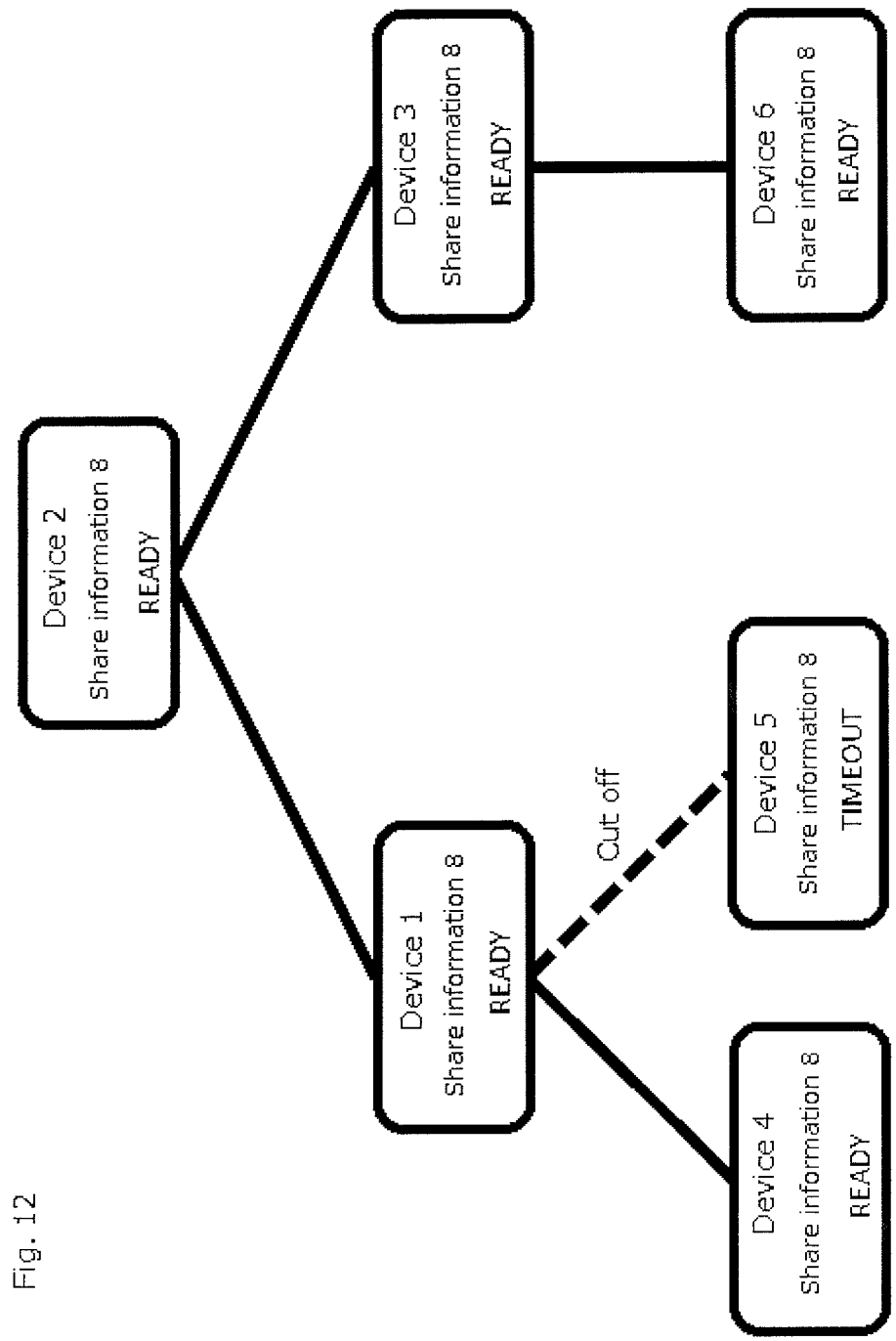
FIG. 12 is an explanatory diagram of communication failure.

A defect occurs in any device of the devices 1 to 6 connected to the network 10, for example, in the device 5, and the device 5 is disconnected from the network 10. As a result, as shown in FIG. 12, the connection between the device 1 and the device 5 is cut off. In this case, since plan data that is generated in the host device 2 and is distributed to the other devices is inaccurate, the reconstruction of the network system is necessary.

In the present embodiment, all the connections of the device connected to the cut-off device are cut off. This cut-off is sequentially propagated to the devices, so that all the connections between the adjacent devices structuring the network system are cut off.

Figure 13:
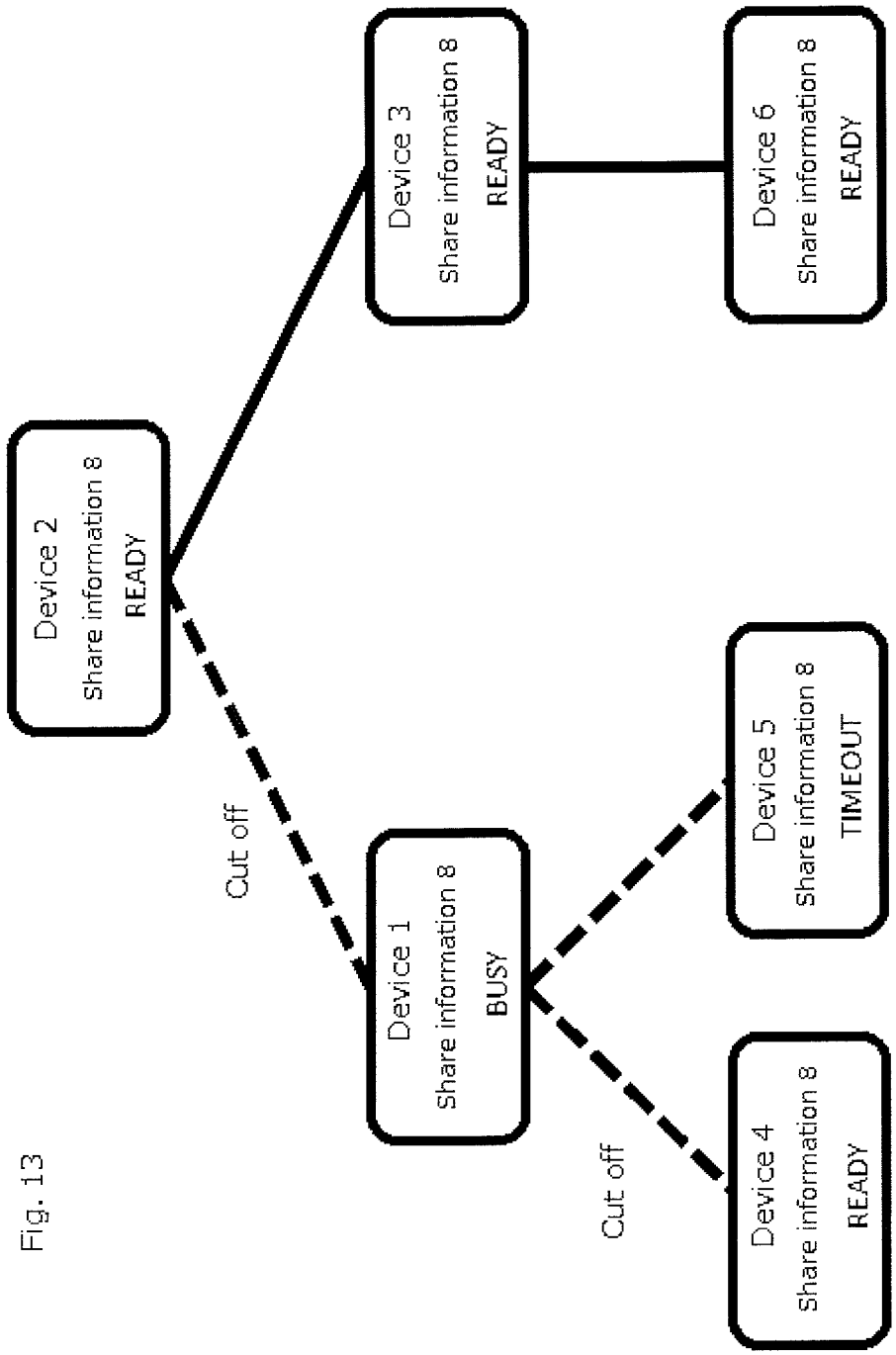
FIG. 13 is an explanatory diagram (1) of cut-off from a network.
Figure 14:
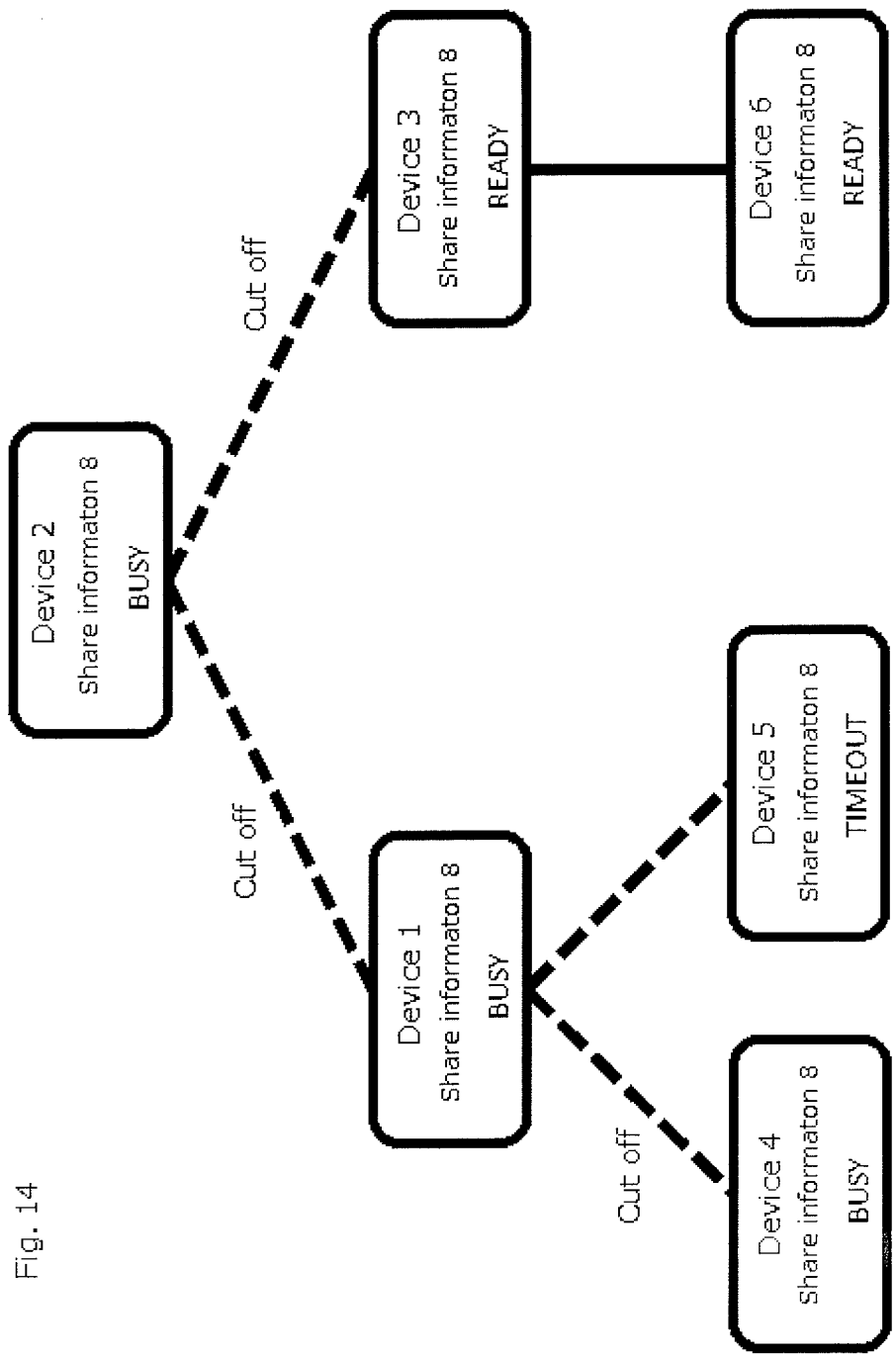
FIG. 14 is an explanatory diagram (2) of cut-off from the network.
Figure 15:
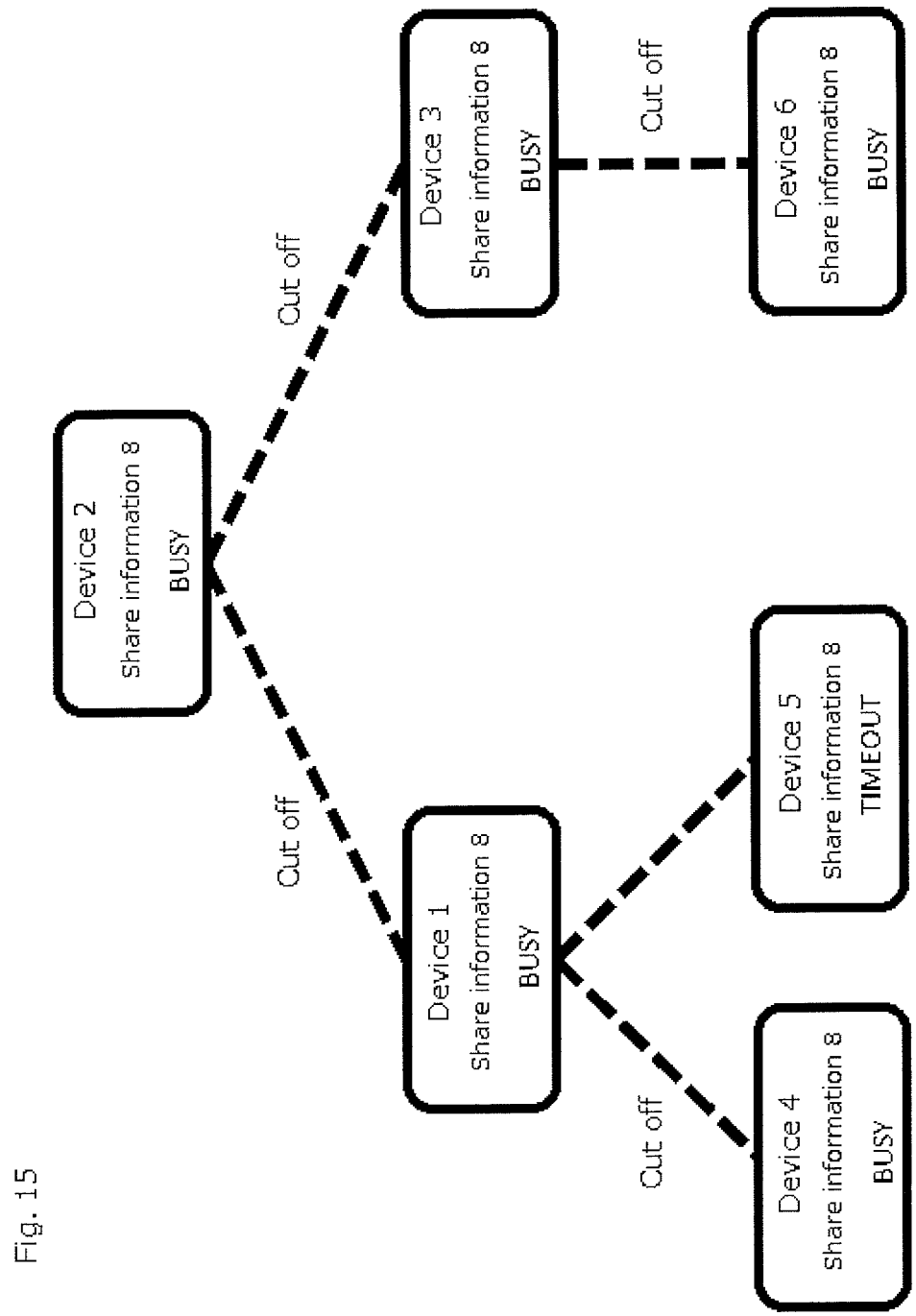
FIG. 15 is an explanatory diagram (3) of cut-off from the network.

That is to say, when the connection between the device 1 and the device 5 is cut off, as shown in FIG. 13, the CPU 11 of the device 1 detects the cut-off of the connection with the device 5 so as to cut off the other connections between the device 1 and the device 4 and between the device 1 and the device 2. The CPU 21 of the device 2, as shown in FIG. 14, detects the cut-off of the connection with the device 1 so as to cut off the other connection with the device 3. The CPU 31 of the device 3, as shown in FIG. 15, detects the cut-off of the connection with the device 2 so as to cut off the other connection with the device 6. As a result, all the connections of the devices 1 to 6 structuring the network system are cut off.

Thereafter, the processing for setting a host, creating and distributing a plan, collecting and distributing share information is again executed, so that the network system is restructured.

The processing in the present embodiment is described in more detail below.

<Details of the Setting of Host Device>

Details of the setting of the host device are described first.

The devices 1 to 6 connected to the network 10, as shown in FIG. 1, has the CPUs 11 to 61, and the memories 12 to 62. The memories 12 to 62 of the devices 1 to 6 store device numbers of self devices, network strengths (strength values in the network system) that are parameters representing strengths. The device numbers may be any numbers as long as they are unique in the network system, and they are, for example, IP addresses, MAC addresses, and numbers allocated to devices before shipping. The network strength is an index of performance of the self device in the network system, and any physical quantities such as CPU performance that can be compared between the devices can be used. For example, the network strength is +10 in a case of wired connection, 0 in a case of wireless connection, +3 in a case where a response to ping with respect to a rooter is 1 ms or less, and a value that becomes larger as the time between transmission of an echo and return is shorter. The network strength can be defined as a parameter obtained by collectively making quantitative evaluation on the device performance, such as the performance of the CPU of the device and the certainty of connection, and a data speed, and the connecting relationship.

Figure 16:
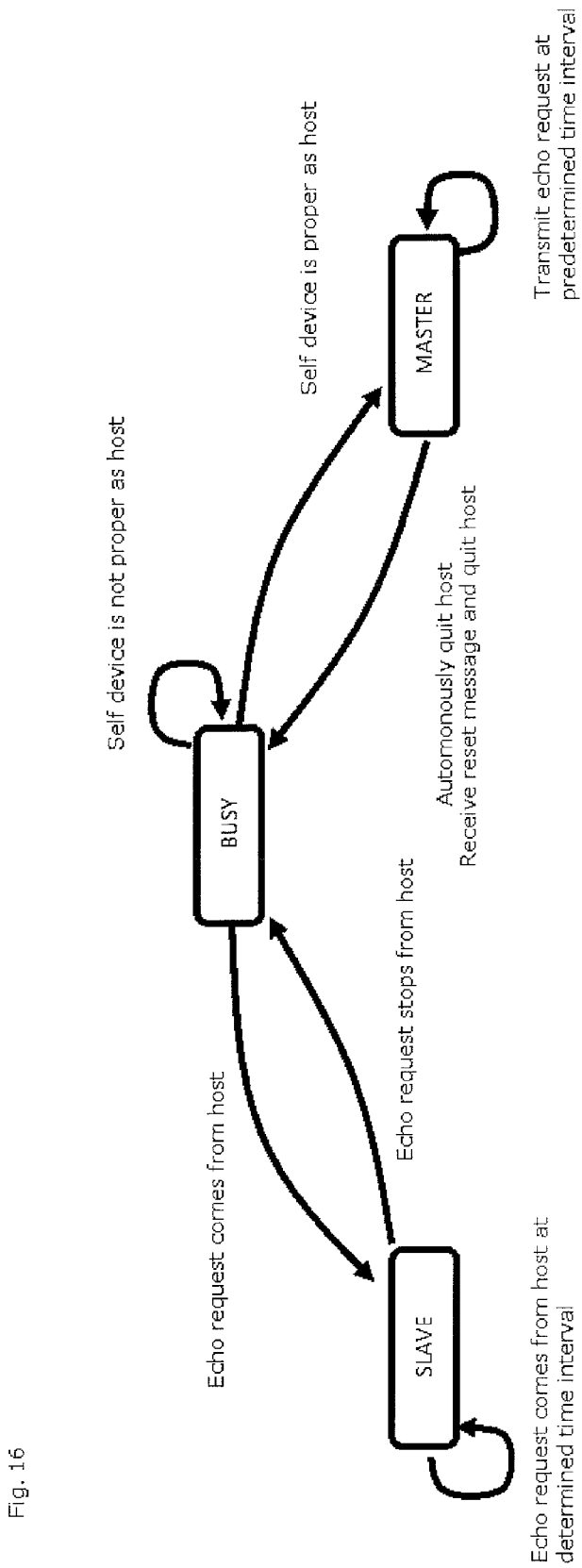
FIG. 16 a state shift diagram of devices.

FIG. 16 illustrates a state shift (state transition) of the devices 1 to 6. All the devices 1 to 6 are in an initial state, namely, in a BUSY state (first state) just after the power is turned on. The CPU of the device in the BUSY state broadcasts an echo request message and obtains devices around the self device. In case that the CPU determines that the self device is not proper as the host, the BUSY state is maintained. On the other hand, the CPU of the device that determines that the self device is proper as the host makes the self device to change from the BUSY state into a MASTER state (second state), and transmits the echo request at a predetermined time interval. Further, the CPU of the device in the MASTER state autonomously quits the host due to any reason or receives a resetting message so as to quit the host, it makes the self device to change from the MASTER state into the BUSY state. Further, when the CPU in the BUSY state receives the echo request transmitted from the host, it makes the self device to change form the BUSY state into the SLAVE state (third state). When the CPU receives the echo request transmitted from the host at a predetermined time interval, the CPU maintains the SLAVE state. When the echo request transmitted from the host at a predetermined time interval is stopped, the CPU makes the self device change from the SLAVE state into the BUSY state.

Therefore, all the devices 1 to 6 are in the BUSY state in the initial state. The CPU of the host device that determines the self device is the host device makes the self device change form the BUSY state into the MASTER state so as to continue to transmit the echo request at a predetermined time interval. The CPU of the device that receives the echo request from the host device makes the self device change from the BUSY state into the SLAVE state, and maintains the SLAVE state as long as it receives the echo request at a predetermined time interval. The CPU of the device that changes into the SLAVE state responds only to the echo request from another device, and does not search for an echo. The CPU of the device that changes into the SLAVE state receives a device list attached to the echo request message from the host device so as to understand peripheral devices.

In the present embodiment, the message that is transmitted and received by the devices 1 to 6 connected to the network 10 includes at least:

IP address of a transmission device;
as to whether the self device is the host;
a command;
a region code; and
a protocol version.

Further, the command includes the followings.
(1) command name: initialization request
  Adjunct data: None
  Contents: Message about starting from the resetting state to the other side
(2) Command name: initialization response
  Adjunct data: None
  Contents: Message about host's authorization of initialization
(3) Command name: Echo request
  Adjunct data: List of IP addresses of the devices obtained by the host (only host)
  Contents: the CPU of the device (node) receiving this message returns an echo result message to the transmission device regardless of whether the self device is the host
(4) Command name: Echo result
  Adjunct data: None
  Contents: Response to the echo request message
(5) Command name: Rest
  Adjunct data: None
  Contents: Transmission when the host is already determined and the host is made to quit
(6) Command name: Terminate
  Adjunct data: None
  Contents: This is a message to be transmitted from a device that is going to be cut off from the network 10, and the CPU of the device (node) receiving this message deletes this device from the device list stored in the memory.

A region code is a code for identifying a common region. Since the CPU of the device that receives a message that the region is different from that of the self device ignores that message, it regards that the message is not practically received. Further, since devices whose regions are different from each other have different protocols of the system and a malfunction might occur, these devices are ignored. That is to say, the devices having different regions do not structure the same network system.

Figure 17:
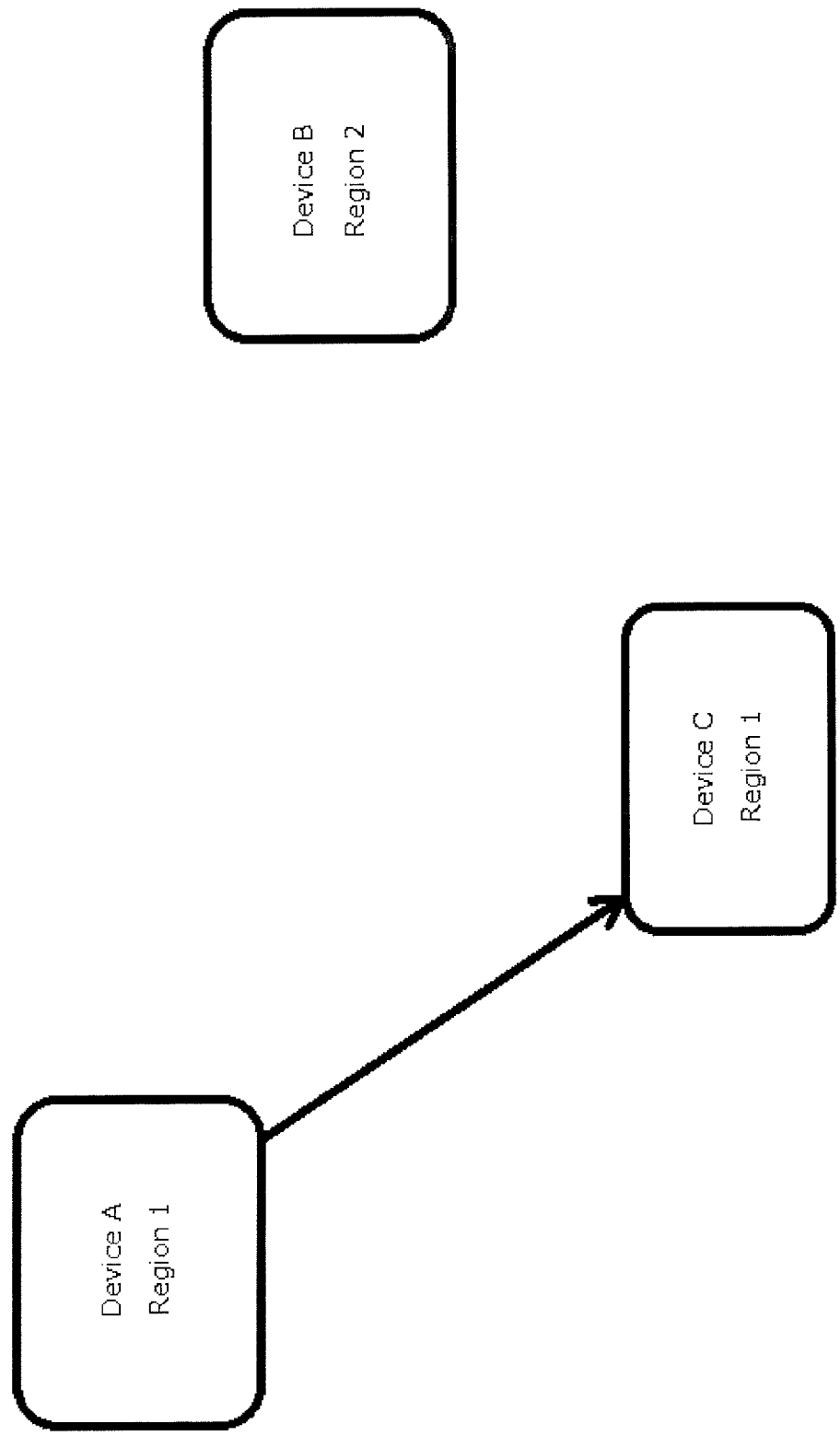
FIG. 17 is a region explanatory diagram.

FIG. 17 illustrates devices A and C belonging to a region 1, and a device B belonging to a region 2. A message from the device A to the device C is received and interpreted because their regions are the same as each other. On the other hand, a message between the device A and the device B is ignored because their regions are different from each other. Therefore, the CPU of the device A does not recognize the device B, and the CPU of the device B does not recognize the device A.

Concrete processing for setting the host device is described below.

When the devices 1 to 6 are powered on to be activated, the CPUs of the devices make the self devices change into the BUSY state as described above. In the BUSY state, each CPU broadcasts the initialization request message and echo request message.

The CPU of the device that receives any message adds a device to which an echo is transmitted to the device list stored in the memory, and determines whether the self device is proper as the host. In case that the CPU determines that the self device is proper as the host, it makes the self device change from the BUSY state into the MASTER state. In case that the device that transmits the echo is also the host (the determination is made that that it is proper as the host), the CPU determines which is proper as the host. In case that the CPU determines that the self device is proper as the host, it again transmits the echo request to the device that transmits the echo to the self device. In case that the CPU determines that the device that transmits the echo is proper as the host, the self device quits the host. In this case, the CPU makes the self device change from the MASTER state into the BUSY state.

The CPU of the device that receives the echo request returns an echo result message to the device that transmits the echo. In case that the message is from the host, the CPU adds the device described in the device list attached to the message to the device list stored in the memory so as to update the device list. Further, when the message is from the host, the CPU makes the self device change from the BUSY state into the SLAVE state.

In case that the CPU does not receive the initialization result message at a predetermined time interval, it again transmits the initialization request. Further, the CPU deletes a device whose life set at the time of registering it in the device list ends among the devices described in the device list from the device list. In case that the CPU determines that no host is present in the device list and the self device is proper as the host in the device list, it makes the self device change from the SLAVE state into the MASTER state. When the self device becomes the host and the CPU makes the self device change into the MASTER state, the CPU transmits the echo request message attached with the device list stored in the memory at a predetermined time interval.

The determination whether the device is proper as the host is made as follows. That is to say, device numbers and network strengths are given to the devices 1 to 6, respectively, and the device list includes the device numbers and the network strengths. The CPUs 11 to 61 of the devices 1 to 6 refer to the network strengths in the device list stored in the memories 12 to 62 of the respective self devices, and set a device whose network strength is stronger (larger parameter) as the host preferentially. Further, in case that the network strengths are equal to each other, the CPUs 11 to 61 of the devices 1 to 6 determine the host based on the device numbers.

Figure 18:
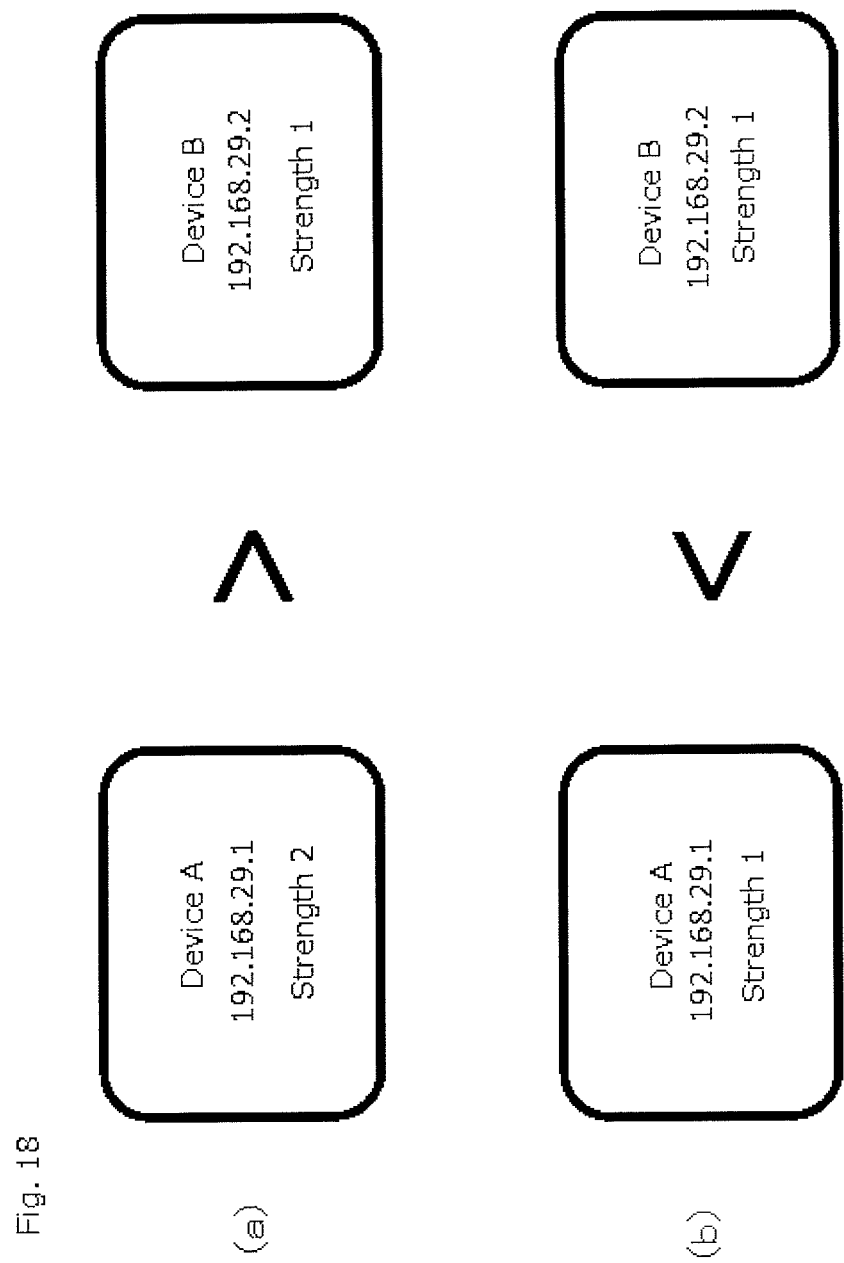
FIG. 18(a) is a first explanatory diagram (1) of processing for setting a host device.
FIG. 18(b) is a second explanatory diagram (1) of processing for setting a host device.

FIGS. 18(a) and 18(b) illustrate a comparative example of the network strengths. In FIG. 18(a), in case that the network strength of the device A is 2 and the network strength of the device B is 1, the device A is set as the host. In FIG. 18(b), in case that the network strength of the device A is 1 and the network strength of the device B is 1, the network strengths are equal to each other. For this reason, the device B whose device number (in this case, IP address) is larger is set as the host.

Figure 19:
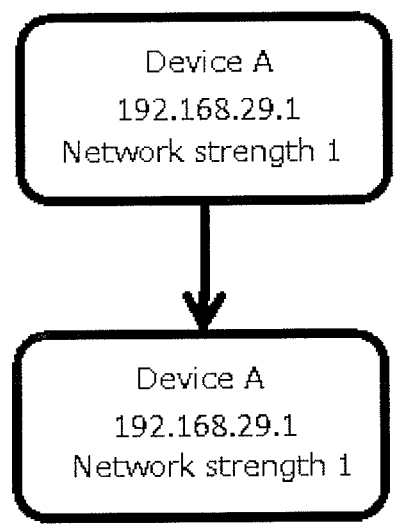
FIG. 19 is an explanatory diagram (2) of the processing for setting the host device.

FIG. 19 illustrates a case where only one device is connected to the network 10. In case that only the device A is present at the time of activation, the CPU of the device A makes the self device change into the BUSY state after the activation, so as to transmit the echo request. At this time, since another device is not connected to the network 10, a certain period of time passes without a response. Therefore, the CPU of the device A sets the self device in the device list stored in the memory as the host, and makes the self device change into the MASTER state.

Figure 20:
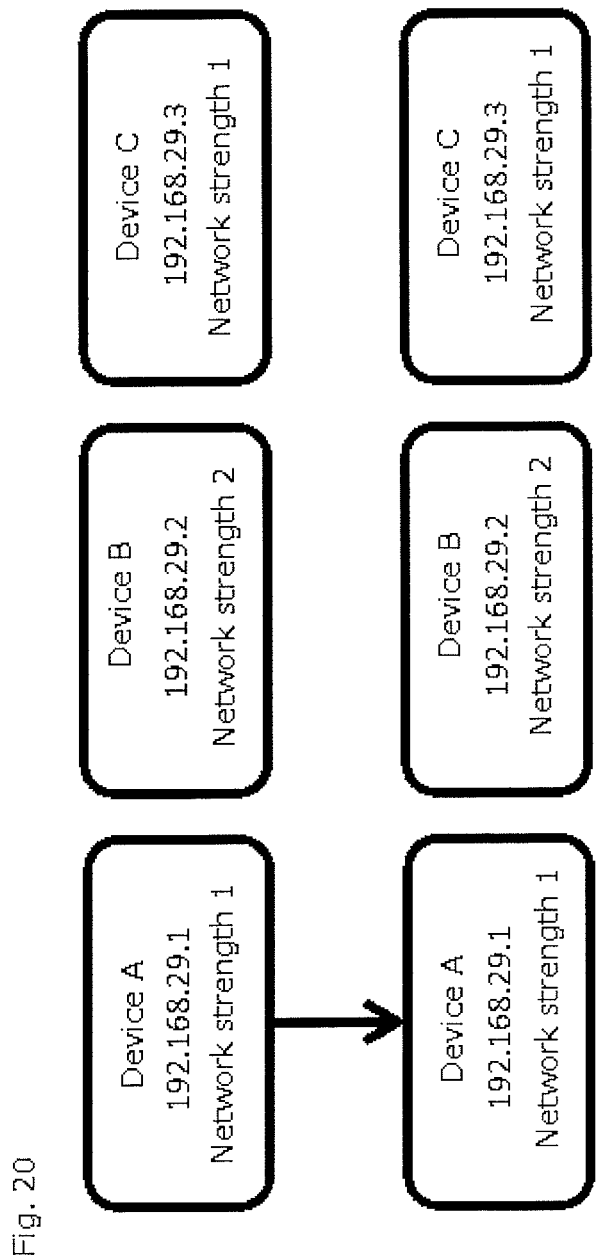
FIG. 20 is an explanatory diagram (3) of the processing for setting the host device.

FIG. 20 illustrates a case where a plurality of devices are connected to the network 10 and a host is already present at the time of activation. The device B changes into the MASTER state, and the device C changes into the SLAVE state. When the device A is activated, the CPU of the device A makes the self device change into the BUSY state, and receives the echo request transmitted from the host device B so as to make the self device change from the BUSY state into the SLAVE state.

Figure 21:
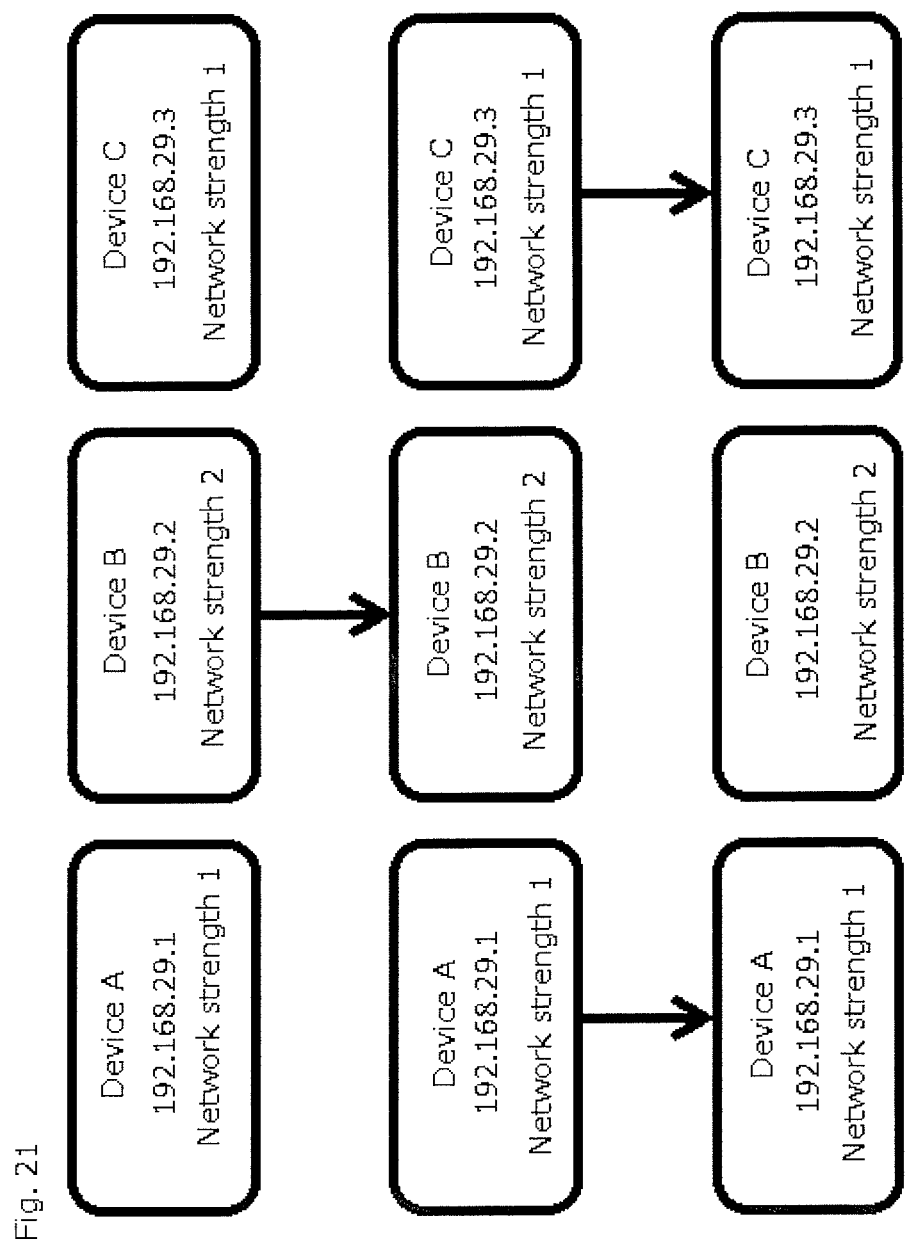
FIG. 21 is an explanatory diagram (4) of the processing for setting the host device.

FIG. 21 illustrates a case where the plurality of devices are connected to the network 10 and are activated at the same time. The CPUs of the devices A, B, and C make the self devices change into the BUSY state after their activation. The CPUs of the devices A, B, and C refer to the network strengths (in case that the network strengths are equal to each other, the device numbers are referred to) in the device lists stored in the memories, respectively, so as to determine whether the self devices are proper as the host. In the drawing, in case that the network strengths of the devices A, B, and C are 1, 2, and 1, respectively, the CPU of the device B determines that the self device is the most proper as the host, and makes the self device change from the BUSY state into the MASTER state. Further, the CPU of the device B transmits the echo request message to the other devices. The CPUs of the devices A and C that receive the echo request message from the host makes the self device change from the BUSY state into the SLAVE state.

Figure 22:
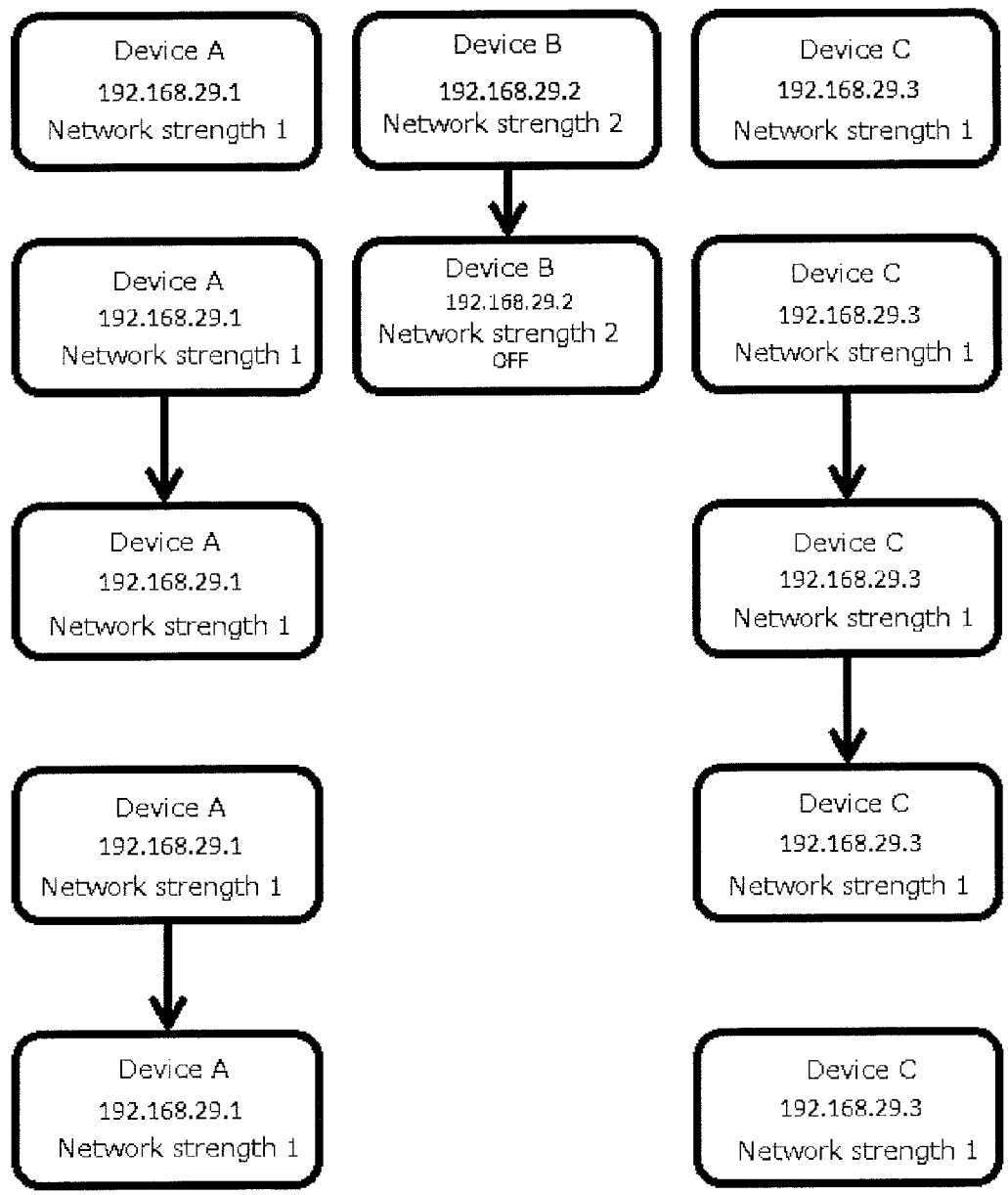
FIG. 22 is an explanatory diagram (5) of the processing for setting the host device.

FIG. 22 illustrates a case where a response from the host is stopped in the state of FIG. 21 due to any cause. When a response from the host device B is stopped, the CPUs of the devices A and C detect that the response from the host is stopped after a certain period of time passes so as to make the self device change from the SLAVE state into the BUSY state. When a certain period of time further passes, the CPUs of the devices A and C determine whether the self devices are proper as the host device. The CPU of the device C whose network strength is the same but device number is larger determines that the self device is proper as the host, and makes the self device change from the BUSY state into the MASTER state. The CPU of the device C transmits the echo request message to another device (the device A). The CPU of the device A that receives the echo request message makes the self device change from the BUSY state into the SLAVE state.

In the present embodiment, in case that the network strengths are equal to each other, a device whose device number is larger is determined as the host device, but a device whose device number is the smallest may be determined as the host device.

<Details of Generation and Distribution of Plan Data>

Details of the generation and the distribution of plan data are described below.

Examples of messages transmitted and received in the network system having a host are as follows.

Figure 23:
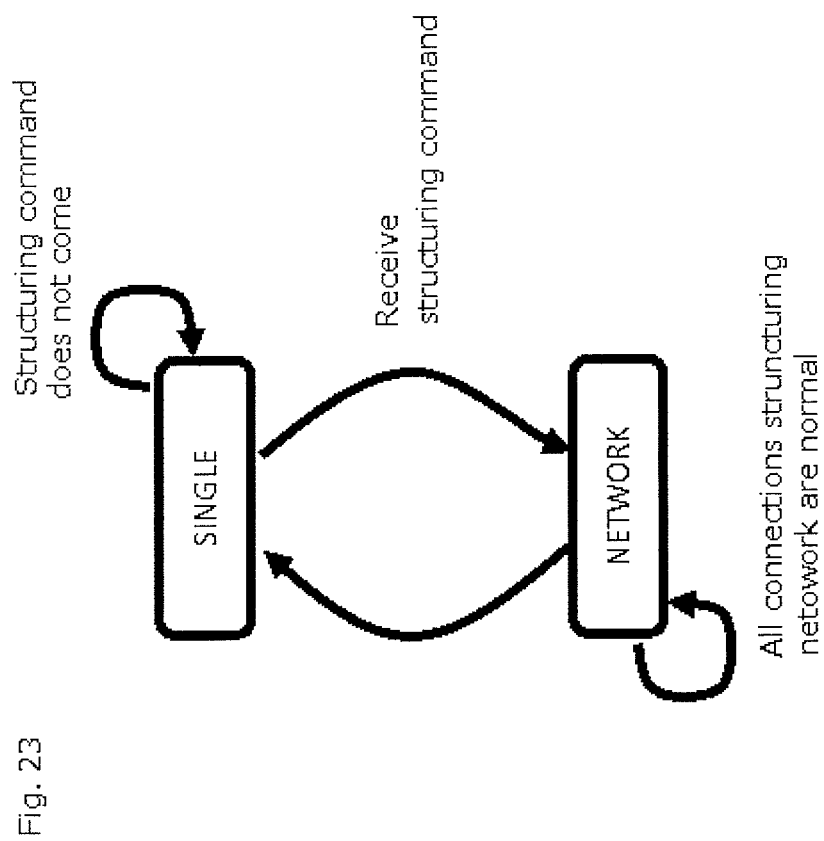
FIG. 23 is a state shift diagram of a device.

(1) Command name: Structure
　Adjunct data: Plan data
　Contents: Message that a host transmits when the network system is structured (2) Command name: Direct cast
　Adjunct data: Data
　Contents: Message that is used for data transmission and reception which the opposed device is directly connected and terminated when the data transmission is completed (3) Command name: Unicast
　Adjunct data: Address, data
　Contents: Message that is used when data is transmitted to a specific device by using the network system (4) Command name: Broadcast
　Adjunct data: Data
　Contents: Message that is used when data is transmitted to a specific device by using the network system (5) Command name: Multicast
　Adjunct data: Address list, data
　Contents: Message that is used when data is transmitted to a plurality of devices in the network system FIG. 23 illustrates a state shift (state transition) of each of devices connected to the network 10. Each of the devices connected to the network 10 are brought into a SINGLE state or a NETWORK state. The NETWORK state is a state where all connections structuring the network system are normal. The SINGLE state is a stand-alone state where the network system is not structured, and thus in the initial state. When the structure message is not transmitted, the CPUs of the devices are maintained in the SINGLE state. When the structure message is received, the CPUs of the devices make the self devices change from the SINGLE state into the NETWORK state.

Figure 24:
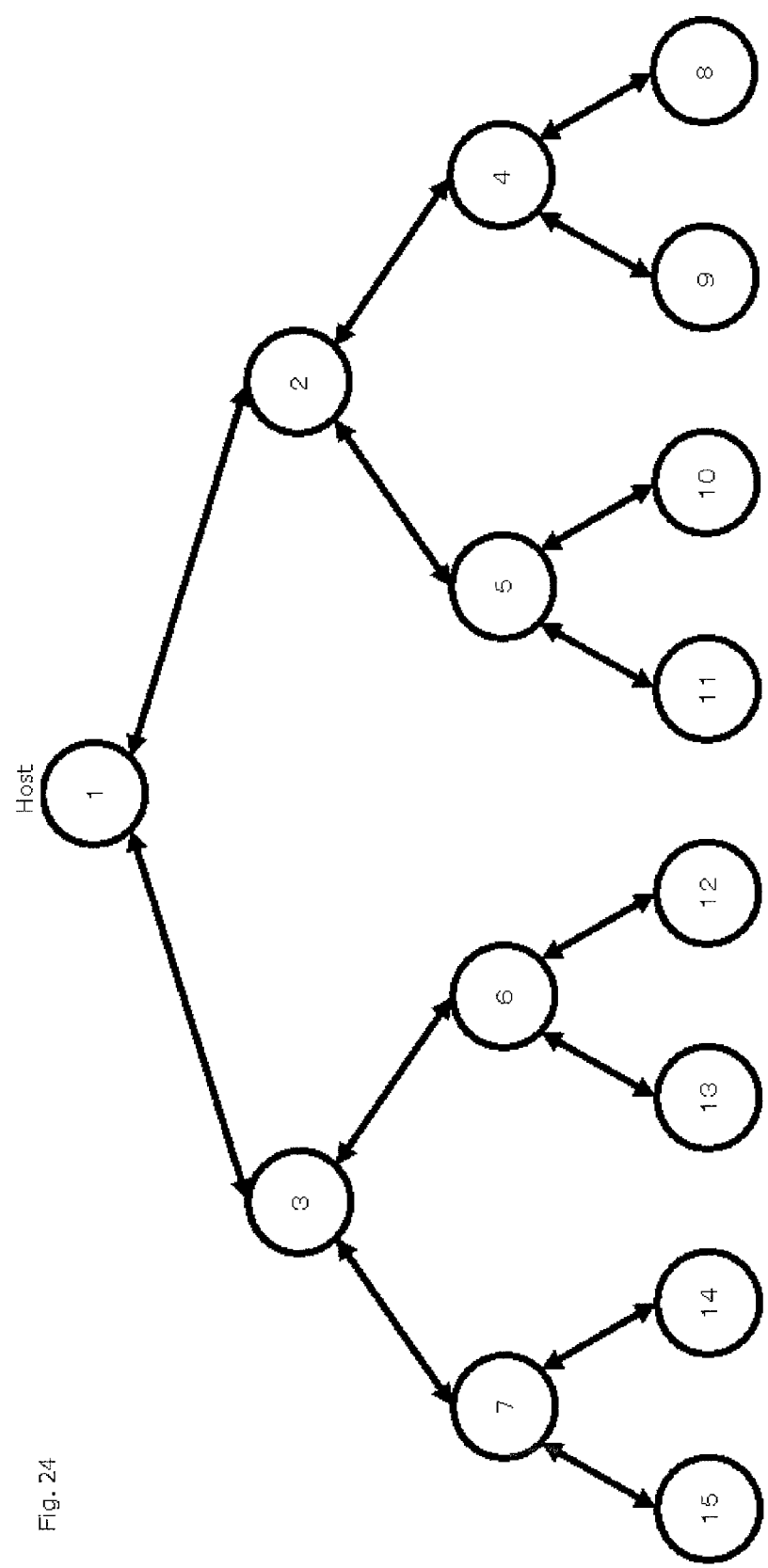
FIG. 24 is an explanatory diagram (1) of a binary tree structure.

FIG. 24 illustrates a concrete connecting relationship of the network system. Similarly to the case shown in FIG. 4, a plurality of devices are connected into a binary tree shape in which the host is at the top. Numbers are allocated to the devices, respectively, according to connecting places as shown in the drawing. That is to say, the number of the host is 1, and a value obtained by doubling the number of the host or a value obtaining by adding 1 to the former obtained value are allocated to the client. Therefore, when the host has the number 1, the numbers of its clients are 2 and 3, the numbers of the clients of the host 2 are 4 and 5, the numbers of the clients of the host 3 are 6 and 7, the numbers of the clients of the host 4 are 8 and 9, the numbers of the clients of the host 5 are 10 and 11, the numbers of the clients of the host 6 are 12 and 13, and the numbers of the clients of the host 7 are 14 and 15.

Figure 25:
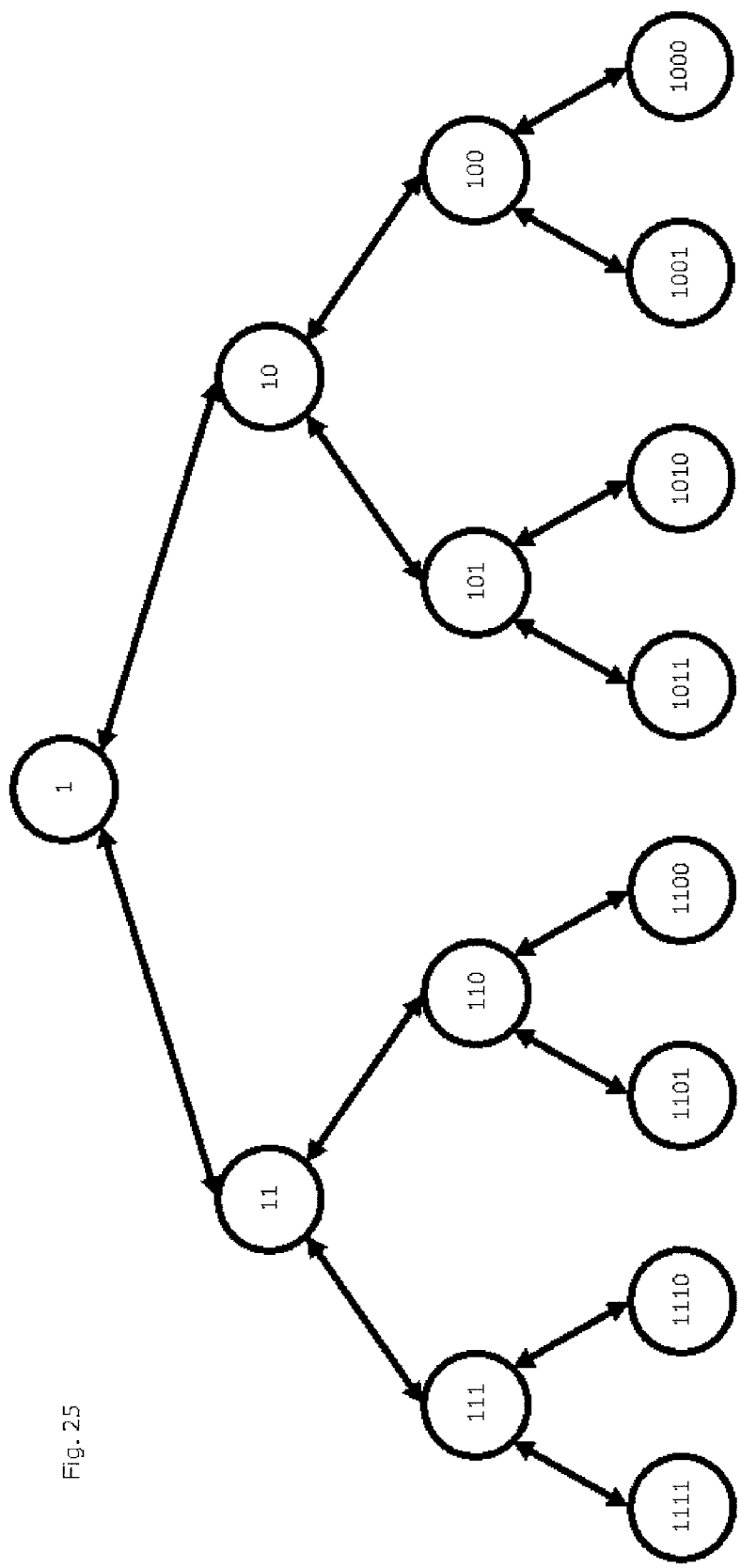
FIG. 25 an explanatory diagram (2) of the binary tree structure.

FIG. 25 illustrates binary notation of the numbers shown in FIG. 24. Number 2 is "10", number 3 is "11", and hereinafter the same applies; number 8 is "1000", and number 15 "1111".

The numbers to be allocated to the clients are always numbers obtained by shifting the numbers of hosts to left by one bit, or values obtained by adding 1 to the obtained numbers. For example, "100" is obtained by shifting "10" of the host to left by 1 bit, and "101" is a value obtained by shifting "10" of the host to left by 1 bit and adding 1 to the shifted value. Similarly, "1110" is a value obtained by shifting "111" of the host to left by 1 bit.

In the present embodiment, the numbers are expressed by a binary digit, but an N digit (N is a natural number that is 2 or more), and numbers can be allocated simultaneously in an N tree. When the number of devices exceeds a certain number and not a signal load but a signal delay is concerned, it is suitable that delay in a binary tree is repressed as ternary or more tree.

Figure 26:
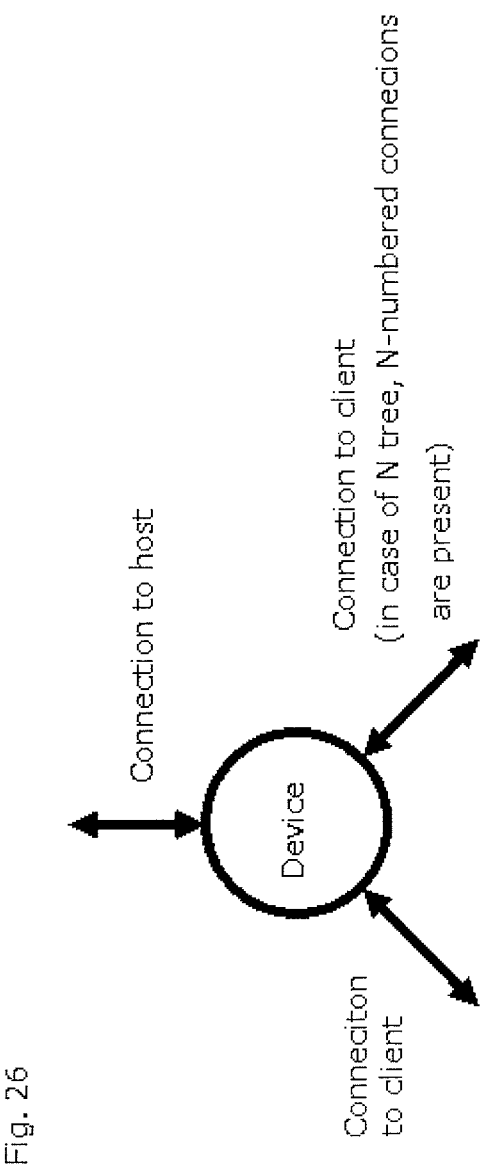
FIG. 26 is an explanatory diagram illustrating a connecting relationship of the binary tree structure.

FIG. 26 illustrates any one device in the network system shown in FIG. 25. A certain device has connection to the host and connection to client. In the case of the binary tree, two clients are connected.

Figure 27:
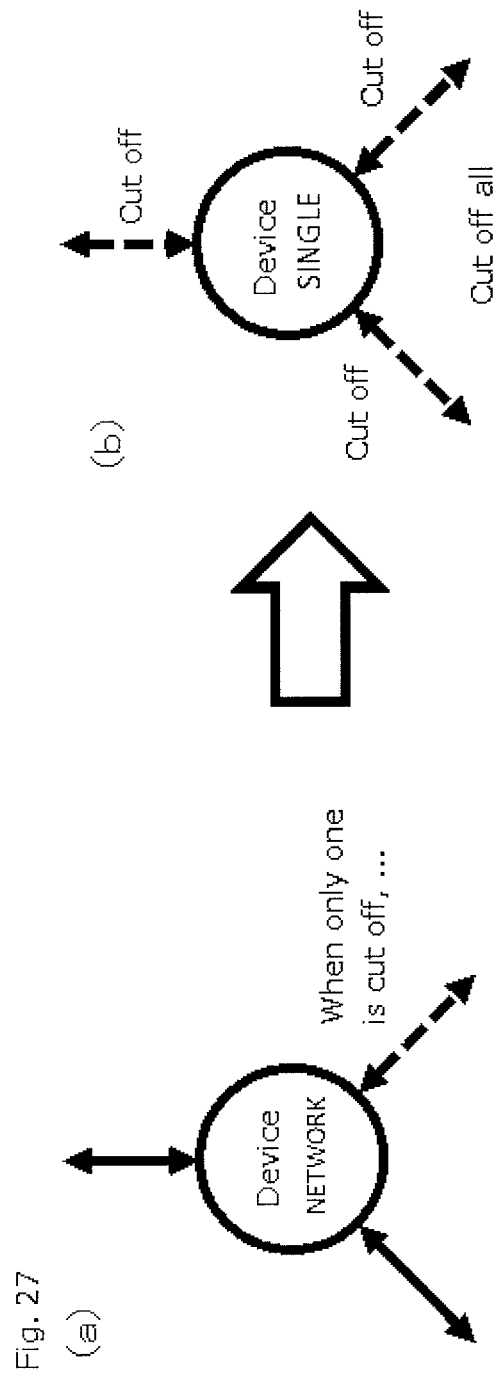
FIG. 27(a) is a first explanatory diagram illustrating cut-off of the binary tree structure.
FIG. 27(b) is a second explanatory diagram illustrating cut-off of the binary tree structure.

FIGS. 27(a) and 27(b) illustrate a case where any connection is cut off. When any one of the connection to the host and the connection to the client is cut off as shown in FIG. 27(a) (in the drawing, one of the connections of the clients), the CPU of the device detects the cut-off and cuts off all the connections (in the drawing, the connection to the host and the connection to the clients) as shown in FIG. 27(b). Since the CPU of the cut-off device also terminates another connection similarly to this device, the cut-off of all the devices structuring the network system immediately propagates, and the network system is crashed.

FIG. 28 illustrates one example of plan data generated in the host. The plan data is device list data in which the host is at the top and the devices connected to the network 10 are arranged in decreasing order of the network strengths. The host is at the top and thereafter numbers 1, 2, 3, 4, . . . are allocated sequentially, and they are positions on the network system. That is to say, in the binary tree structure, the devices with numbers 2 and 3 are clients of the host 1, and the devices with numbers 4 and 5 are clients of the host 2. When a device with large network strength is arranged near the host preferentially, a message transmitted from the host is likely to be transmitted to the entire network system (all the devices).

When the CPU of the host device receives a network system structuring command, it sorts the device list in decreasing order of the network strengths, and adds the self device to the top of the device list. As a result, the plan data shown in FIG. 28 is generated. After the CPU of the host device generates the plan data, it connects the self device to the second and third devices in the plan data so as to transmit the structuring message. The CPU of the host device transmitting the structuring message makes the self device change from the SINGLE state into the NETWORK state.

When receiving the structuring message from the host, the CPU of the device determines, by collating the device number in the plan data and the device number of the self device, which position the self device is in from the plan data. For example, In case that the number of the self device is "192.168.29.1", it is found that the self device is in the second position with the host being at the top (client 2) by referring to the plan data. Similarly, in case that the number of the self device is "192.168.29.3", it is found that the self device is in the third position with the host being at the top by referring to the plan data. The CPU of the client device 2 and the CPU of the client device 3 connect the self devices to a device having a number obtained by doubling the number of the self device and a device having a number obtained by adding 1 to the obtained number, respectively, so as to transmit the structuring command. The CPU of the client device 2 and the CPU of the client 3 that transmit the structuring command make the self devices change from the SINGLE state into the NETWORK state. Hereinafter similarly, the plan data is distributed to all the devices connected to the network 10, and all the devices transit into the NETWORK state.

Further, when receiving the direct cast message, the CPU of the device receives the following data completely, and then cuts off the connection with the device that transmits the direct cast message.

When receiving the unicast message or the multi-cast message, the CPU of the device obtains an IP address of destination described in the message, and refers to the plan data and checks a number (destination number) corresponding to the IP address. Further, the CPU determines what bit the most significant bit of the destination number is present. For example, the determination is made that in case that the destination number is "0001", the CPU is present at the first bit, and in case that the destination number is "1000", it is present at the fourth bit.

(a) If a depth is the same as a depth of an destination number (the depth in the hierarchical structure of the network system shown in FIG. 22, and the depth is 1 at the top and is sequentially 2, 3, 4, . . . ), or is larger than a depth of the self device, the CPU transmits the unicast message to the host device.

(b) In a case other than (a), the destination number is divided by 2 until the depth becomes the same as that of the self device, and the obtained value is different from the number of the self device, the CPU transmits the unicast message to the host device.

(c) In a case other than (a) and (b), the CPU divides the destination number by 2 until the depth becomes larger by one than that of the self device, and it determines which of the client devices the self device is connected to so as to transmit the unicast message to the connected device.

Figure 30:
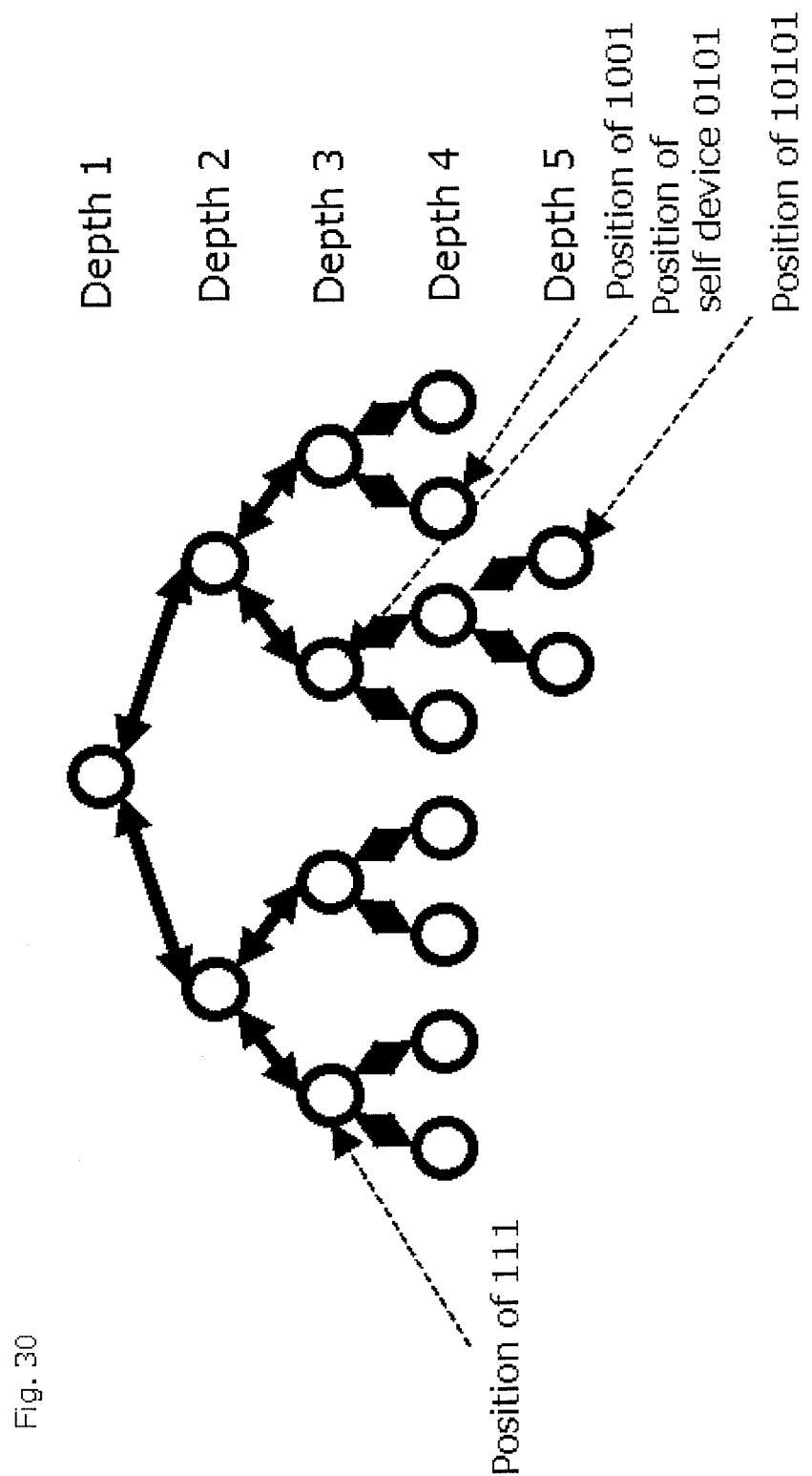
FIG. 30 is an explanatory diagram illustrating depth of the binary tree structure.

FIGS. 29(a) to 29 (c) illustrate the processing in the case of the unicast message, and FIG. 30 illustrates the depth of the network.

In FIG. 29(a), in case that the number of the self device is "0101" and the number of the destination is "0111", as shown in FIG. 30, the depth of the self device is 3 and the depth of the destination number is also 3. For this reason, the CPU of the device transmits the unicast message to the host device. This is because in case that the depth is the same as that of the self device, the host of the self device can only transmit the message to that device.

In FIG. 29(b), in case that the number of the self device is "0101" and the number of the destination is "1001", as shown in FIG. 30, the depth of the destination number is 4. The value of "1001" at the depth 3 is "100", and this becomes different from the self number. Therefore, also in this case, the CPU of the device transmits the message to the host.

In FIG. 29(c), in case that the number of the self device is "0101" and the number of the destination is "10101", as shown in FIG. 30, the depth of the destination number is 5. Since the value of "10101" at the depth 3 is "101" and matches with the number of the self device, the device of this destination is connected to the client of the self device. Therefore, in order to determine which of the two devices is connected, in case that the number of the destination at the depth 4 is referred to, it is "1010". Therefore, the CPU of the device transmits the message to the client of "1010".

When receiving the unicast command in such a manner, the CPU of the device transmits this message to the device of the destination surely and efficiently. In the case of the multicast message, a plurality of destinations for the unicast message is present. For this reason, the processing may be executed on each of the destinations similarly to the case of the unicast message.

When receiving the broadcast message, that data is also for the self device, and thus the CPU of the device receives and processes the message. The CPU of the device transmits the broadcast message directly to the device that is other than the device which transmits the message and is connected to the self device.

Figure 31:
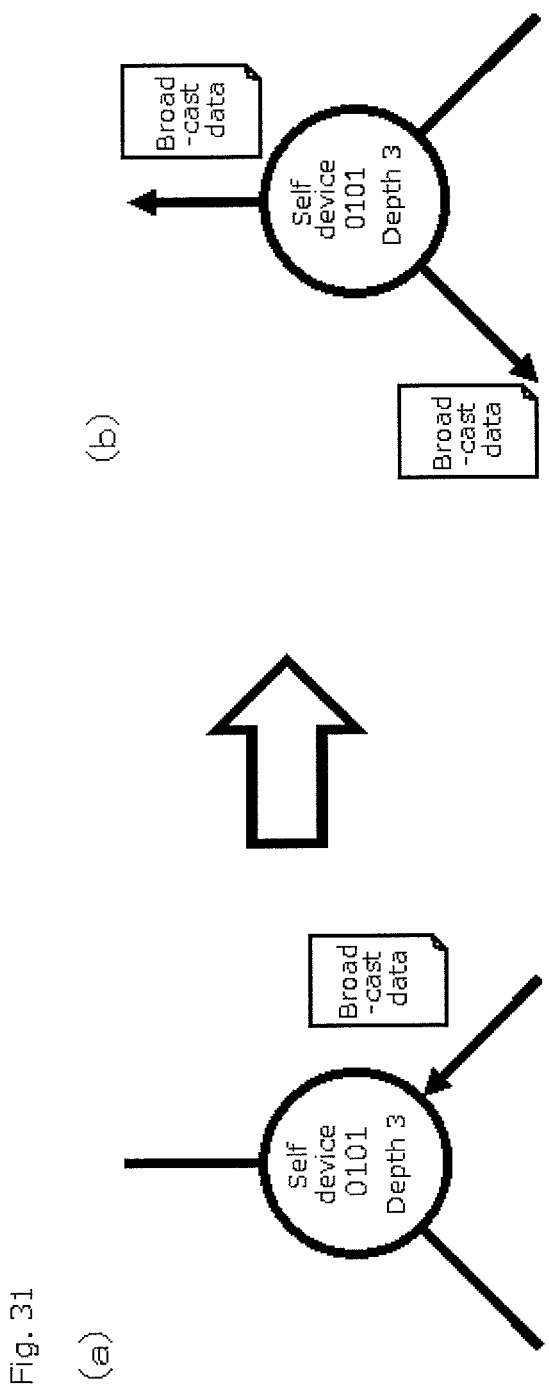
FIG. 31(a) is a first explanatory diagram illustrating cut-off of the binary tree structure.
FIG. 31(b) is a second explanatory diagram illustrating cut-off of the binary tree structure.

FIGS. 31 (a) and 31 (b) illustrate processing in the case of the broadcast message. In case that the self device is "0101" and, as shown in FIG. 31 (a), it receives the broadcast message from one of the clients connected to the self device, the CPU of the device, as shown in FIG. 31(b), transmits the broadcast message to the client that is other than the device which transmits the message and is connected to the self device, and to the host. Since the similar processing is executed in the other devices, the broadcast message is transmitted to the entire network system quickly.

In the present embodiment, a host is autonomously set from a state where no host is present, so that the network system can be structured. The same share information can be distributed to all the devices structuring the network system by using the structured network system. When the share information is distributed, the host needs to collect share information (temporary share information) heldby another client and generate final share information, but in the present embodiment, the share information received by each of the devices and share information of the self device are merged (synthesized) and are transmitted. For this reason, a load at the time of collecting the share information is remarkably reduced in the host.

Second Embodiment

In the first embodiment, share information is generated by a host and is distributed to another device, but the share information is generated by merging share information (temporary share information) held by each of the devices. When the share information held by each of the devices is changed, the share information updated by the change is distributed as the latest share information to the other devices. For this reason, when a certain device is disconnected from a network 10 so as to be in an off-line state, a problem may arise.

That is to say, even if information about the device in the off-line state is externally changed in the other devices connected to the network 10 while a certain device is in the off-line state, when the device in the off-line state is reconnected to the network 10 so as to be in the on-line state, the share information held by the device is reflected directly so as to be distributed as the latest share information in the network system. For this reason, the information changed externally is restored into the original information unintentionally.

Therefore, the present embodiment describes processing for properly changing information in such a case.

Figure 32:
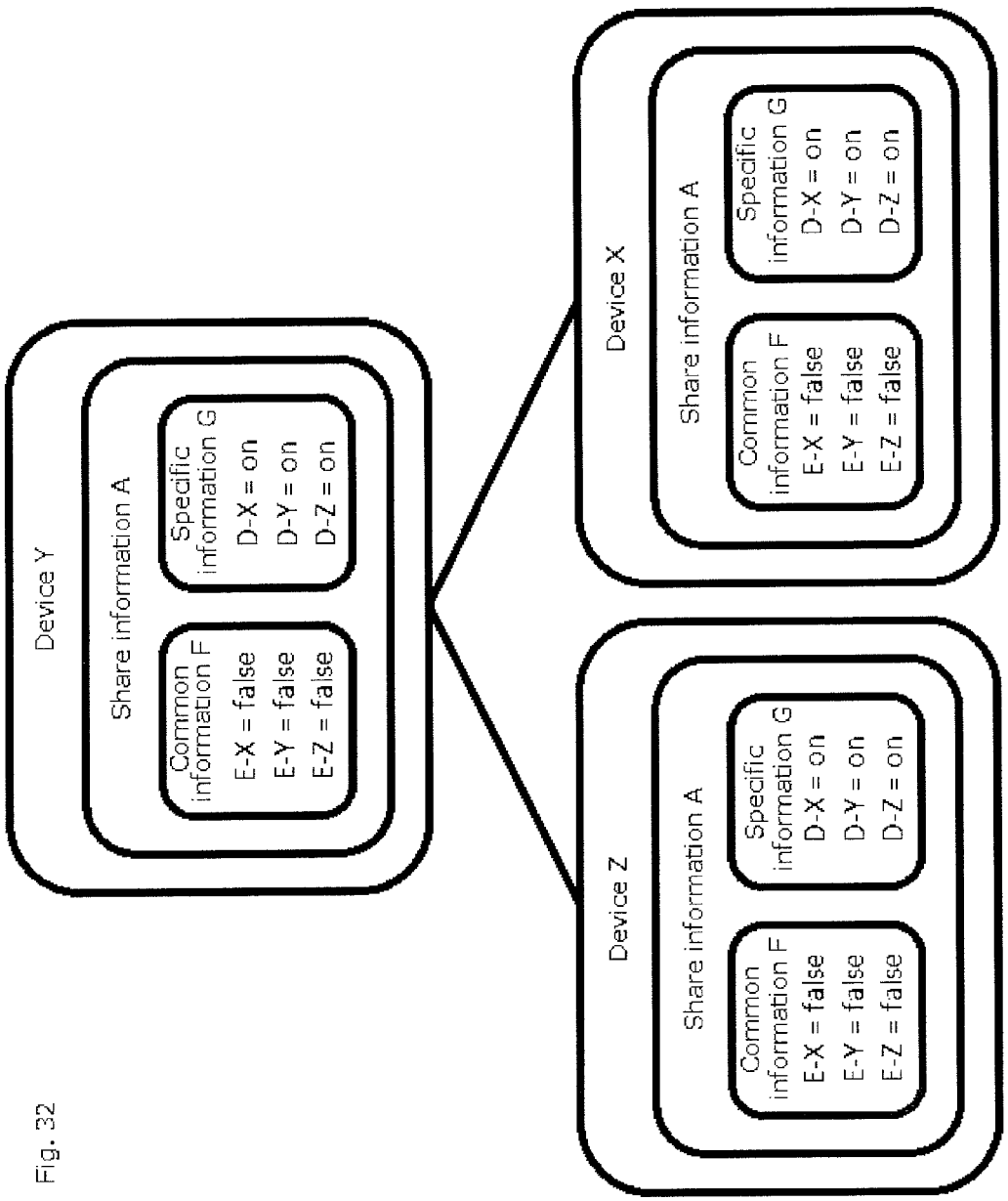
FIG. 32 is an explanatory diagram (1) illustrating a change of share information.

FIG. 32 illustrates the share information according to the present embodiment. As described above, all the devices (in the drawing, the devices X, Y, and Z) in the network system store identical share information A in their memories. The share information A includes common information F and specific information G. The common information F is information that is not specific to each of the devices, and is concretely bool information (true or false) representing whether the respective devices are registered in the network system. Further, the specific information G is information specific to the respective devices.

The common information F is, for example,
E-X=false
E-Y=false
E-Z=false
and the specific information G is, for example,
D-X=on
D-Y=on
D-Z=on
The above means that false in the common information is registered, but true is not registered.

Figure 33:
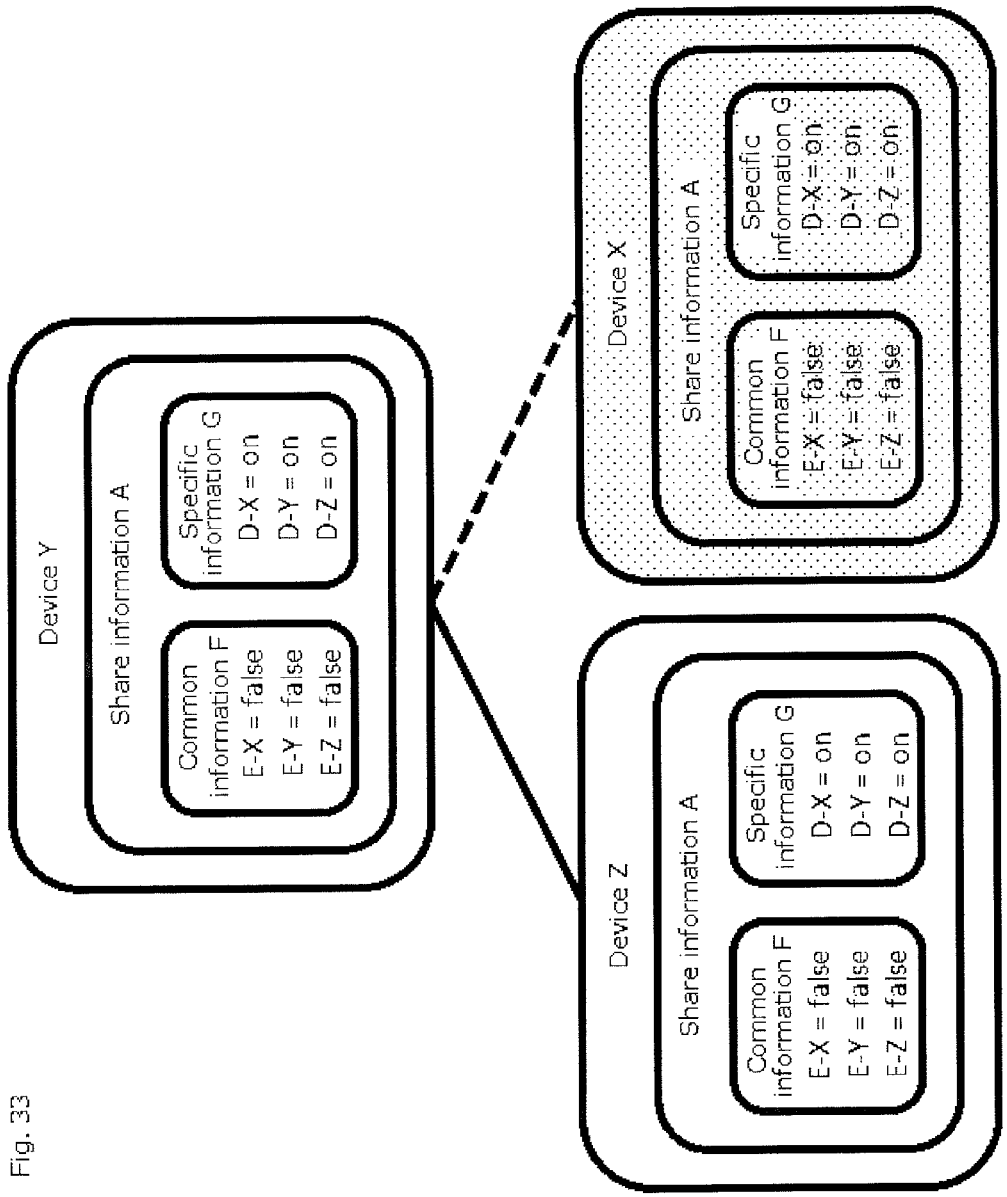
FIG. 33 is an explanatory diagram (2) illustrating the change of the share information.
Figure 34:
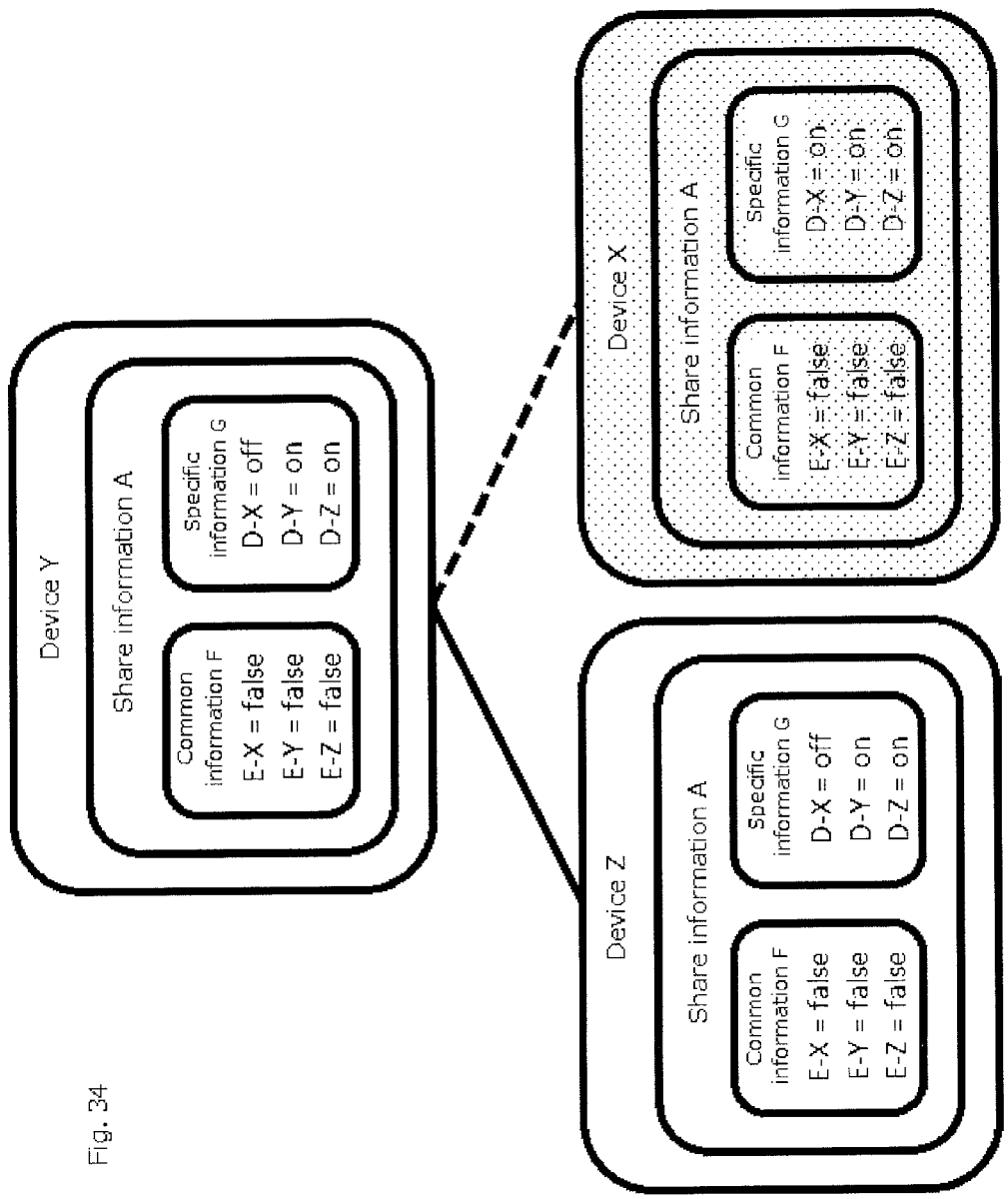
FIG. 34 is an explanatory diagram (3) illustrating the change of the share information.

FIG. 33 illustrates a case where the device X in the state of FIG. 32 is cut off from the network 10. In the drawing, hatching shows the cut-off. In this cut-off state, as shown in FIG. 34, specific information D-X in the specific information G is rewritten from on into off from the outside. The outside means a controller for controlling operations and settings of the devices, and a user operates the controller so as to rewrite the specific information D-X about the devices Y and Z into off. To rewrite the specific information D-X from on into off means to cancel (unregister) the registration of the devices cut off from the network 10 to be in the off-line state.

Figure 35:
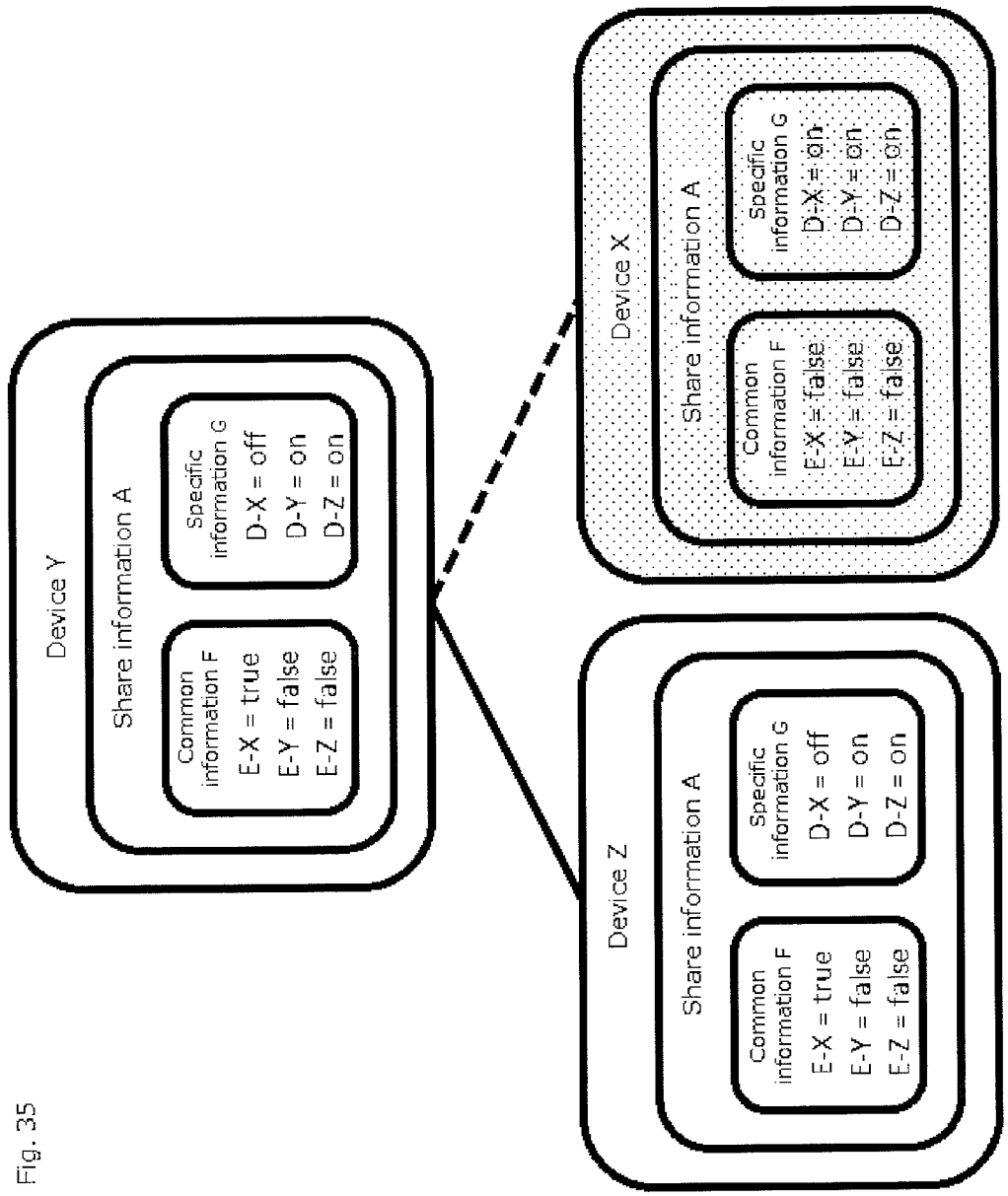
FIG. 35 is an explanatory diagram (4) illustrating the change of the share information.

Just when the specific information G about the device Y and the device Z is rewritten from D-X=on into D-X=off, the common information F about the device Y and the device Z are also changed from E-X=false into E-X=true. FIG. 35 illustrates a state where the common information F is changed.

Figure 36:
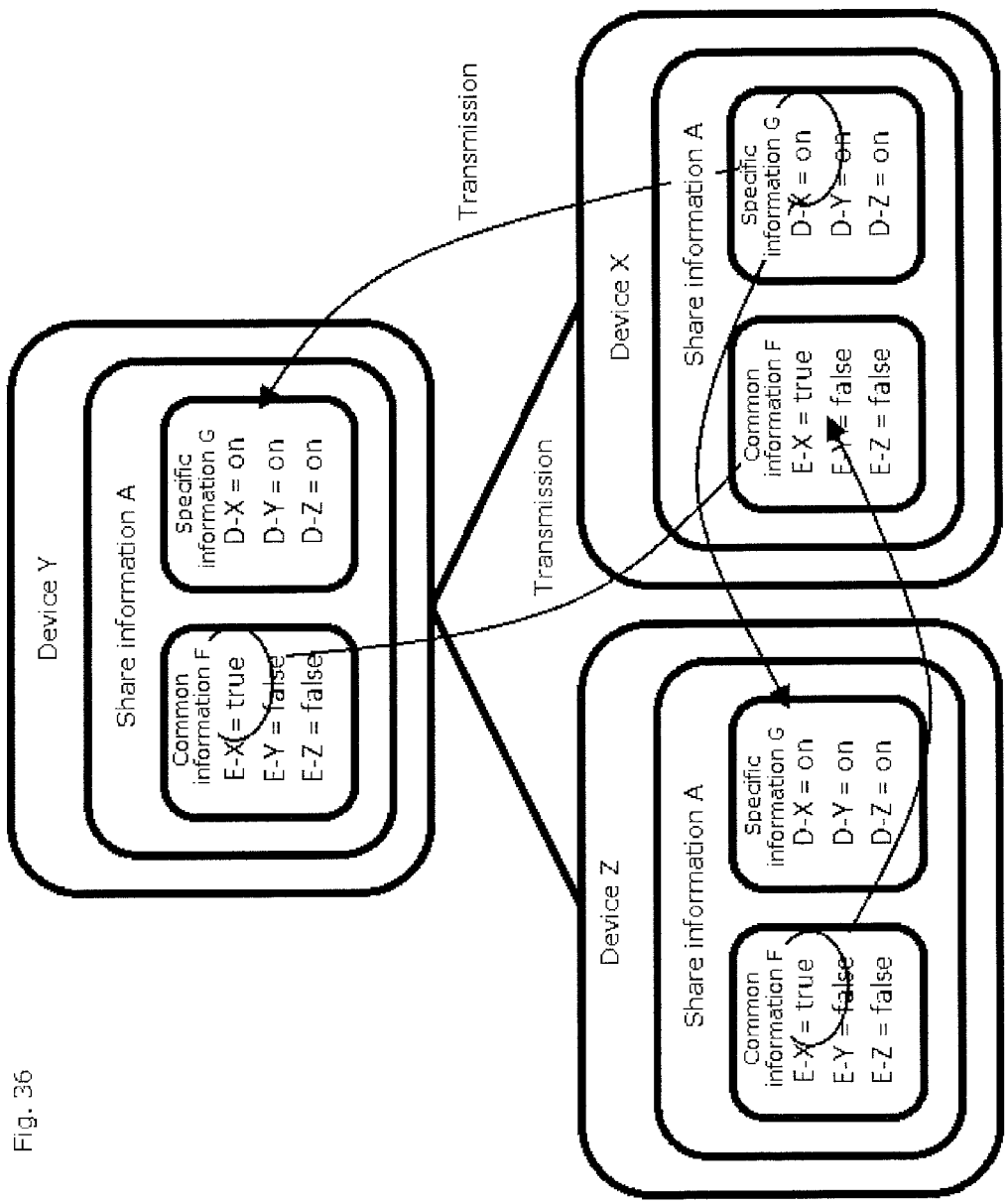
FIG. 36 is an explanatory diagram (5) illustrating the change of the share information.

In the state of FIG. 35, the device X is reconnected to the network 10 so as to be in the on-line state. In this case, as shown in FIG. 36, the device X returned to the network system still stores the information D-X=on as the specific information in the memory. The specific information G is preferentially processed and is transmitted to the device Y and the device Z via the host. As a result, a CPU of the device Y and a CPU of the device Z again update D-X=off into D-X=on in the specific information G.

Figure 37:
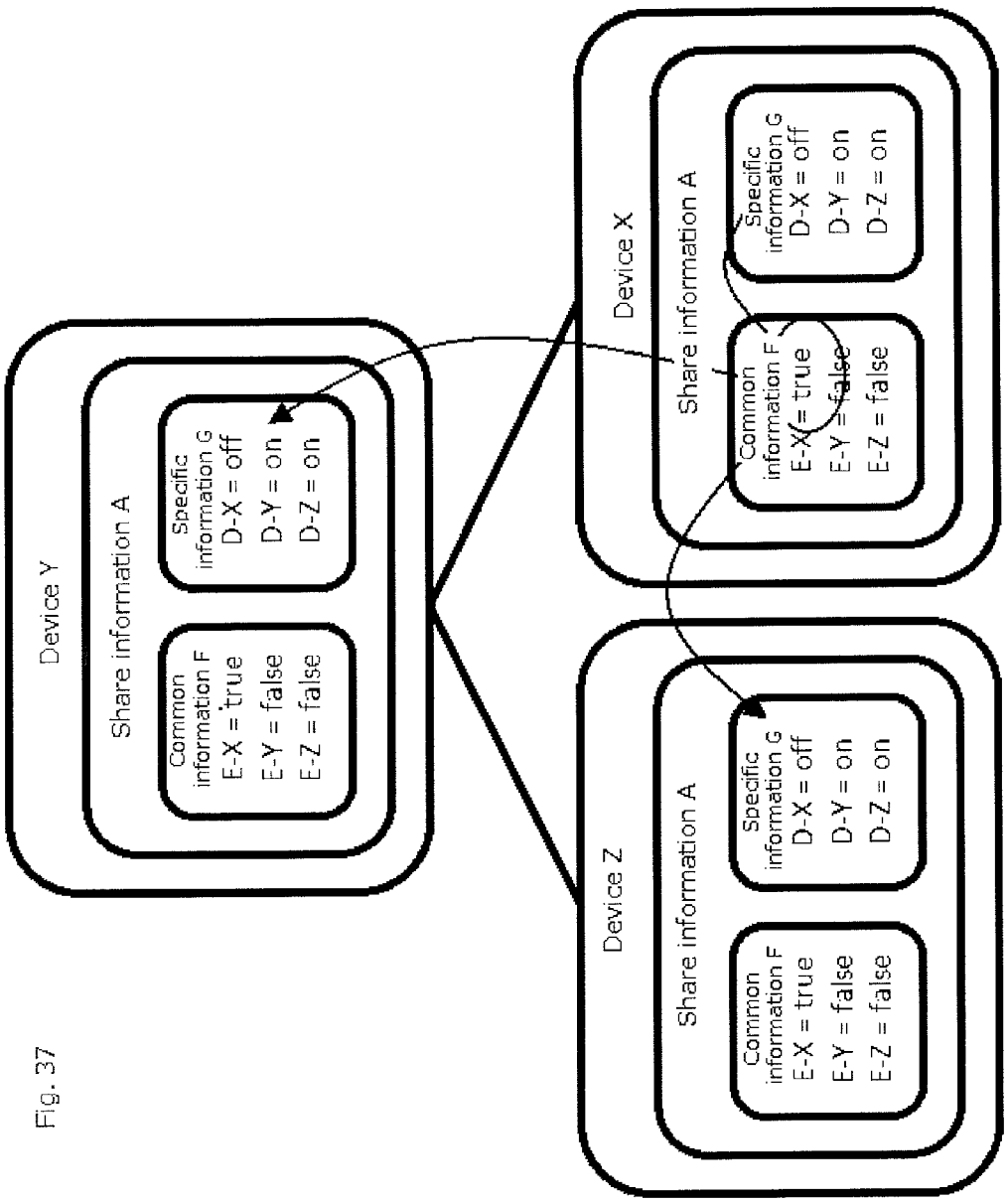
FIG. 37 is an explanatory diagram (6) illustrating the change of the share information.

On the other hand, the common information F about the device Y and the device Z is externally rewritten into E-X=true while the device X is cut off from the network 10 so as to be in the off-line sate. For this reason, E-X=true is transmitted and the common information F about the device X is updated as shown in FIG. 37. As a result, since the common information F common among all the devices in the share information A is such that E-X=true, the CPU of the device X uses this as a trigger and rewrites D-X=on of the specific information G into D-X=off so as to match with E-X=true. The change in the specific information G is distributed also to the device Y and the device Z, and the CPUs of the device Y and the device Z change D-X=on of the specific information G into D-X=off.

Figure 38:
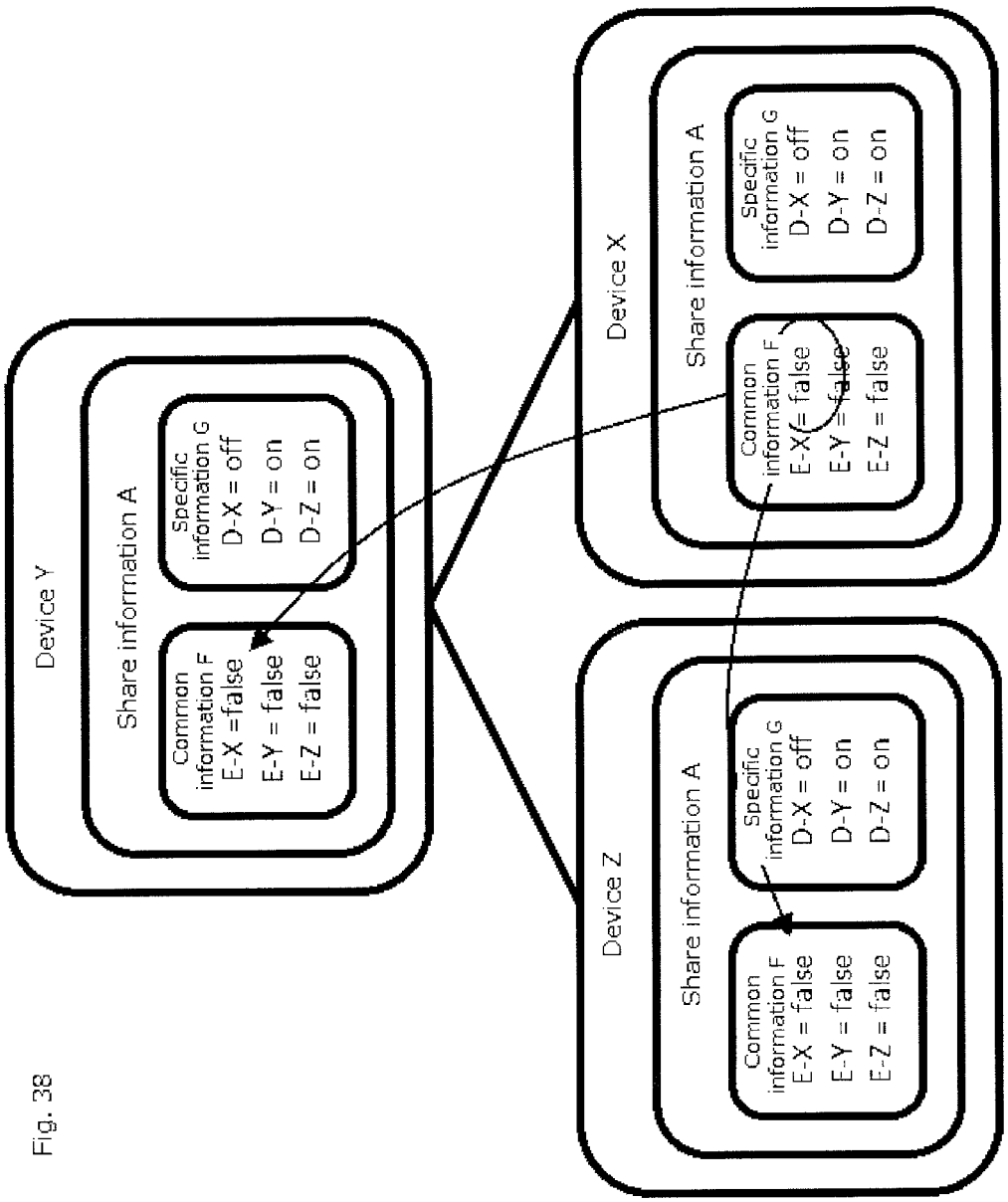
FIG. 38 is an explanatory diagram (7) illustrating the change of the share information.

After the change and distribution of the specific information G are completed, as shown in FIG. 38, the CPU of the device X returns E-X=true of the common information F into E-X=false, and the CPU of the device Y and the CPU of the device Z similarly change true into false.

In the present embodiment, the share information A is divided into the common information F and the specific information G, and the value of the specific information G is adjusted by using the common information F. As a result, even when setting is changed externally in a state where a certain device is cut off from a network 10, this change can be properly distributed and reflected to the devices including the device that returns to the network system.

Third Embodiment

In the first embodiment, as shown in FIG. 10, when share information is changed in any device in the network system, this change is transmitted sequentially to the devices in a hierarchy one level up. The share information is eventually transmitted to the host, and finite difference information is generated in the host and distributed to all the clients. When it takes a time for each of the devices to which the finite difference information is distributed to reflect the finite difference information on the share information, share information about a specific device might be further changed during this time.

The present embodiment describes processing in a case where the share information is continuously changed.

Figure 39:
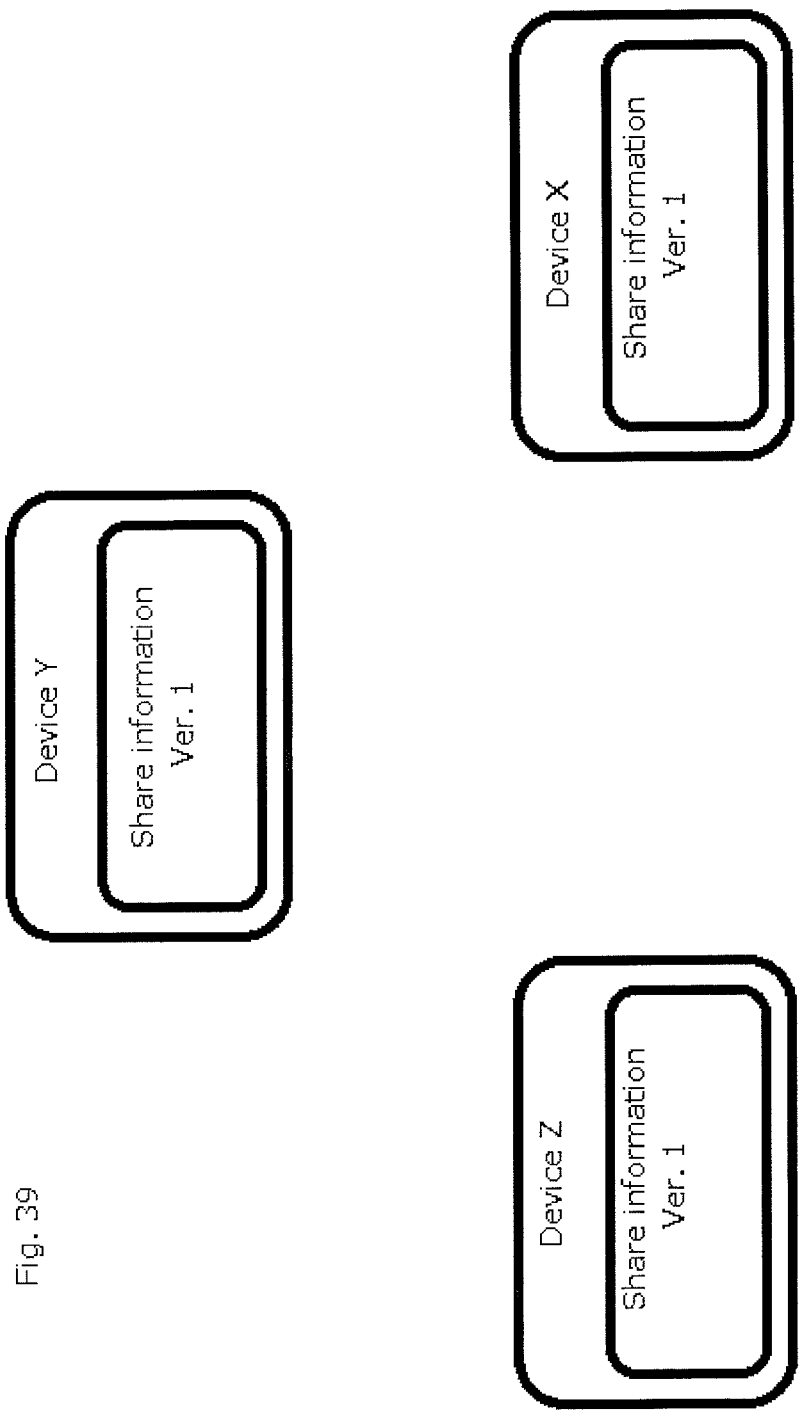
FIG. 39 is an explanatory diagram (1) illustrating merging of finite difference information.

In FIG. 39, devices (devices X, Y, and Z) are present in a network, and they store identical share information in their memories. The version of this share information is version 1.

Figure 40:
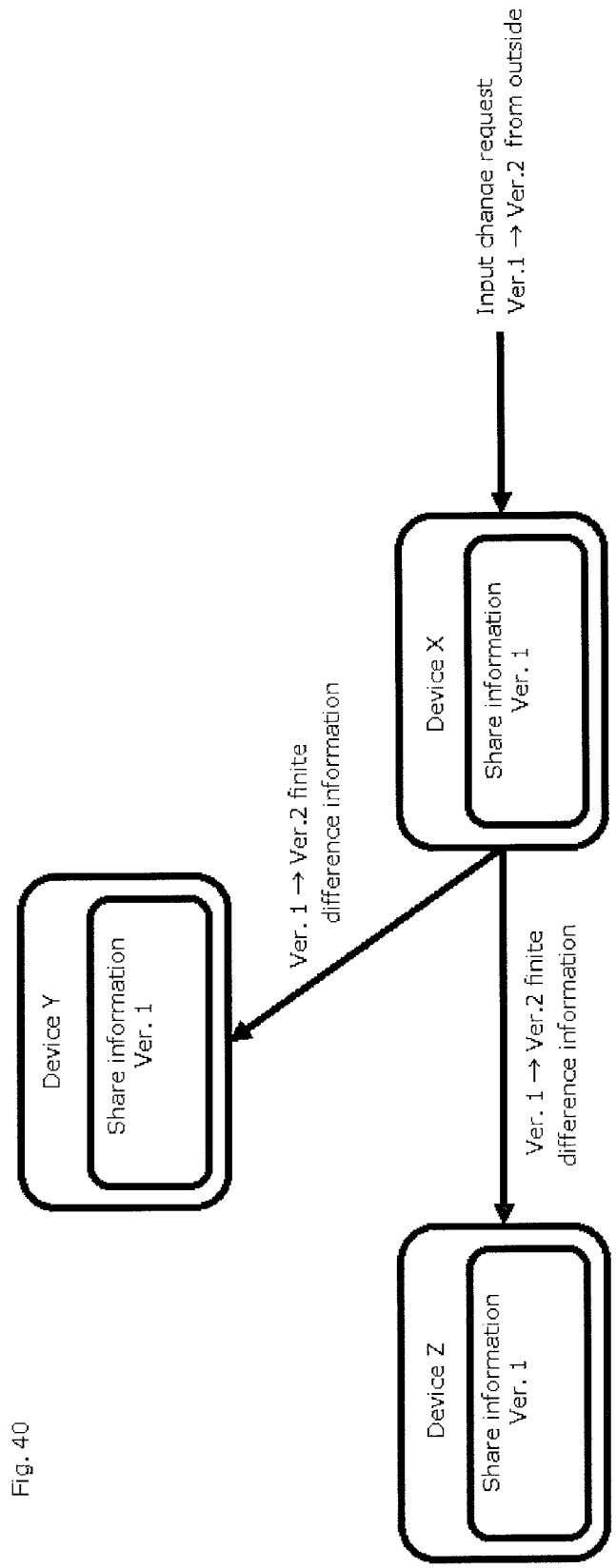
FIG. 40 is an explanatory diagram (2) illustrating the merging of the finite difference information.

In this state, as shown in FIG. 40, a request for updating the version 1 of the share information into version 2 is input from the outside into the device X. The outside means a controller for controlling operations and settings of the devices similarly to the second embodiment, and a case where a user operates the controller so as to input a request for changing the version into a device. In case that the device X is a host, as described in the first embodiment, a CPU of the device X generates finite difference information of version 1 and version 2, and distributes the finite difference information to the device Y and the device Z. A CPU of the device Y and a CPU of the device Z update the share information stored in the memories from version 1 into version 2 using the received finite difference information.

Figure 41:
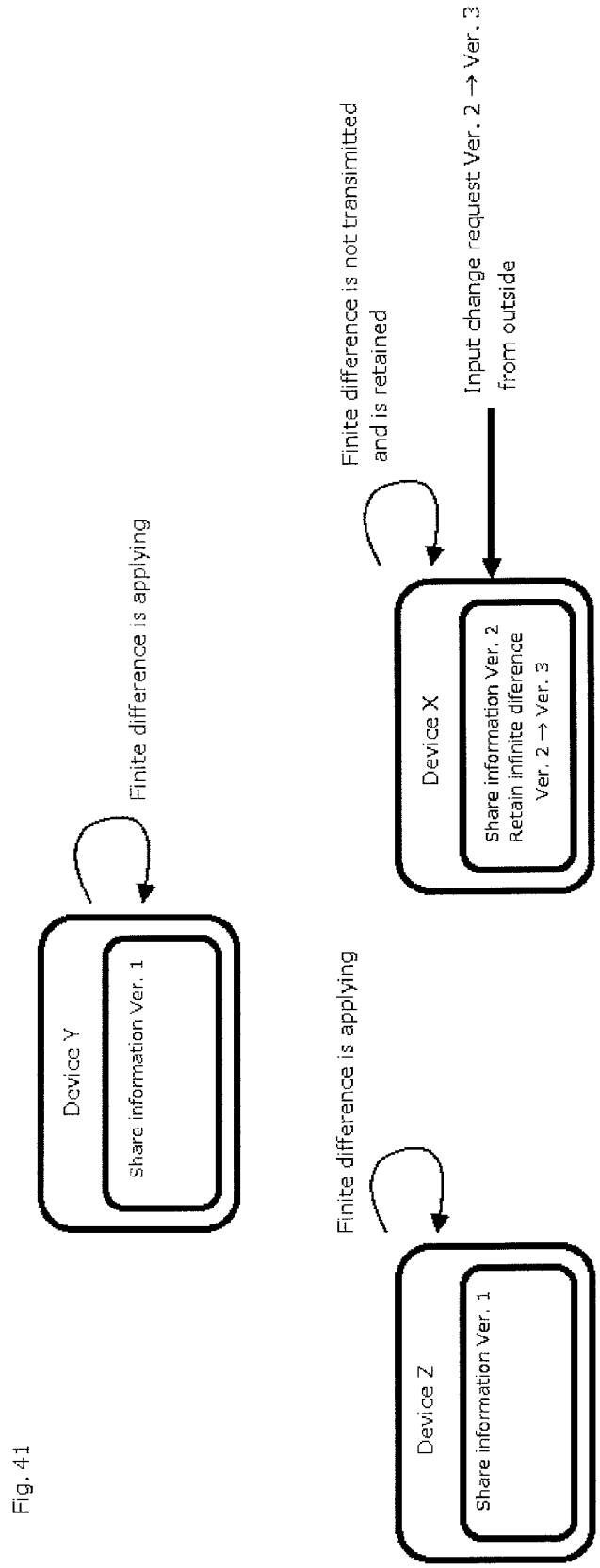
FIG. 41 is an explanatory diagram (3) illustrating the merging of the finite difference information.

FIG. 41 illustrates a case where while the finite difference information is applied to the share information about the self devices in the device Y and the device Z, a request for updating version 2 into version 3 is again input from the outside into the device X. In this case, the CPU of the device X generates finite difference information between version 2 and version 3. When the CPU of the device X detects that the finite difference information is still being applied in the device Y and the device Z, it stores the generated finite difference information in the memory without distributing this information to the device Y and the device Z.

Figure 42:
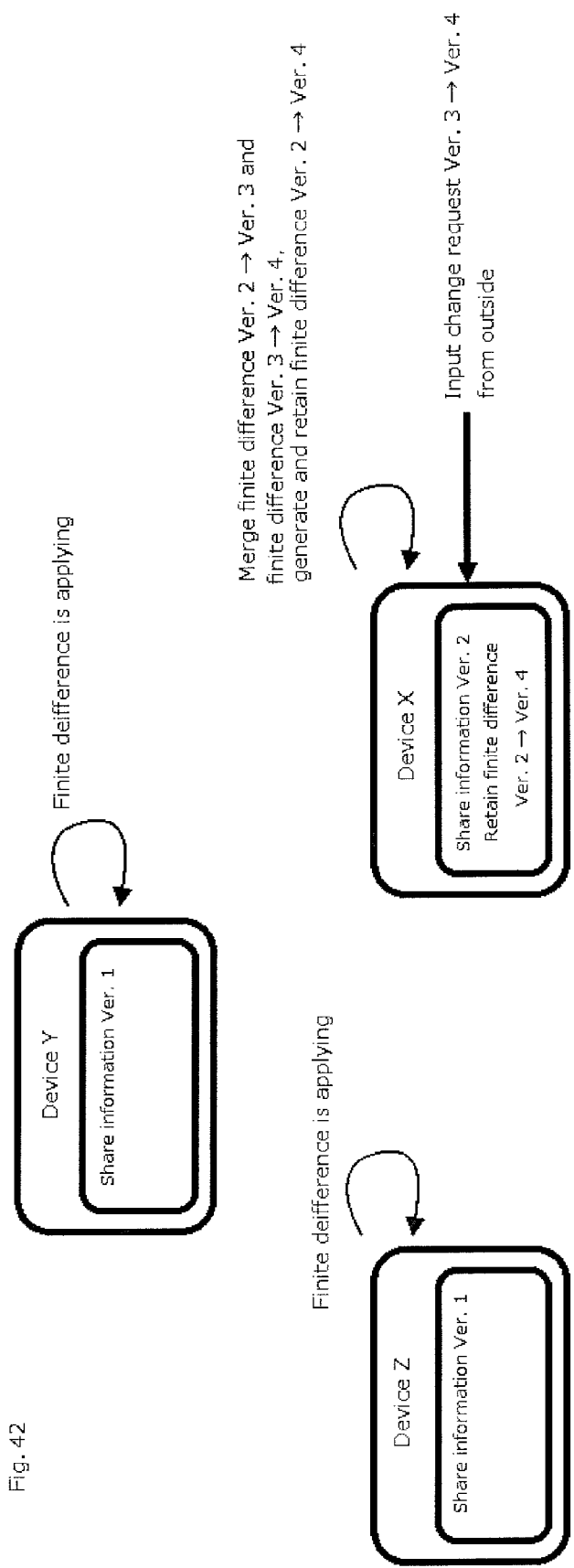
FIG. 42 is an explanatory diagram (4) illustrating the merging of the finite difference information.

FIG. 42 illustrates a case where the finite difference information of version 2 and version 3 is stored in the memory in the device X, and while the finite difference information between version 1 and version 2 is applied in the device Y and the device Z, a request for updating version 3 into version 4 is further input from the outside. In this case, the CPU of the device X generates the finite difference information between version 3 and version 4. The CPU of the device X detects that the finite difference information between version 2 and version 3 is not distributed and is still stored in the memory, and the finite difference information between version 3 and version 4 is merged (synthesized) with the finite difference information between version 2 and version 3, which is stored in the memory and is not distributed, and the merged information is stored in the memory. That is to say, the CPU of the device X merges these two pieces of finite difference information so as to generate finite difference information between the version 2 and version 4 and store it in the memory.

Figure 43:
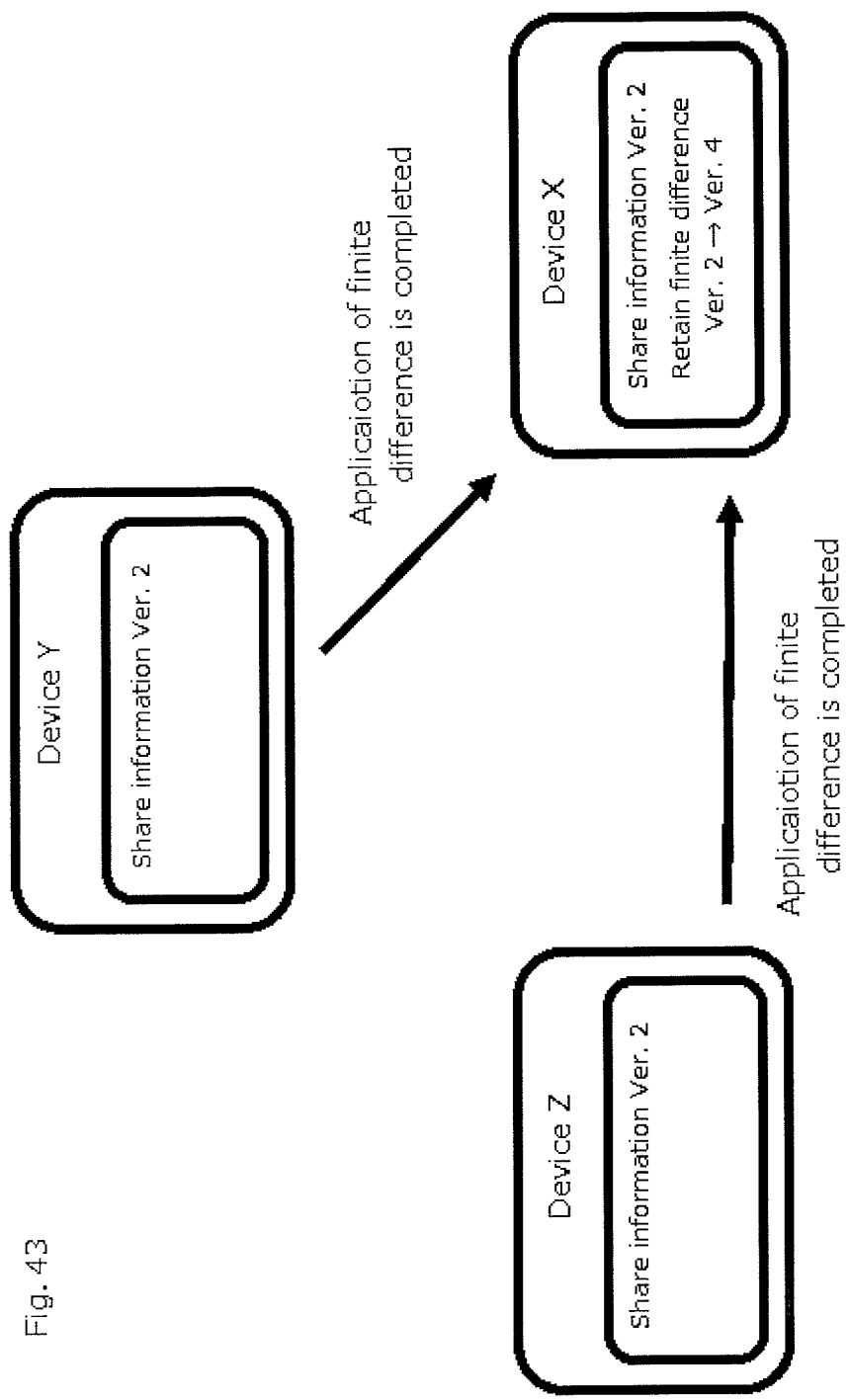
FIG. 43 is an explanatory diagram (5) illustrating the merging of the finite difference information.

FIG. 43 illustrates a case where application of the finite difference information is completed in the device Y and the device Z, and the share information of the device Y and the device Z is updated into version 2. The CPU of the device Y and the CPU of the device Z return a response message for the completion of the difference application to the host device X.

Figure 44:
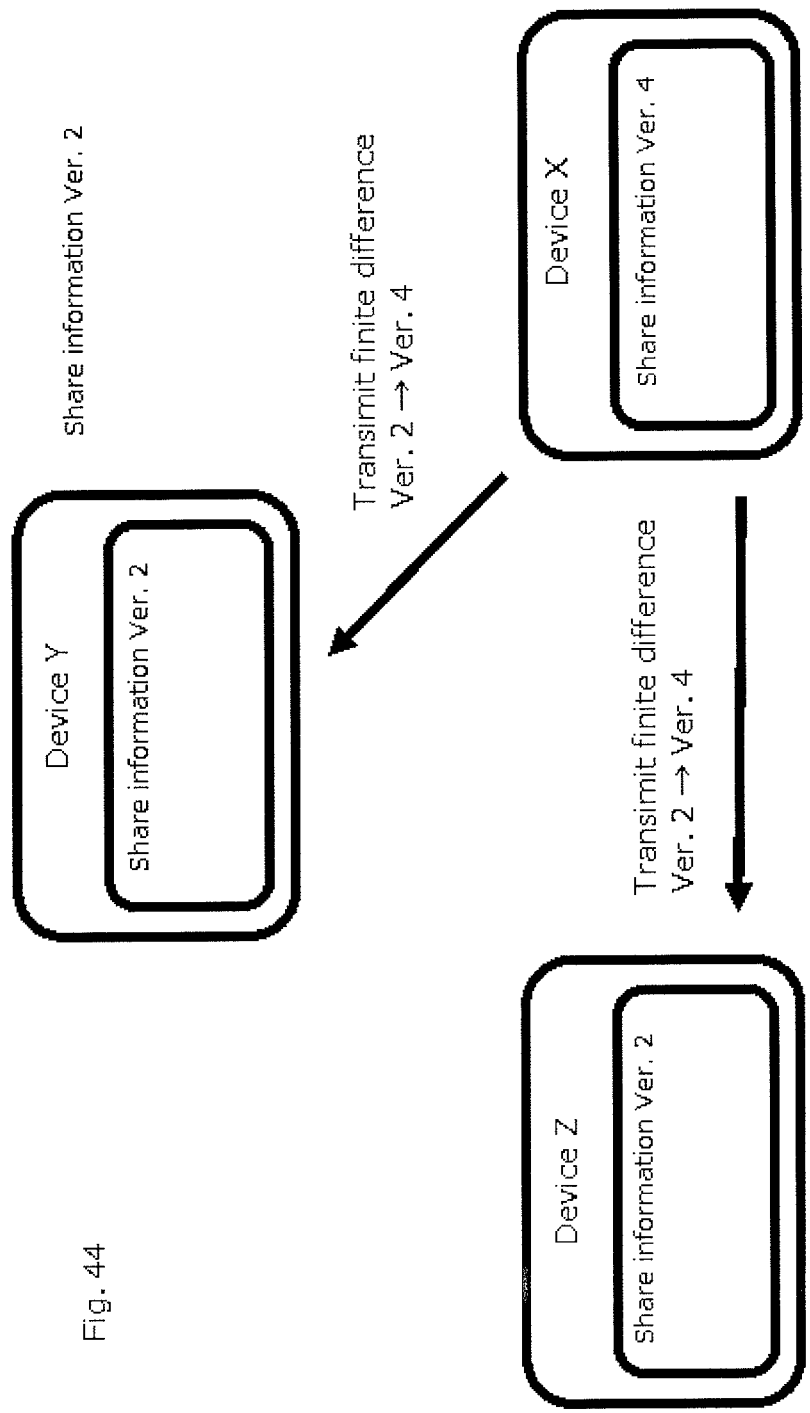
FIG. 44 is an explanatory diagram (6) illustrating the merging of the finite difference information.

As a result, the CPU of the device X distributes, as shown in FIG. 44, the finite difference information of version 2 and version 4 stored in the memory to the device Y and the device Z. The CPU of the device Y and the CPU of the device Z receive the finite difference information and again update the share information stored in the memory.

FIG. 45 illustrates a state where the application of the finite difference information is completed in the device Y and the device Z. The share information is updated into the version 4 in all the devices X, Y, and Z. In the device Y and the device z, the version is updated so that version 1→version 2→version 4, and thus it is regarded that version 3 is skipped or the updating of version 3 is integrated into version 4 and this enables efficient change processing.

The present embodiment describes the case where the device X is the host, but another device may be the host. The finite difference information is generated to be transmitted to the host, and when the finite difference information is distributed in the host, the generated finite difference information is retained in the client until the application of previous finite difference information is completed. When new finite difference information is generated, this information is merged with the finite difference information held by the memory so that updating is performed, and the merged finite difference information may be distributed to the client at timing when the application of the finite difference information is completed in the client.

The above has described the embodiments of the present invention, but the present invention is not limited thereto and various modifications can be made.

In the above embodiments, the host is determined among the devices, and the network system is structured according to plan data generated by the determined host. Not limited to this, for example, information about being host and plan data are stored in a memory of the host device in advance, and the network system may be structured according to the plan data distributed from the host device.

What is claimed is:

1. A network device including a host device and client devices to be connected to the host device and structuring a network system of a hierarchical structure without a server where the host device is at a top, the network device comprising:

a processing unit;
a storage unit; and
a communication interface,
wherein
in case that a self device is the client device, when the processing unit is to transmit first share information stored in the storage unit to a device in a hierarchy one level up on network plan data of a hierarchical structure whose top is the host device in cases of receiving second share information from a device in a hierarchy one level down on the network plan data via the communication interface, the processing unit merges the received second share information with the first share information so as to generate merged share information, and transmits the generated merged share information to the device in the hierarchy one level up on the network plan data via the communication interface,
in case that the self device is the host device, the processing unit merges all pieces of share information transmitted from the other devices with third share information stored in the storage unit so as to generate network share information, and transmits the generated network share information to the other devices via the communication interface.

2. The network device according to claim 1, wherein
in case that the self device is the client device, the processing unit determines whether the merged share information is proper based on scheme information stored in the storage unit, and in case that the determination is made that the merged share information is proper, transmits the merged share information to a device in a hierarchy one level up on the network plan data via the communication interface, in case that the self device is the host device, the processing unit determines whether the network share information is proper based on the scheme information stored in the storage unit, and in case that the determination is made that the network share information is proper, transmits the network share information to the other devices via the communication interface.

3. The network device according to claim 2, wherein
in case that the self device is the client device, when the processing unit is to transmit the first share information and the scheme information stored in the storage unit to a device in a hierarchy one level up on the network plan data in case of receiving the second share information and the scheme information from a device in a hierarchy one level down on the network plan data via the communication interface, the processing unit transmits the scheme information of latest version selected from the received scheme information and the scheme information stored in the storage unit, and the merged share information to a device in a hierarchy one level up on the network plan data via the communication interface, in case that the self device is the host device, the processing unit transmits the scheme information of latest version selected from the received scheme information and the scheme information stored in the storage unit and the network share information to the other devices via the communication interface.

4. The network device according to claim 1, wherein
the processing unit determines whether the self device is proper as the host device based on a device list of devices connected to a network that is stored in the storage unit, and in case that the determination is made that the self device is proper as the host device, determines that the self device is the host device, and transmits a message representing that the self device is the host device to the other devices connected to the network via the communication interface, in case of determining that the self device is not proper as the host device and receiving the message via the communication interface, the processing unit determines that the self device is the client device.

5. The network device according to claim 4, wherein
in case of determining that the self device is the host device, the processing unit generates the network plan data, transmits the generated network plan data to a device in a hierarchy one level down on the network plan data via the communication interface, and connects the device in the hierarchy one level down on the generated network plan data to the self device, in case of determining that the self device is the client device, the processing unit receives the network plan data via the communication interface, transmits the received network plan data to a device in a hierarchy one level down on the network plan data via the communication interface, and connects the device in the hierarchy one level down on the received network plan data to the self device.

6. The network device according to claim 4, wherein
the device list includes device numbers of the devices connected to the network and strength values in the network system, the processing unit determines that a device whose strength value is the largest in the device list is proper as the host device, and in case that the strength values are equal to each other, determines that a device whose device number is the largest or the smallest is proper as the host device.

7. The network device according to claim 4, wherein
the processing unit makes the self device change into a first state representing that the self device is not the host device nor the client device in an initial state, in case of determining that the self device is the host device, makes the self device change from the first state into a second state representing that the self device is the host device so as to transmit the message, transmits an echo request message at a predetermined time interval, in case of determining that the self device is the client device, makes the self device change from the first state into a third state representing that the self device is the client device, and in case of not receiving the echo request message at a predetermined time interval, makes the self device change from the third state into the first state again.

8. The network device according to claim 1, wherein
in case that the self device is the host device and the network share information is changed, the processing unit generates finite difference information between the network share information before the change and the network share information after the change, and transmits the generated finite difference information to the other devices via the communication interface, in case that the self device is the client device and the network share information is changed, the processing unit generates the finite difference information, and transmits the generated finite difference information to a device in a hierarchy one level up on the network plan data via the communication interface, in case that the self device is the client device and in case of receiving the finite difference information from the device in the hierarchy one level up on the network plan data via the communication interface, the processing unit updates the network share information stored in the storage unit using the finite difference information, and transmits the finite difference information to a device in a hierarchy one level down on the network plan data via the communication interface.

9. The network device according to claim 8, wherein
the network share information includes common information common among all the devices connected to the network and specific information specific to the devices connected to the network, in case that any device of the devices connected to the network is cut off from the network and then the specific information is changed, the processing unit updates the specific information about the devices connected to the network using the finite difference information, updates the common information so that the common information matches with the specific information, and in case that the any device is reconnected to the network, the processing unit updates the common information and the specific information about the any device so as to match with the updated common information.

10. The network device according to claim 8, wherein
in case that the self device is the host device and the finite difference information is generated to be transmitted to the other devices and the other devices are performing the updating using previous finite difference information, the processing unit waits for transmission until the updating is completed, and in case of generating new finite difference information during the waiting, merges the finite difference information in waiting with the new finite difference information so as to transmit the merged finite difference information after the updating in the other devices is completed.

11. The network device according to claim 1, wherein
in case that connection with any device of the devices connected to the network is cut off, the processing unit cuts off all connections with the other devices in a hierarchy one level up and the other devices in a hierarchy one level down on the network plan data.

12. The network device according to claim 6, wherein
the network plan data is plan data of an N tree structure (N is a natural number of 2 or more), and is list data in which the devices are arranged in decreasing order of the strength values.

13. The network device according to claim 1, further comprising;
an audio signal processor for processing audio signals.

14. An information sharing system of a hierarchical structure whose top is a host device without a server including the host device and client devices to be connected to the host device, the system comprising:
a plurality of network devices, wherein
each of the plurality of network devices includes
a processing unit,
a storage unit, and
a communication interface,
in case that the self device is the client device, when the processing unit is to be transmit first share information stored in the storage unit to a network device in a hierarchy one level up on network plan data of a hierarchal structure whose top is the host device in case of receiving second share information from a device in a hierarchy one level down on the network plan data via the communication interface, the processing unit merges the received second share information with the first share information so as to transmit the merged information to a network device in a hierarchy one level up on the network plan data via the communication interface,
in case that the self device is the host device, the processing unit merges all pieces of share information transmitted from the other network devices with third share information stored in the storage unit so as to generate network share information, and transmits the generated network share information to the other network devices via the communication interface,
in case that the self device is the client device, the processing unit receives the transmitted network share information and stores the information in the storage unit so as to share the identical share information among the plurality of network devices.

15. The information sharing system according to claim 14, wherein
in case that the network share information is changed in a first network device as the client device, a processing unit of the first network device generates finite difference information between the network share information before the change and the network share information after the change, transmits the generated finite difference information to a network device as the host device, the processing unit of the network device as the host device transmits the finite difference information to all the network devices as the client devices including the first network device, the processing units of all the network devices as the client devices including the first network device updates the network share information stored in the storage units using the finite difference information.

* * * * *